(12) United States Patent
Oda

(10) Patent No.: US 7,263,891 B2
(45) Date of Patent: Sep. 4, 2007

(54) PRESSURE DETECTING APPARATUS

(75) Inventor: Teruo Oda, Gamagori (JP)

(73) Assignee: DENSO CORPORATION, Kariya (JP)

( * ) Notice: Subject to any disclaimer, the term of this patent is extended or adjusted under 35 U.S.C. 154(b) by 165 days.

(21) Appl. No.: 11/127,098

(22) Filed: May 12, 2005

(65) Prior Publication Data
US 2005/0252299 A1 Nov. 17, 2005

(30) Foreign Application Priority Data

| May 17, 2004 | (JP) | ............................. 2004-146095 |
| May 17, 2004 | (JP) | ............................. 2004-146096 |
| Nov. 16, 2004 | (JP) | ............................. 2004-332054 |

(51) Int. Cl.
*G01L 7/08* (2006.01)

(52) U.S. Cl. ...................................................... 73/715

(58) Field of Classification Search .................. 73/715, 73/724, 706, 718, 756, 708, 721; 361/283.3, 361/283.4, 283.1; 174/52.1; 439/260
See application file for complete search history.

(56) References Cited

U.S. PATENT DOCUMENTS

| 4,753,109 A | | 6/1988 | Zabler |
| 5,279,164 A | * | 1/1994 | Araki et al. .................... 73/708 |
| 5,329,819 A | * | 7/1994 | Park et al. ...................... 73/724 |
| 5,400,950 A | | 3/1995 | Myers et al. |
| 5,488,868 A | | 2/1996 | Ootake et al. |
| 5,813,876 A | * | 9/1998 | Rutigliano .................... 439/260 |
| 5,939,639 A | * | 8/1999 | Lethbridge ...................... 73/724 |
| 6,603,071 B2 | * | 8/2003 | Takao ........................... 174/538 |

FOREIGN PATENT DOCUMENTS

| EP | 0 855 585 A2 | 1/1998 |
| JP | A-5-34231 | 2/1993 |
| JP | A-H11-94673 | 4/1999 |
| JP | A-2000-82868 | 3/2000 |

OTHER PUBLICATIONS

Notice of Preliminary Rejection from Korean Patent Office issued on Jun. 27, 2006 for the corresponding Korean patent application No. 10-2005-0040837(a copy and English translation thereof).
Search Report dated Mar. 27, 2007 issued from French Patent Office for counterpart application No. 0504871000.
Notice of Final Rejection from Korean Patent Office issued on Mar. 26, 2007 for the corresponding Korean patent application No. 10-2005-0040837 (a copy and English translation thereof).

* cited by examiner

*Primary Examiner*—Jewel Thompson
(74) *Attorney, Agent, or Firm*—Posz Law Group, PLC

(57) ABSTRACT

Pressure detecting apparatus includes: a housing; a pipe extending from one end of the housing and having an elongated shape; and a pressure sensitive element for detecting pressure and outputting a signal corresponding to the pressure. The pipe includes a top end capable of receiving the pressure. The pressure sensitive element is disposed on the top end of the pipe. The housing includes a connector for retrieving the signal from the pressure sensitive element. The pipe further includes a wiring member disposed inside the pipe so that the wiring member connects between the pressure sensitive element and connector electrically.

25 Claims, 20 Drawing Sheets

PRESSURE DETECTING APPARATUS

CROSS REFERENCE TO RELATED APPLICATIONS

This application is based on Japanese Patent Applications No. 2004-146095 filed on May 17, 2004, No. 2004-146096 filed on May 17, 2004, and No. 2004-332054 filed on Nov. 16, 2004, the disclosures of which are incorporated herein by reference.

FIELD OF THE INVENTION

The present invention relates to a pressure sensor.

BACKGROUND OF THE INVENTION

The present invention is related to pressure detecting apparatus, i.e., a pressure sensor arranged in such a manner that a pressure sensitive element is provided inside a housing containing an elongate-shaped pipe portion which is projected from one edge side of the housing.

This sort of pressure detecting apparatus is arranged by employing a housing, an elongate-shaped pipe portion, and a pressure sensitive element, the apparatus which is disclosed, for instance, in Japanese Laid-open Patent Application No. H05-34231. The elongate-shaped pipe portion is provided in such a manner that the pipe portion is projected from one edge side of the housing. The pressure sensing element is provided in the housing and outputs a signal in response to detected pressure.

In the above-described pressure detecting apparatus, the pipe portion of the housing is inserted into an object to be detected, the pressure of which will be detected, and then, pressure to be detected (namely, detecting pressure) derived from the object to be detected is applied to a tip portion of the pipe portion. Then, this detecting pressure is applied to the pressure sensitive element provided in the housing so as to detect the pressure.

In the conventional pressure detecting apparatus, while a diaphragm for receiving the detecting pressure is provided on the tip portion of the pipe portion, and a pressure transferring member having a rod shape (referred to as "rod"), the detecting pressure may be transferred from the diaphragm via the rod to the pressure sensitive element.

Such a pressure detecting apparatus equipped with the rod functioning as the rod-shaped pressure transferring member is applied to a combustion pressure sensor, and the like. The combustion pressure sensor detects pressure (namely, internal cylinder pressure) in a combustion chamber of an engine. In this case, the pipe portion of the housing is inserted into a mounting hole of an engine block which corresponds to the object to be detected. As a result, the length of the rod must be elongated in response to the length of the pipe portion, namely, a transfer distance of pressure.

However, as explained above, if the length of the rod is made longer, then the weight of this rod is increased. As a result, a resonant frequency of the rod is superimposed with a vibration frequency of knocking of combustion, so that a resonant phenomenon may occur in the rod. Accordingly, such a problem may occur with respect to a sensor characteristic. That is, knocking signals are embedded in noise which is produced by the resonant phenomenon of the rod, so that the knocking signals cannot be measured.

Also, in the case that the length of the rod is made long, since the rod itself may be easily deformed, contact conditions between the rod and either the diaphragm or the pressure sensitive element are changed. If such a change in the contact conditions happens to occur, then precision in pressure transfer characteristics is deteriorated, which may give an advance influence to the sensor characteristic.

Further, in the case of such a pressure detecting apparatus that a pressure sensitive element has been connected to a flexible printed-circuit board by way of a flip flop joint, if a cooling/heating cycle is repeatedly carried out, then a large amount of stresses may be produced in the bump joint portions, because of differences in thermal expansion coefficients of these structural elements, in particular, a difference between a thermal expansion coefficient as to the pressure sensitive element made of silicon, and another thermal expansion coefficient as to the flexible printed-circuit board made of resin.

Also, while the sensing unit repeatedly receives pressure by the detected pressure, bumps are depressed by this pressure, so that a large amount of stresses may be produced in the bump joint portions. Then, in the bump joint portions which have received the stresses, there is such a risk that a wire disconnection may eventually occur.

Furthermore, if the flexible printed-circuit board is bent in such a manner that the bending angle "θ" becomes smaller than, or equal to 90 degrees, then such a stress applied to a direction along which one edge portion is stripped from the strain gauge is not substantially produced at one edge portion of the flexible printed-circuit board, namely at the joint portion to the strain gauge under this bending condition.

However, when the flexible printed-circuit board is bent under such a bending condition that the bending angle "θ" becomes smaller than, or equal to 90 degrees, the stress which is applied to the bending portion of the flexible printed-circuit board is large, so that a damage may readily occur. As a result, the following problems may probably occur. That is, cracks, bends, and breaks may be produced in a base, a copper foil, and the like, which constitute the flexible printed-circuit board.

SUMMARY OF THE INVENTION

In view of the above-described problem, it is an object of the present invention to provide a pressure detecting apparatus. The apparatus has excellent sensor characteristics and excellent durability.

Pressure detecting apparatus includes: a housing; a pipe extending from one end of the housing and having an elongated shape; and a pressure sensitive element for detecting pressure and outputting a signal corresponding to the pressure. The pipe includes a top end capable of receiving the pressure. The pressure sensitive element is disposed on the top end of the pipe. The housing includes a connector for retrieving the signal from the pressure sensitive element. The pipe further includes a wiring member disposed in the pipe so that the wiring member connects between the pressure sensitive element and connector electrically.

In the above apparatus, since the pressure sensitive element is disposed on the top end of the pipe, the length of the pipe can be reduced. Thus, resonance of the pipe generated by external engine and the like and deformation of the pipe can be suppressed. Accordingly, the apparatus has excellent sensor characteristics and excellent durability.

Preferably, the apparatus further includes: a pressure transferring member disposed between the diaphragm and the pressure sensitive element. The pressure transferring member includes a first surface contacting the diaphragm and a second surface contacting the pressure sensitive element. The first and the second surfaces are spherical surfaces. The pressure sensitive element is capable of receiving the pressure through the diaphragm and the pressure transferring member. In this case, the contact between the diaphragm and the pressure transferring member and the contact between the pressure sensitive element and the pressure transferring member provide stable point contacts. Thus, contact area of them can be reduced. Therefore, change of contact characteristics does not affect the sensor characteristics of the apparatus. Thus, the apparatus has excellent pressure transfer.

Preferably, the apparatus further includes: a diaphragm having a circular shape and disposed on the top end of the pipe for covering the pressure sensitive element. The pressure sensitive element is capable of receiving the pressure through the diaphragm. The pressure sensitive element includes a strain gauge deformable by a load introduced from the diaphragm. The strain gauge has a contact area contacting the diaphragm. The contact area of the strain gauge is equal to or smaller than one-fourth of an area of the diaphragm. In this case, the pressure received by the diaphragm can be applied to the pressure sensitive element directly. Specifically, the force applied to the pressure sensitive element is equal to or larger than the received pressure. Thus, even when the dimensions of the pressure sensitive element are reduced, the sensitivity of the pressure is not reduced.

Preferably, the wiring member is a flexible printed circuit board. The flexible printed circuit board includes a first end connecting to the pressure sensitive element, a second end, and a bending portion. The flexible printed circuit board is bent with a bending angle at the bending portion. The second end of the flexible printed circuit board extends toward the connector. The bending angle is equal to or smaller than 90 degrees so that stress at the bending portion is smaller than a case where the bending angle is larger than 90 degrees.

Preferably, the first end of the flexible printed circuit board is disposed in the pipe on one side of an inner wall of the pipe. The second end of the flexible printed circuit board is disposed in the pipe on the other side of the inner wall of the pipe. The one end of the inner wall of the pipe faces the other side of the inner wall of the pipe. In this case, it can be performed appropriately that the bending angle is set to be equal to or smaller than 90 degrees. Further, the stress of removing the pressure sensitive element from the printed circuit board is reduced. Thus, the connection between the element and the board can be appropriately secured.

Further, pressure detecting apparatus includes: a housing; a flexible printed circuit board disposed in the housing; a sensing portion for detecting pressure and outputting a signal corresponding to the pressure; and a connector disposed in the housing and retrieving the signal from the sensing portion. The sensing portion is disposed on one side of the housing so that the one side of the housing is capable of receiving the pressure. The flexible printed circuit board connects between the sensing portion and the connector electrically. The sensing portion is connected to the flexible printed circuit board electrically and mechanically through a plurality of bumps disposed on the flexible printed circuit board. The flexible printed circuit board has a stress relaxation construction for reducing stress applied to the bumps.

In this case, even if the stress is applied to the bump, the stress is reduced by the stress relaxation construction. Accordingly, the apparatus has excellent sensor characteristics and excellent durability.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
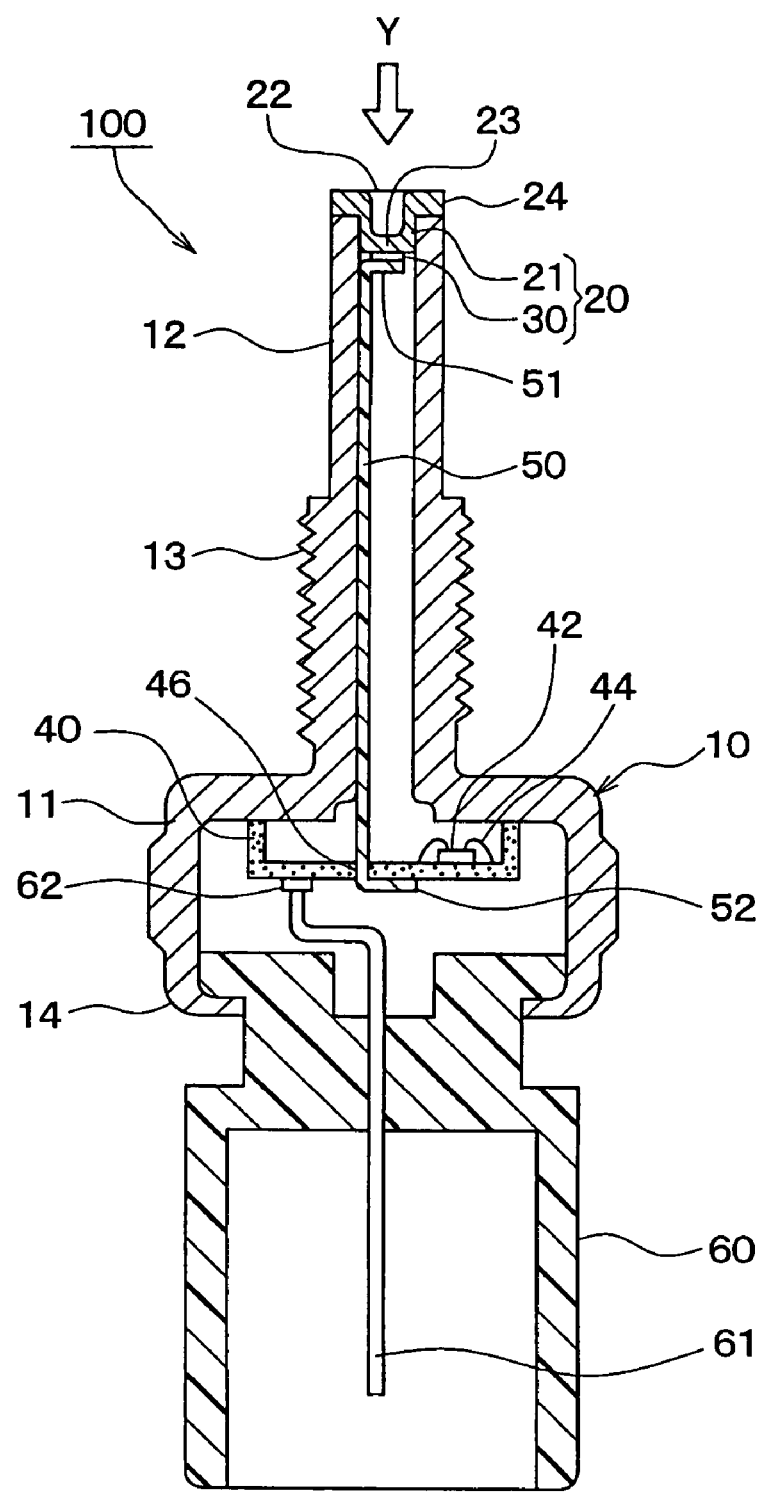
FIG. 1 is a cross sectional view showing pressure detecting apparatus according to a first embodiment of the present invention.
Figure 2:
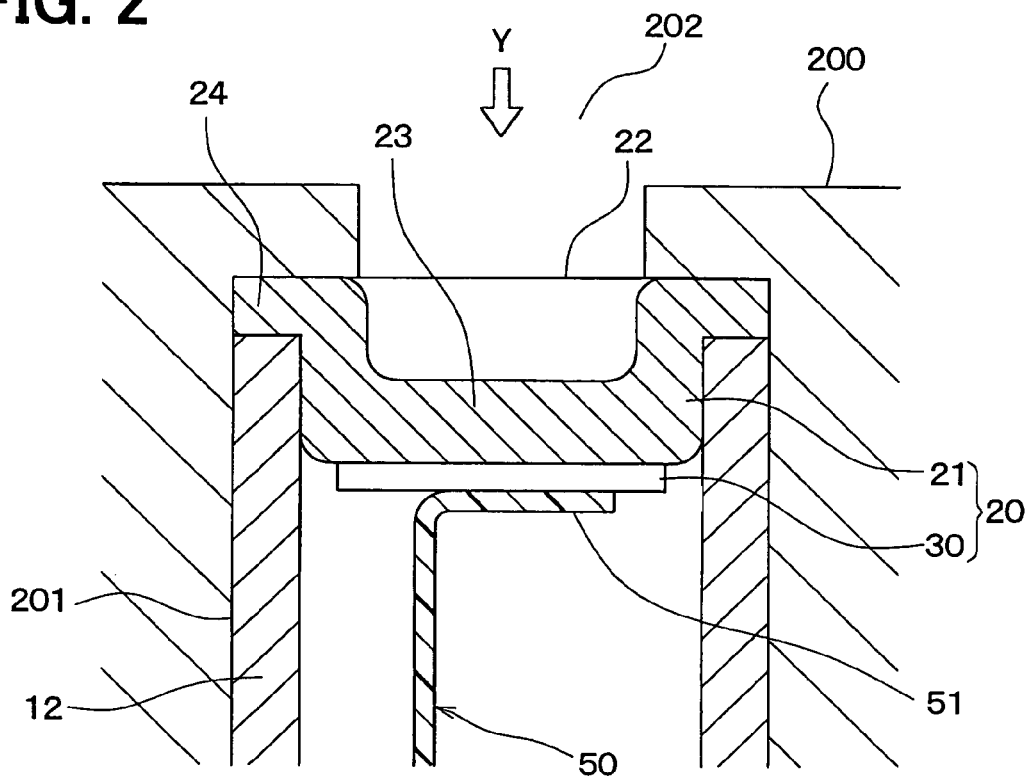
FIG. 2 is a partially enlarged cross sectional view showing a top end of the apparatus shown in FIG. 1.

FIG. 1 is a sectional view for schematically showing an entire structure of a pressure detecting apparatus 100 according to a first embodiment of the present invention. Also, FIG. 2 is an enlarged view for representing a portion of FIG. 1, which is a top end of the apparatus 100. It should be noted that in FIG. 2, an engine block 200 is also represented.

Although usage of the pressure detecting apparatus 100 is not limited, this pressure detecting apparatus 100 may be applied as a combustion pressure sensor, while a pipe portion 12 of a housing 10 is mounted in a mounting hole 201 formed in, for example, an engine block 200 of an automobile as an object to be detected by way of a screw coupling manner (see FIG. 2). This combustion pressure sensor detects pressure (namely, internal cylinder pressure) within a combustion chamber 202 as a detecting pressure.

The housing 10 is constituted by a cylindrical main body portion 11 and the pipe portion 12. The pipe portion 12 having as elongated cylindrical shape is made narrower than the main body portion 11. Both of the main body portion 11 and the pipe portion 12 are made of a metal such as stainless steel, which has been processed by cutting, cold forging operation, and the like. In this first embodiment, the pipe portion 12 has a cylindrical pipe shape, for example, the outer diameter of which is 4 mm, and the inner diameter of which is 3 mm. Alternatively, the pipe portion 12 may have a rectangular pipe shape.

It should also be noted that in the housing 10, the main body portion 11 and the pipe portion 12 may be formed in an integral body. Alternatively, the main body portion 11 and the pipe portion 12 may be separately formed, and thereafter, both of these portions 11 and 12 may be joined with each other to be formed in an integral body by way of welding, adhering, press-fitting, screw coupling, caulking etc.

Also, a screw portion 13 has been formed on an outer peripheral plane of the pipe portion 12 in the housing 10. The screw portion 13 can be screw-coupled to the above-described engine block 200 functioning as the object to be detected. As previously explained, the pressure detecting apparatus 100 of this first embodiment has been arranged in such a manner that the housing 10 is provided with the pipe portion 12 having the elongate shape, while the pipe portion 12 is projected from one edge side of this housing 10.

In this case, the pipe portion 12 of the housing 10 is inserted into the mounting hole 201, and is mounted via the screw portion 13. The mounting hole 201 has been formed in the engine block 200 as a screw hole. As a result, the pressure detecting apparatus 100 is mounted on the engine block 200.

Then, under such a condition that this pressure detecting apparatus 100 is mounted on the engine block 200, pressure (namely, internal cylinder pressure) within the combustion chamber 202 as detecting pressure is applied to the tip portion of the pipe portion 12 as indicated by an arrow "Y" in FIG. 1 and FIG. 2 in a reverse printing manner.

Also, a pressure sensitive element 20 has been provided on the tip portion of the pipe portion 12 in the housing 10. The pressure sensitive element 20 outputs a signal in response to detected pressure. In this case, as represented in FIG. 2, the pressure sensitive element 20 has been arranged under environment of detected pressure, namely, arranged in such a manner that the pressure sensitive element 20 is exposed to the combustion chamber 202. Thus, the above-described internal cylinder pressure as the detecting pressure may be directly applied to the pressure sensitive element 20.

This pressure sensitive element 20 owns strain gauge function. The strain gauge function may output a signal in response to detected pressure based upon strain caused by the detected pressure.

Concretely speaking, as shown in FIG. 2, the pressure sensitive element 20 is constituted by a metal stem 21 having a hollow cylindrical shape, and a strain gauge 30. One edge side of this metal stem 21 is an opening portion 22, and the other edge side thereof is a diaphragm 23. The strain gauge 30 has been provided on a surface of the diaphragm 23 of this metal stem 21 by way of glass welding, or the like.

The metal stem 21 is such a metal member, which has been processed so as to have the hollow cylindrical shape. A flange 24 has been formed on an opening edge portion of the opening portion 22, while this flange 24 is projected along a direction perpendicular to a circumferential plane thereof. In this first embodiment, the hollow portion of the metal stem 21 has a cylindrical shape. Alternatively, this hollow portion may have a rectangular cylindrical shape.

Then, the metal stem 21 has been inserted into the pipe portion 12 in such a manner that the diaphragm-sided portion 23 of this metal stem 21 is directed to the inner portion of the pipe portion 12, and the opening portion-sided portion 22 thereof is directed to the combustion chamber portion 202. Then, the flange 24 of the metal stem 21 has been fixed to the opening edge portion of the tip portion of the pipe portion 12 by way of an adhering, or welding manner.

Alternatively, under such a condition that the pressure detecting apparatus 100 is mounted on the engine block 200, since the flange 24 of the metal stem 21 is sandwiched by the pipe portion 12 and the engine block 200 made of a metal such as aluminum, the metal stem 21 may be fixed under pressure welding condition.

As previously explained, in the metal stem 21, the opening portion 22 thereof is exposed to the combustion chamber 202, and the pressure of the combustion chamber 202 is applied to a rear surface of the diaphragm 23 of the metal stem 21.

Also, the strain gauge 30 provided on a front surface of the diagram 23 of the metal stem 21 is made of a silicon semiconductor chip in which, for example, a bridge circuit and the like has been formed. The strain gauge 30 owns such a function that when the diaphragm 23 of the metal stem 21 is deformed by receiving pressure, a change in resistance values produced in response to this deformation is converted into an electric signal, and then, this electric signal is outputted.

While the diaphragm 23 of the metal stem 21 and the strain gauge 30 are arranged as strain portions 23 and 30, which are strained by receiving weights produced by the detected pressure, these strain portions 23 and 30 may give an influence to basic performance of the pressure detecting apparatus 100.

In this case, as to metal materials which constitute the metal stem 21, high strengths of the metal materials are necessarily required since these metal materials receive high pressure, and also, low thermal expansion coefficients are necessarily required, since the strain gauge 30 made of a Si semiconductor and the like is joined to the metal stem 21 by low melting glass.

Concretely speaking, as the metal stem 21, while Fe, Ni, Co, or Fe, Ni are employed as a major material, a material to which Ti, Nb, Al, or Ti, Nb have been added as a precipation emphasizing material may be selected. For example, precipation hardening type stainless steel may be selected. This metal stem 21 may be formed by way of pressing, cutting, and cold forging operation.

Also, as shown in FIG. 1, a circuit board 40 manufactured by a ceramic substrate, or the like, has been provided inside the main body portion 11 of the housing 10. The circuit board 40 has been provided in such a manner that this circuit board 40 covers the opening portion of the pipe portion 12 in the main body portion 11. A peripheral portion of the circuit board 40 has been fixed on the housing 10 by way of, for example, an adhering manner.

An IC chip 42 has been adhered on a plane of the circuit board 40 so as to be mounted thereon. This plane is located opposite to the opening portion of the pipe portion 12. In this IC chip 42, such a circuit has been manufactured, which amplifies and adjusts an output signal from the strain gauge 30.

Then, this IC chip 42 has been electrically connected to the circuit board 40 by using a bonding wire 44 made of aluminum (Al). Further, as represented in FIG. 1 and FIG. 2, the circuit board 40 has been electrically connected to the above-explained pressure sensitive element 20 by employing a wiring member (flexible printed-circuit board: FPC) 50.

In this case, as the wiring member 50, the flexible printed-circuit board (FPC) 50 has been employed. Apparently, other members than FPC, for instance, a lead wire may be alternatively employed as the wiring member 50.

As the flexible printed-circuit board 50, such a general-purpose printed-circuit board may be employed which has been manufactured by patterning a conductor such as a copper (Cu) on a base, e.g., polyimide resin. As indicated in FIG. 1, this flexible printed-circuit board 50 has been arranged inside the pipe portion 12 of the housing 10 in such a manner that the flexible printed-circuit board 50 extends along the longitudinal direction of the pipe portion 12.

In this first embodiment, one edge portion 51 of the flexible printed-circuit board 50 has been electrically and mechanically joined with respect to the strain gauge 30 provided in the pressure sensitive element 20 by using solder, and the like.

Then, the flexible printed-circuit board 50 has been bent from one edge portion 51 of this flexible printed-circuit board 50, and a portion of this flexible printed-circuit board 50 which is located on the side of the other edge portion 52 thereof is elongated inside the pipe portion 12 along the direction of the circuit board 40. The above-described one edge portion 51 corresponds to the joint portion of the flexible printed-circuit board 50 to the pressure sensitive element 20.

On the other hand, the portion of the flexible printed-circuit board 50 on the side of the other edge portion 52 thereof is positioned at the main body portion 11 of the housing 10. Then, the other edge portion 52 of the flexible printed-circuit board 50 is positioned via a through hole 46 from a mounting plane of the circuit board 40, which mounts thereon the IC chip 42 to a plane of this circuit board 40, which is located opposite to the IC chip mounting plane. The through hole 46 is formed in the circuit board 40.

Then, the other edge portion 52 of the flexible printed-circuit board 50 has been electrically connected to the circuit board 40 on the plane of the circuit board 40, which is located opposite to the mounting plane of the IC chip 42 by way of solder, and the like.

Also, as shown in FIG. 1, in the housing 10, a connector case 60 having a terminal 61 has been provided at a position opposite to the connecting plane of the circuit board 40 with respect to the flexible printed-circuit board 50.

This connector case 60 is made of such a resin as PPS (polyphenylene salfide). The terminal 61 has been formed with the connector case 60 in an integral form by way of insert molding, and the like. This connector case 60 has been constructed as a connector portion capable of deriving a signal from the pressure sensitive element 20.

Then, the terminal 61 of the connector case 60 has been electrically connected to the circuit board 40 via a spring member 62 by way of a spring contact. As a result, the pressure sensitive element 20 has been electrically connected via both the flexible printed-circuit board 50 and the circuit board 40 to the connector case 60.

Also, since the edge portion 14 of the main body portion 11 of the housing 10 is caulked to the connector case 60, the connector case 60 has been fixed on the housing 10 in an integral manner. Then, the terminal 61 may be electrically connected via a wiring member (not shown) to an ECU of an automobile, and the like.

A description is made of one example as to a method for assembling the pressure detecting apparatus 100 having the above-explained structure. That is, one edge portion 51 of the flexible printed-circuit board 50 is firstly connected with respect to the pressure sensitive element 20 by way of solder, or the like. In the pressure sensitive element 20, the metal stem 21 and the strain gauge 30 have been formed in the integral body.

Next, the portion of the flexible printed-circuit board 50 on the side of the other edge portion 52 thereof is inserted from the tip portion of the pipe portion 12 of the housing 10, and then, the other edge portion 52 of the flexible printed-circuit board 50 is drawn out up to an internal portion of the main body portion 11 of the housing 10.

Subsequently, the other edge portion 52 of the flexible printed-circuit board 50 is penetrated through the through hole 46 of the circuit board 40, and is connected to the circuit board 40 by way of solder, or the like. The IC chip 42 has been mounted on this circuit board 40 by way of the wire bonding manner.

Next, the circuit board 40 is joined to the main body portion 11 of the housing 10 so as to be fixed on this main body portion 11. Thereafter, the connector case 60 is assembled to the main body portion 11 of the housing 10, and since the edge portion 14 of the housing 10 is caulked, the connector case 60 is fixed with the housing 10.

When this connector case 60 is assembled in the housing 10, the terminal 61 is contacted via the spring member 62 to the circuit board 40 in the spring contact manner so as to electrically connect the terminal 61 with the circuit board 40. As a result, the pressure detecting apparatus 100 shown in FIG. 1 may be accomplished in accordance with the above-explained manner.

Since the accomplished pressure detecting apparatus 100 is mounted via the screw portion 13 of the housing 10 in the screw hole 201, this pressure detecting apparatus 100 may be connected/fixed on the engine block 200. The screw hole 201 has been formed in the engine block 200 functioning as the object to be detected.

Then, when pressure (namely, internal cylinder pressure) within the combustion chamber 202 is applied to the diaphragm 23 of the pressure sensitive element 20 as indicated by the arrow "Y" in FIG. 1 and FIG. 2, the diaphragm 23 of the metal stem 21 is deformed by this applied pressure, and then, this deformation is converted into an electric signal by the strain gauge 30 so as to detect the pressure.

Then, the electric signal derived from the strain gauge 30 is transferred via the flexible printed-circuit board 50 to the circuit board 40, and is processed by the IC chip 42, and thereafter, the processed signal is outputted from the terminal 61 to an external unit.

On the other hand, according to this first embodiment, in the pressure detecting apparatus comprising: the housing 10; the pipe portion 12 having the elongate shape provided in the housing 10 in such a manner that the pipe portion 12 is projected from one edge side of the housing 10; and the pressure sensitive element 20 for outputting the signal in response to the detecting pressure, in which the detecting pressure is applied to the tip portion of the pipe portion 12, such a pressure detecting apparatus 100 is provided which is featured by that the pressure sensitive element 20 is provided on this tip portion of the pipe portion 12; the connector portion 60 for deriving the signal from the pressure sensitive element 20 is provided in the housing 10; and the wiring member 50 for electrically connecting the pressure sensitive element 20 to the connector portion 60 is stored inside the pipe portion 12.

In accordance with the pressure detecting apparatus 100, since such an arrangement is employed that the pressure sensitive element 20 has been provided on the tip portion of the pipe portion 12, the conventionally provided rod can be omitted.

More specifically in this first embodiment, the pressure sensitive element 20 has been arranged under the environment of the detecting pressure, namely, this pressure sensitive element 20 has been exposed to the combustion chamber 202. Thus, the detecting pressure is directly applied to the pressure sensitive element 20.

As previously explained, if the pressure detecting apparatus 100 is constituted by omitting the rod, then such a problem caused by this rod can be solved. That is, as to this problem, the resonant phenomenon of the rod occurs, and the pressure transferring precision is deteriorated.

Also, while the connector case 60 has been mounted on the housing 10 and this connector case 60 functions as the connector portion 60 for deriving the signal from the pressure sensitive element 20, this connector portion 60 is electrically connected to the pressure sensitive element 20 provided on the tip portion of the pipe portion 12 by employing the flexible printed-circuit board 50, so that there is no problem as to the output of the signal. The flexible printed-circuit board 50 has been stored inside the pipe portion 12 as the wiring member.

As a consequence, in accordance with this first embodiment, in such a pressure detecting apparatus 100 arranged by that the pressure sensitive element 20 is provided inside the housing 10 having the elongate-shaped pipe portion 12 which is projected from one edge side of the housing 10, and the connector portion 60 is provided in the housing 10, the adverse influence given to the sensor characteristic can be suppressed, which is caused by the elongate pipe portion and the rod stored in this elongate pipe portion.

Also, as shown in FIG. 1 and FIG. 2, in this first embodiment, under the mounting condition of the pressure detecting apparatus 100, as to the metal stem 21, only the flange 24 of this metal stem 21 is sandwiched by the engine block 200 and the pipe portion 12.

Since such a structure for sandwiching only the flange 24 within the metal stem 21 is employed, this structure can avoid that the metal stem 21 is deformed along the upper/lower directions shown in FIG. 2, namely the longitudinal direction of the metal stem 21. In other words, when the pressure detecting apparatus 100 is screwed so as to be mounted on the engine block 200, it is possible to avoid an occurrence of an abnormal output caused by screwing the pressure detecting apparatus 100.

Second Embodiment

Figure 3:
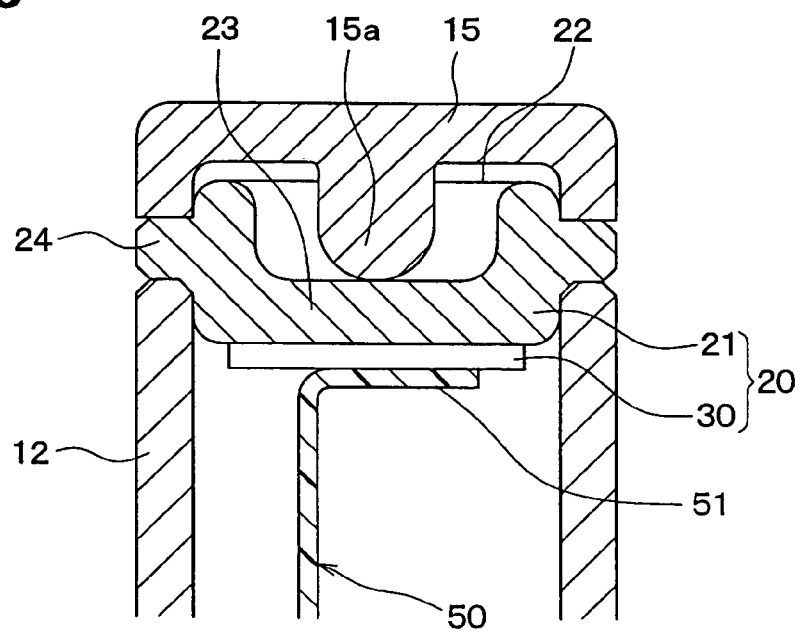
FIG. 3 is a partially enlarged cross sectional view showing a top end of pressure detecting apparatus according to a second embodiment of the present invention.

FIG. 3 is a sectional view for schematically indicating a major portion of a pressure detecting apparatus according to a second embodiment of the present invention. A different point of this pressure detecting apparatus from that of the first embodiment will now be mainly described.

In the above-described first embodiment, while the pressure sensitive element 20 has been arranged in such a manner that this pressure sensitive element 20 is exposed under the environment of the detecting pressure, the detecting pressure has been directly applied to the pressure sensitive element 20.

In contrast to the first embodiment, in the pressure detecting apparatus of this second embodiment, as indicated in FIG. 3, a diaphragm 15 has been provided on the tip portion of the pipe portion 12 in the housing 10 in such a manner that this diaphragm 15 covers the pressure sensitive element 20. Thus, detecting pressure may be applied via this diaphragm 15 to the pressure sensitive element 20.

It should be understood that this diaphragm 15 will be referred to as "pressure-receiving-purpose diaphragm 15" hereinafter in order that this pressure-receiving-purpose diaphragm 15 may be discriminated from the above-explained diaphragm 23 of the metal stem 21.

In particular, in this second embodiment, the pressure-receiving-purpose diaphragm 15 is directly made contact to the pressure sensitive element 20. Concretely speaking, as shown in FIG. 3, a convex portion 15a which is projected along the direction of the pressure sensitive element 20 has been formed on the pressure-receiving-purpose diaphragm 15, and a tip portion projected from this convex portion 15a has been contracted to the rear plane of the diaphragm 23 of the metal stem 21.

In this case, the pressure-receiving-purpose diaphragm 15 is made in, for example, a disk shape, and the convex portion 15a has a shape similar to a "navel" which is located at a center position of this circle. Also, since the peripheral portion of the pressure-receiving-purpose diaphragm 15 is joined to the flange 24 of the metal stem 21 by way of welding so as to be fixed on this flange 24, this pressure-receiving-purpose diaphragm 15 has been formed with the pressure sensitive element 20 in an integral body.

The pressure detecting apparatus of this second embodiment can be manufactured as follows: That is, with respect to the pressure sensitive element 20 formed with the pressure-receiving-purpose diaphragm 15 in the integral body, one edge portion 51 of the flexible printed-circuit board 50 is connected by way of solder, or the like. Thereafter, a manufacturing method similar to that of the first embodiment is carried out so as to manufacture the above-explained pressure detecting apparatus of this second embodiment.

Then, in a pressure detecting operation of this second embodiment, when pressure (internal cylinder pressure) within the combustion chamber 202 is applied to the pressure-receiving-purpose diaphragm 15, this weight is applied from the convex portion 15a of the pressure-receiving-purpose diaphragm 15 to the diaphragm 23 of the metal stem 21. Then, a deformation of the diaphragm 23 of the metal stem 21 is converted into an electric signal by the strain gauge 30 in order to detect pressure.

On the other hand, in accordance with this second embodiment, such a pressure detecting apparatus is provided which is featured by that the pressure sensitive element 20 is provided on the tip portion of the pipe portion 12; the connector portion 60 is provided on the housing 10; the wiring member 50 for electrically connecting the pressure sensitive element 20 to the connector portion 60 is stored inside the pipe portion 12; and further, the pressure-receiving-purpose diaphragm 15 is provided on the tip portion of the pipe portion 12 in a such a manner that this diaphragm 15 covers the pressure sensitive element 20; so that the detecting pressure is applied via the pressure-receiving-purpose diaphragm 15 to the pressure sensitive element 20.

In accordance with this pressure detecting apparatus, similar to the above-explained embodiment, the adverse influence given to the sensor characteristic can be suppressed, which is caused by the elongate pipe portion and the rod stored in this elongate pipe portion. Also, in this second embodiment, while the convex portion 15a is provided on the pressure-receiving-purpose diaphragm 15, this pressure-receiving-purpose diaphragm 15 is directly made contact to the pressure sensitive element 20, so that this pressure detecting apparatus can be arranged by omitting the rod.

Figure 4:
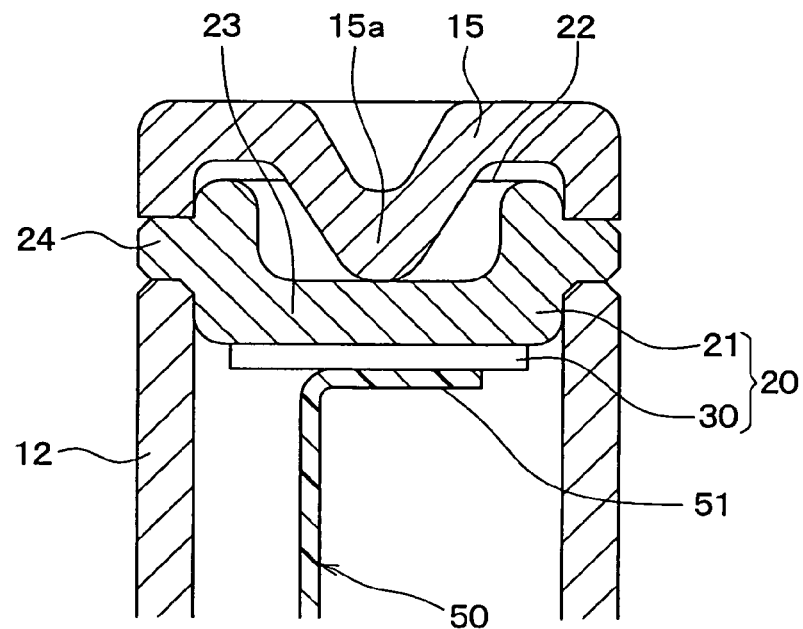
FIG. 4 is a partially enlarged cross sectional view showing a top end of pressure detecting apparatus according to a modification of the second embodiment.

Now, FIG. 4 is a sectional view for schematically indicating a modification of this second embodiment. In FIG. 3, the convex portion 15a of the pressure-receiving-purpose diaphragm 15 has been formed by way of a cutting process or the like. In contrast, in a pressure-receiving-purpose diaphragm 15 shown in FIG. 4, a convex portion 15a has been manufactured by conceiving a diaphragm plane having a flat plate shape by way of a pressing process, so that this convex portion 15a may be formed in a simple manner.

Third Embodiment

Figure 5:
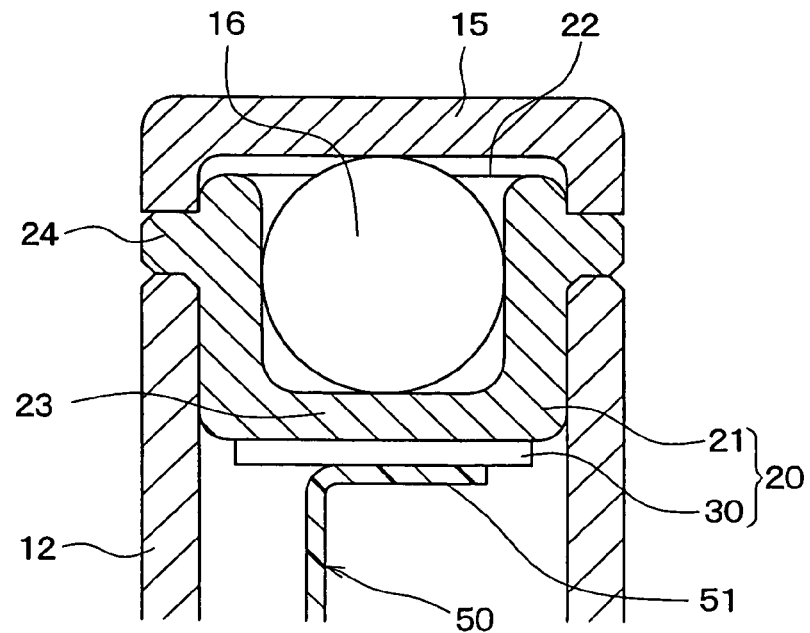
FIG. 5 is a partially enlarged cross sectional view showing a top end of pressure detecting apparatus according to a third embodiment of the present invention.

FIG. 5 is a sectional view for schematically indicating a major portion of a pressure detecting apparatus according to a third embodiment of the present invention. A different point of this pressure detecting apparatus from that of the above-described embodiment will now be explained.

As shown in FIG. 5, also in this third embodiment, similar to the above-described second embodiment, the pressure-receiving-purpose diaphragm 15 is provided on the tip portion of the pipe portion 12 in such a manner that this diaphragm 15 covers the pressure sensitive element 20, so that detecting pressure is applied via the pressure-receiving-purpose diaphragm 15 to the pressure sensitive element 20.

In accordance with the pressure detecting apparatus of the above-described second embodiment, while the convex portion 15a has been provided on the pressure-receiving-purpose diaphragm 15, this pressure-receiving-purpose diaphragm 15 has been directly made contact to the pressure sensitive element 20, so that this pressure detecting apparatus can be arranged by omitting the rod.

In contrast to the second embodiment, in this third embodiment, as shown in FIG. 5, one piece of a pressure transferring member 16 is interposed between the pressure-receiving-purpose diaphragm 15 and the pressure sensitive element 20. Then, detecting pressure is applied from the pressure-receiving-purpose diaphragm 15 via the pressure transferring member 16 to the pressure sensitive element 20.

In accordance with this third embodiment, since the pressure sensitive element 20 is provided on the tip portion of the pipe portion 12, a distance between the pressure-receiving-purpose diaphragm 15 and the pressure sensitive element 20 can be made as short as possible, and thus, such an arrangement that the pressure transferring member 16 (namely, rod) is shortened can be realized. As a result, the above-explained resonance problem caused by prolonging the rod, and such a problem that the rod itself is deformed can be suppressed as being permitted as possible.

As the pressure transferring member 16 employed in this third embodiment, a rod-shaped member which is similar to the rod of the conventional pressure detecting apparatus may be employed. More specifically, in the example shown in FIG. 5, a spherical-shaped member 16 has been employed as the pressure transferring member 16.

In the case of this specific arrangement, as to the spherical-shaped member 16 functioning as the pressure transferring member, both a plane of this spherical-shaped member 16 which is contacted to the pressure-receiving-purpose diaphragm 15, and another plane thereof which is contacted to the pressure sensitive element 20 (namely, diaphragm 23 of metal stem 21) constitute spheres.

That is to say, according to this third embodiment, with respect to the pressure detecting apparatus in which the pressure sensitive element 20 is provided on the tip portion of the pipe portion 12; the connector portion 60 is provided on the housing 10; the wiring member 50 is stored in the pipe portion 12; and further, the pressure-receiving-purpose diaphragm 15 is provided on the tip portion of the pipe portion 12 in such a manner that this pressure-receiving-purpose diaphragm 15 covers the pressure sensitive element 20, such a pressure detecting apparatus may be provided which is featured by that one piece of the pressure transferring member 16 is interposed between the pressure-receiving-purpose diaphragm 15 and the pressure sensitive element 20, while the planes of this pressure transferring member 16 which are contacted to both the diaphragm 15 and the element 20 constitute the spheres.

Similar to the above-described embodiment, in accordance with this pressure detecting apparatus, the adverse influence given to the sensor characteristic can be suppressed, which is caused by the elongate pipe portion and the rod stored in this elongate pipe portion.

Also, in this third embodiment, the contacts between the pressure-receiving-purpose diaphragm 15 and the pressure sensitive element 20, and the pressure transferring member 16 can be set as stable point contacts. Further, a total contact number between the pressure-receiving-purpose diaphragm 15 and the pressure sensitive element 20, and the pressure transferring member 16 can be reduced.

As a consequence, the changes of the contact conditions between the pressure-receiving-purpose diaphragm 15 and the pressure sensitive element 20, and the pressure transferring member 16 can be suppressed as minimum as possible, the stable contact conditions can be secured in the respective contact portions, and also, deteriorations of the pressure transfer precision can be suppressed.

In specifically, in the example shown in FIG. 5, the pressure transferring member 16 corresponds to the spherical member 16. In this case, the spherical member 16 functioning as the pressure transferring member can be hardly deformed, as compared with the rod of the prior art. As a result, the stable contact conditions between this spherical member 16, and the pressure-receiving-purpose diaphragm 15 and the pressure sensitive element 20 can be preferably maintained under suitable contact conditions.

It should also be noted that this spherical member 16 may not be a complete spherical shape, and may be alternatively replaced by a slightly elliptical sphere, or a "Rugby ball" shape. Also, as the pressure transferring member 16 whose contact planes with respect to the pressure-receiving-purpose diaphragm 15 and the pressure sensitive element 20 become the spherical planes, the invention is not limited only to a spherical-shaped member. For instance, both the contact planes may be made of spherical planes, but an intermediate portion between both the spherical contact planes may be made of a pillar shape.

Fourth Embodiment

Figure 6A:
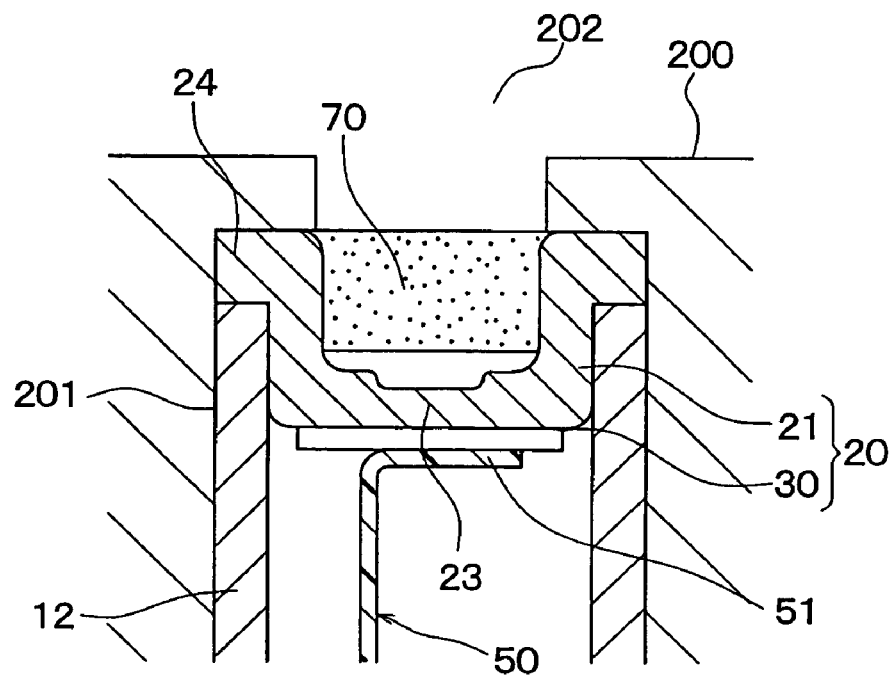
FIG. 6A is a partially enlarged cross sectional view showing a top end of pressure detecting apparatus according to a fourth embodiment of the present invention.
Figure 6B:
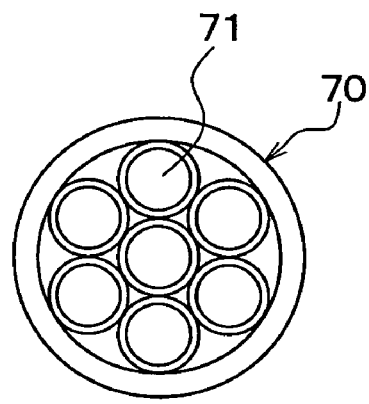
FIG. 6B is an upper plan view and FIG. 6C is a vertical cross sectional view showing a heat radiation member in the apparatus in FIG. 6A.
Figure 6C:
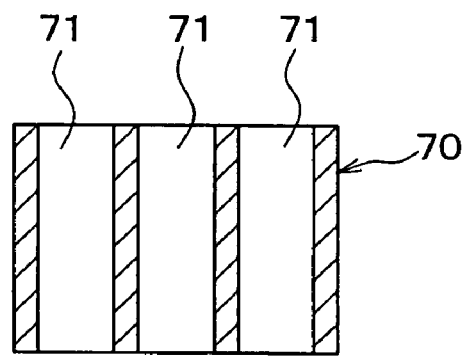

FIG. 6A is a sectional view for schematically showing a major portion of a pressure detecting apparatus according to a fourth embodiment of the present invention. FIG. 6B and FIG. 6C are a plan view and a longitudinal sectional view for representing an upper portion of a heat radiation member 70 shown in FIG. 6A.

As previously explained, in a related art, the detecting pressure is applied via the elongate-shaped rod to the pressure sensitive element. As a result, the pressure sensitive element is arranged in such a manner that this pressure sensitive element is separated from the pressure detecting environment such as the engine combustion chamber in order to reduce the temperature of the pressure sensitive element.

To the contrary, in the above-described respective embodiments of the invention, the pressure sensitive element 20 is provided on the tip portion of the pipe portion 12, which is located close to the pressure detecting environment, so that the temperature of the pressure sensitive element 20 may be easily increased.

As a consequence, in this fourth embodiment, as indicated in FIG. 6A to FIG. 6C, a heat radiation member 70 is arranged in such a manner that this heat radiation member 70 is contacted to the pressure sensitive element 20. This heat radiation member 70 is made of a material having a superior heat resisting characteristic and a superior heat radiating characteristic such as aluminum and stainless steel. In this example, a honeycomb-shaped member having a through hole 71 is employed which is used in a heat exchanger.

While the heat radiation member 70 has been stored from the opening portion 22 of the metal stem 21 into a hollow portion, this heat radiation member 70 has been fixed with respect to the metal stem 21 in such a manner that the heat radiation member 71 is connected to, for example, in inner peripheral plane of the metal stem 21 by way of welding, or solder.

In accordance with this fourth embodiment, since heat of the pressure sensitive element 20 is radiated through the heat radiation member 70, the temperature reduction of the pressure sensitive element 20 can be preferably improved.

The through hole 71 formed in the heat radiation member 70 may contribute that a relative surface area of the heat radiation member 70 is increased so as to improve the heat radiating characteristic. In addition, detecting pressure may be conducted via this through hole 71 to the diaphragm 23 of the metal stem 21. In other words, since this through hole 71 is formed, it is possible to avoid that the pressure conduction to the pressure sensitive element 20 is blocked.

Also, as indicated in FIG. 6A, both the heat radiation member 70 and the strain portion 23 of the pressure sensitive element 20 have a space.

Concretely speaking, in the pressure sensitive element 20, the diaphragm 23 corresponding to the strain portion has been constructed as a concaved plane of an inner plane of the metal stem 21 in such a manner that a lower plane of the heat radiation member 70 is not contacted to the diaphragm 23. As a result, a strain deformation of the diaphragm 23 is not blocked by the heat radiation portion 70.

Also, in the example shown in FIG. 6A, under such a condition that the pressure detecting apparatus is mounted on the engine block 200, the flange 24 of the metal stem 21 is directly contacted to the engine block 200. There is another effect that the metal stem 21 may be cooled by cooling water which flows through this engine block 200.

In the example shown in FIG. 6A to FIG. 6C, the heat radiation member 70 has been provided in such an arrangement that the pressure sensitive element 20 is exposed under the environment of the detecting pressure and a pressure-receiving-purpose diaphragm is omitted. Alternatively, even in such a case that the pressure-receiving-purpose diaphragm 15 as explained in the second and third embodiments is provided, for instance, the heat radiation member 70 may be interposed between the pressure-receiving-purpose diaphragm 15 and the pressure sensitive element 20.

Fifth Embodiment

As explained in the respective embodiments of the invention, in such a case that the pressure sensitive element 20 is provided on the tip portion of the elongate pipe portion 12, the size of the pressure sensitive element 20 must be made smaller than that of the prior art.

As described in the above-explained embodiments, in such a case that the pressure sensitive element 20 owns the strain gauge function, namely, has the strain portions 23 and 30 which are strained by receiving the weight, if the size of this pressure sensitive element 20 is decreased, then the areas of the strain portions 23 and 30 are also decreased, namely, both the area of the diaphragm 23 of the metal stem 21 and the area of the strain gauge 30 are also reduced.

As a consequence, there are some possibilities that lowering of sensitivity may occur. Accordingly, an increase of the weight which is applied to the pressure sensitive element 20 is required. This fifth embodiment has been made in order to increase the weight applied to the pressure sensitive element 20.

This fifth embodiment has been arranged as follows: That is, as indicated in such arrangement of the second embodiment and the third embodiment shown in FIG. 3 to FIG. 5, a pressure-receiving-purpose diaphragm 15 is provided on the tip portion of the pipe portion 12 in such a manner that this diaphragm 15 covers the pressure sensitive element 20, and this pressure-receiving-purpose diaphragm 15 has a circular shape.

In this case, detecting pressure is applied from the above-described convex portion 15a (see FIG. 3 and FIG. 4) of the pressure-receiving-purpose diaphragm 15, or the pressure-receiving-purpose diaphragm 15 via the pressure transferring member 16 to the strain portions 23 and 30 of the pressure sensitive element 20.

Then, in this fifth embodiment, in such an arrangement, an area of a contact portion in the strain portions 23 and 30 of the pressure element 20 with respect to the pressure-receiving-purpose diaphragm 15 is made smaller than, or equal to ¼ of the area of the pressure-receiving-purpose diaphragm 15.

Concretely speaking, in the examples shown in FIG. 3 to FIG. 5, the area of the contact portion in the strain portions 23 and 30 of the pressure element 20 with respect to the pressure-receiving-purpose diaphragm 15 corresponds to a portion within the rear plane of the diaphragm 23 of the metal stem 21, to which the convex portion 15a of the pressure-receiving-purpose diaphragm 15 is contacted, or another portion where the pressure-receiving-purpose diaphragm 15 is contacted via the pressure transferring member 16.

Then, an area of this contact portion corresponds to an area of a portion within the rear plane of the diaphragm 23 of the metal stem 21, to which the projected tip portion of the convex portion 15a is contacted, or another area of a portion to which the pressure transferring member 16 is contacted.

In such an arrangement, even when pressure applied to the pressure-receiving-purpose diaphragm 15 is equal to each other, if the area of the pressure-receiving-purpose diaphragm 15 is increased, large weight may be obtained. Then, since this weight is applied to a narrow area of the diaphragm 23 of the metal stem 21, this weight may be transferred as the large weight.

In accordance with the analysis result obtained by executing FEM (finite element method) by the Inventors of the invention, in the case of the pressure-receiving-purpose diaphragm 15 having the circular shape, a weight transfer efficiency of a spring is approximately 25%.

As a result, since the area of the above-described contact portion in the diaphragm 23 of the metal stem 21 is made smaller than, or equal to ¼ with respect to the area of the pressure-receiving-purpose diaphragm 15 having the circular shape, high pressure may be applied to the diaphragm 23 of the metal stem 21, namely the pressure sensitive element 20.

This fact will now be explained in a more concrete manner by employing formulae. It is so assumed that a radius of the pressure-receiving-purpose diaphragm 15 is defined as "r", and detecting pressure having a magnitude of "a" in MPa is applied to this pressure-receiving-purpose diaphragm 15.

In this case, the area of the pressure-receiving-purpose diaphragm 15 is "$\pi r^2$", and weight "F" given to the pressure-receiving-purpose diaphragm 15 is $F = a \times \pi r^2$. Also, in the case that the area of the contact portion in the diaphragm 23 of the metal stem 21 is made equal to ¼ with respect to the area of the pressure-receiving-purpose diaphragm 15, this area is equal to ¼ ($\pi r^2$).

Then, assuming now that the pressure applied to the contact portion in the diaphragm 23 of the metal stem 21 is "B" in MPa, weight "f" applied to this contact portion is given by $f = B \times (\pi r^2/4)$. In this case, since a weight converting efficiency of the circular-shaped diaphragm 15 is approximately 25%, F=f/4, namely, $(\frac{1}{4}) \times a \times \pi r^2 = B \times (\pi r^2/4)$.

In other words, in such a case that the area of the above-described contact portion in the diaphragm 23 of the metal stem 21 is made equal to ¼ with respect to the area of the pressure-receiving-purpose diaphragm 15, B=a, so that there is no change in the pressure applied between the pressure-receiving-purpose diaphragm 15 and the diaphragm 23 of the metal stem 21.

Furthermore, in such a case that the area of the above-described contact portion in the diaphragm 23 of the metal stem 21 is made smaller than, or equal to ¼ with respect to the area of the pressure-receiving-purpose diaphragm 15, the pressure "B" applied to the diaphragm 23 of the metal stem 21 becomes higher than the pressure "a" applied to the pressure-receiving-purpose diaphragm 15. As a result, the application of the weight may be concentrated to the pressure sensitive element 20.

As previously explained, according to this fifth embodiment, such a pressure detecting apparatus may be provided in which the pressure sensitive element 20 is provided on the tip portion of the pipe portion 12; the connector portion 60 is provided on the housing 10; the wiring member 50 is stored in the pipe portion 12; and further, the pressure-receiving-purpose diaphragm 15 is provided on the tip portion of the pipe portion 12 in such a manner that this pressure-receiving-purpose diaphragm 15 covers the pressure sensitive element 20; the pressure sensitive element 20 owns the strain portions 23 and 30 which are strained by receiving the weight from the pressure-receiving-purpose diaphragm 15; and the area of the contact portion in the strain portions 21 and 30 of the pressure sensitive element 20 with the pressure-receiving-purpose diagram 15 is made smaller than, or equal to ¼ with respect to the area of the pressure-receiving-purpose diaphragm 15.

In accordance with the above-described pressure detecting apparatus, as previously explained, the force which is received by the pressure-receiving-purpose diaphragm 15 can be directly applied, or the higher force than this received force can be applied to the strain portions 23 and 30 of the pressure sensitive element 20. Similar to the above-explained embodiments, the pressure detecting apparatus can suppress the adverse influence given to the sensor characteristic, which is caused by the elongate pipe portion and the rod stored in this elongate pipe portion, and further, can secure the sufficiently high sensor sensitivity.

It should be understood that the above embodiments owns the following major structure. That is, in the pressure detecting apparatus comprising: the housing 10; the pipe portion 12 having the elongate shape provided in the housing 10 in such a manner that the pipe portion 12 is projected from one edge side of the housing 10; and the pressure sensitive element 20 for outputting the signal in response to the detecting pressure, in which the detecting pressure is applied to the tip portion of the pipe portion 12, such a major structure is featured by that the pressure sensitive element 20 is provided on the tip portion of the pipe portion 12; the connector portion 60 is provided in the housing 10; and the wiring member 50 for electrically connecting the pressure sensitive element 20 to the connector portion 60 is stored inside the pipe portion 12; and other structural portions may be properly changed.

As apparent from the foregoing descriptions, the pressure detecting apparatus of the invention is not limited to be utilized as the above-explained combustion pressure sensor for detecting the pressure (internal cylinder pressure) within the combustion chamber.

Sixth Embodiment

The inventors have tried to arrange such a construction that in pressure detecting apparatus, the pressure sensitive element is located closer to the pressure detecting environment in order to improve the sensitivity.

Normally, in this sort of pressure detecting apparatus, signal processing units such as a connector unit for deriving a signal from the pressure sensitive element are provided in the housing. Conventionally, the pressure sensitive element is electrically connected to these signal processing units by using a wire bonding technique.

However, in the case that the pressure sensitive element is located closer to the pressure detecting environment side, the pressure sensitive element is arranged on the tip portion side of the pipe portion in the housing, so that the distance between the pressure sensitive element and the signal processing unit becomes long. As a result, in the case that the pressure sensitive element is electrically connected to the signal processing unit, this electrical connection cannot be realized by way of such a wire bonding technique.

Then, the inventors of the invention have employed a flexible printed-circuit board as a connection member in such a case that the pressure sensitive element is connected to the signal processing unit which is located far from this pressure sensitive element, while the Inventors have considered an easy handling characteristic, a compactness, and an easy connecting characteristic.

Figure 12:
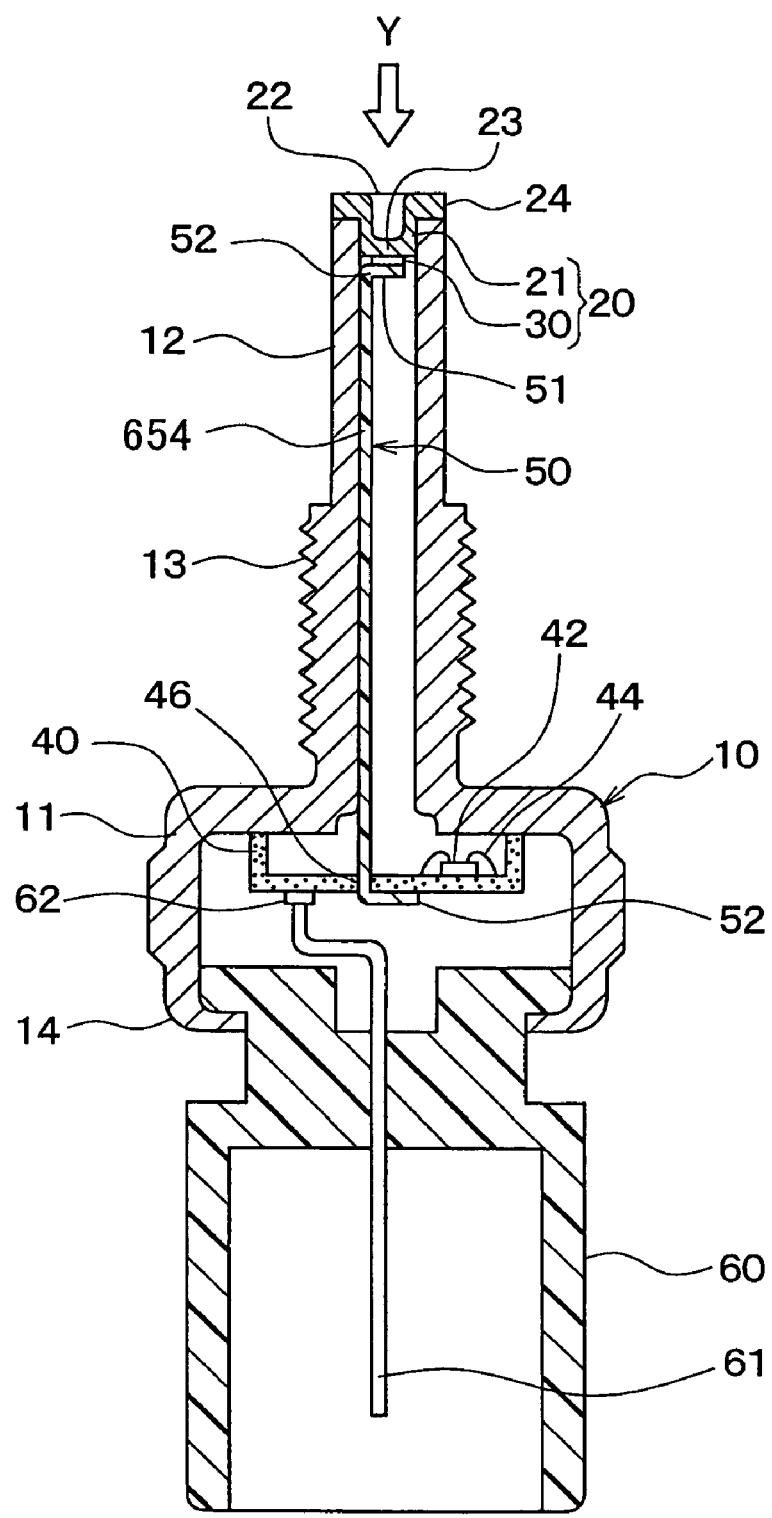
FIG. 12 is a cross sectional view showing pressure detecting apparatus according to a comparison of the sixth embodiment.

While the inventors of the invention have considered the following technical points, the Inventors have tried to manufacture such a pressure detecting apparatus as shown in FIG. 12. As the technical points, the pressure sensitive element is arranged on the tip portion of the pipe portion in the housing; and the flexible printed-circuit board is employed in order to connect the pressure sensitive element to the signal processing unit containing the connector unit.

FIG. 12 is a sectional view for schematically indicating an entire structure of the pressure detecting apparatus as a prototype model manufactured by the inventors.

Although usage of the pressure detecting apparatus is not limited, this pressure detecting apparatus may be applied as a combustion pressure sensor, while a pipe portion 12 of a housing 10 is mounted in a mounting hole formed in, for example, an engine block of an automobile by way of a screw coupling manner. This combustion pressure sensor detects pressure (namely, internal cylinder pressure) within a combustion chamber.

The housing 10 made of a metal is constituted by a cylindrical-shaped main body portion 11, and a pipe portion 12 having an elongate cylindrical shape which is narrower than this main body portion 11. A screw portion 13 has been formed on an outer peripheral plane of the pipe portion 12 in the housing 10. The screw portion 13 can be screw-coupled to the above-explained engine block.

In this case, in the pressure detecting apparatus, detecting pressure is applied to the tip portion of the pipe portion 12 as indicated by an arrow "Y" in FIG. 12 in a reverse printing manner.

Also, a pressure sensitive element 20 has been provided on the tip portion of the pipe portion 12 in the housing 10. The pressure sensitive element 20 outputs a signal in response to detected pressure. In this case, the pressure sensitive element 20 has been arranged under environment of detected pressure. Thus, the above-described internal cylinder pressure as the detecting pressure may be directly applied to the pressure sensitive element 20.

This pressure sensitive element 20 owns a strain gauge function. The strain gauge function may output a signal in response to, for example, detected pressure based upon strain caused by the detected pressure.

Concretely speaking, as shown in FIG. 12, the pressure sensitive element 20 is constituted by a metal stem 21 having a hollow cylindrical shape, and a strain gauge 30. One edge side of this metal stem 21 is an opening portion 22, and the other edge side thereof is a diaphragm 23. The strain gauge 30 has been provided on a surface of the diaphragm 23 of this metal stem 21.

In this metal stem 21, while the opening portion 22 is exposed to the detecting environment, detecting pressure is applied from this opening portion 22 to a rear plane of a diaphragm 23 of the metal stem 21. Then, when the diaphragm 23 of the metal stem 21 is deformed by pressure, an electric signal may be outputted from the strain gauge 30 in response to this deformation.

Also, as shown in FIG. 12, a circuit board 40 has been provided inside the main body portion 11 of the housing 10. An IC chip 42 has been adhered on one plane of the circuit board 40 so as to be mounted thereon. In this IC chip 42, such a circuit is provided which processes an output signal from the strain gauge 30.

Then, this IC chip 42 has been electrically connected to the circuit board 40 via a bonding wire 44. Further, the circuit board 40 has been electrically connected to the above-explained pressure sensitive element 20 by employing a flexible printed-circuit board 50. This flexible printed-circuit board 50 has been arranged inside the pipe portion 12 of the housing 10 in such a manner that the flexible printed-circuit board 50 is elongated along the longitudinal direction of the pipe portion 12.

In this pressure detecting apparatus, one edge portion 51 of the flexible printed-circuit board 50 has been electrically joined with respect to the strain gauge 30. Then, the flexible printed-circuit board 50 has been bent from one edge portion 51 as a joint portion and a portion 54 located on the side of the other edge portion 52 rather than the bending portion 653 is elongated inside the pipe portion 12 along the direction of the circuit board 40.

On the other hand, the portion of the flexible printed-circuit board 50 on the side of the other edge portion 52 thereof is positioned at the main body portion 11 of the housing 10. Then, this other edge portion 52 of the flexible printed-circuit board 50 is positioned via a through hole 46 from a mounting plane of the circuit board 40, which mounts thereon the IC chip 42, to a plane of this circuit board 40, which is located opposite to the IC chip mounting plane. The through hole 46 is formed in the circuit board 40.

Then, the other edge portion 52 of the flexible printed-circuit board 50 has been electrically connected to the circuit board 40 on the plane of the circuit board 40, which is located opposite to the mounting plane of the IC chip 42 by way of solder, and the like.

Also, in the housing 10, a connector case 60 having a terminal 61 has been provided at a position opposite to the connecting plane of the circuit board 40 with respect to the flexible printed-circuit board 50. This connector case 60 has been constructed as a connector portion capable of deriving a signal from the pressure sensitive element 20.

Then, the terminal 61 of the connector case 60 has been electrically connected to the circuit board 40 via a spring member 62 by way of a spring contact. As a result, the pressure sensitive element 20 has been electrically connected via both the flexible printed-circuit board 50 and the circuit board 40 to the connector case 60, namely the connector portion 60.

In accordance with the pressure detecting apparatus shown in FIG. 12, since such an arrangement is employed that the pressure sensitive element 20 has been provided on the tip portion of the pipe portion 12, the conventionally provided rod can be omitted the length of the rod can be made as short as possible.

As previously explained, in the pressure detecting apparatus shown in FIG. 12, the electrical connection from the present sensitive element 20 located at the tip portion of the pipe portion 12 to the connector portion 60 is realized by employing the flexible printed-circuit board 50.

Figure 13A:
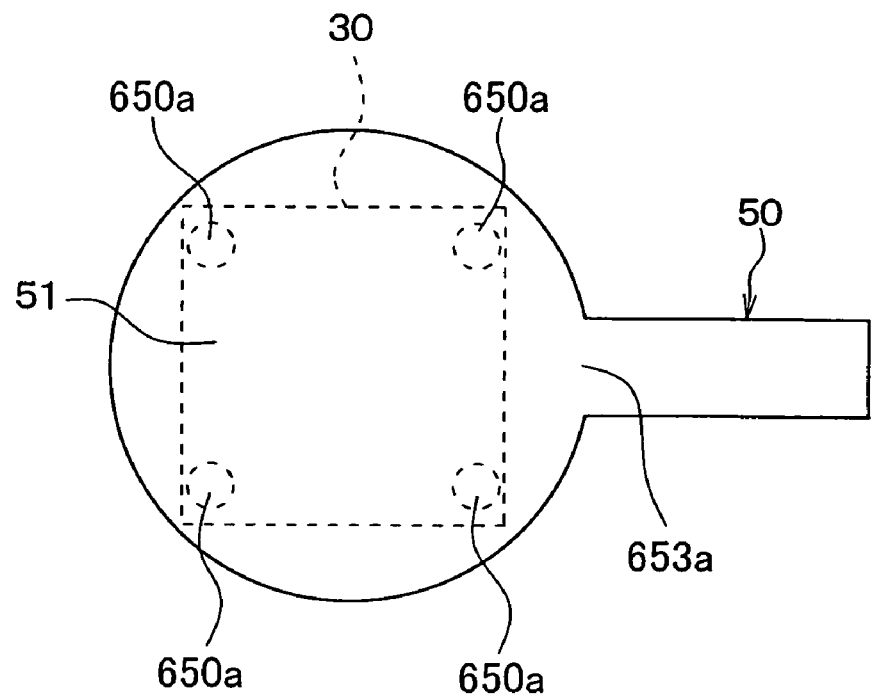
FIG. 13A is a plan view showing connection of a printed circuit board before the board is bent.
Figure 13B:
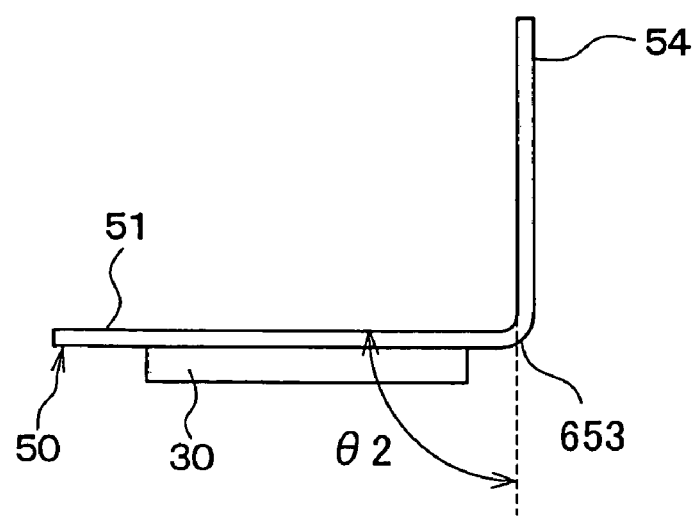
FIG. 13B is a side view showing the connection of the board after the board is bent, according to the comparison of the sixth embodiment.

FIG. 13A and FIG. 13B are diagrams for indicating a detailed joint of the flexible printed-circuit board 50. FIG. 13A is a plan view for showing such a condition before the flexible printed-circuit board 50 is bent. FIG. 13B is a side view for indicating such a condition after the flexible printed-circuit board 50 has been bent, namely such a condition that the flexible printed-circuit board 50 has been assembled to the pressure detecting apparatus.

As indicated in FIG. 13A, after one edge portion 51 of the flexible printed-circuit board 50 has been connected via a joint member 650a such as solder with respect to the strain gauge 30 of the pressure sensitive element 20, the other edge portion 52 thereof is inserted into the pipe portion 12. As a result, the portion 53a is bent as represented in FIG. 13B.

In this case, a bending angle "θ2" of a bending portion 653 in the flexible printed-circuit board 50 becomes 90 degrees, or an obtuse angle larger than, or equal to 90 degrees. In this case, as indicated in FIG. 13B, the bending angle "θ2" implies such an angle which is defined between a plane of the joint portion 51 continued via the bending portion 653 and another plane of an extension portion 654 extended within the pipe portion 12. Specifically, the bending angle "θ2" is disposed between a dotted line in FIG. 13B and the extension portion 654. The dotted line is obtained by extending the extension portion 654. Thus, the bending angle "θ2" is equal to or larger than 90 degrees (i.e., the obtuse angle). The one edge portion 51 of the board 50 is bent from the extension portion 654 at the bending portion 653 with the bending angle "θ2" equal to or larger than 90 degrees.

Also, if the flexible printed-circuit board 50 is bent in such a manner that the bending angle "θ2" becomes smaller than, or equal to 90 degrees (i.e., the bent angle is equal to or smaller than 90 degrees), then such a stress applied to a direction along which one edge portion 51 is stripped from the strain gauge 30 is not substantially produced at one edge portion 51 of the flexible printed-circuit board 50, namely at the joint portion to the strain gauge 30 under this bending condition.

However, when the flexible printed-circuit board 50 is bent under such a bending condition that the bending angle "θ2" becomes larger than, or equal to 90 degrees, the stress which is applied to the bending portion 653 of the flexible printed-circuit board 50 is large, so that a damage may readily occur. As a result, the following problems may probably occur. That is, cracks, bends, and breaks may be produced in a base, a copper foil, and the like, which constitute the flexible printed-circuit board 50.

Figure 8A:
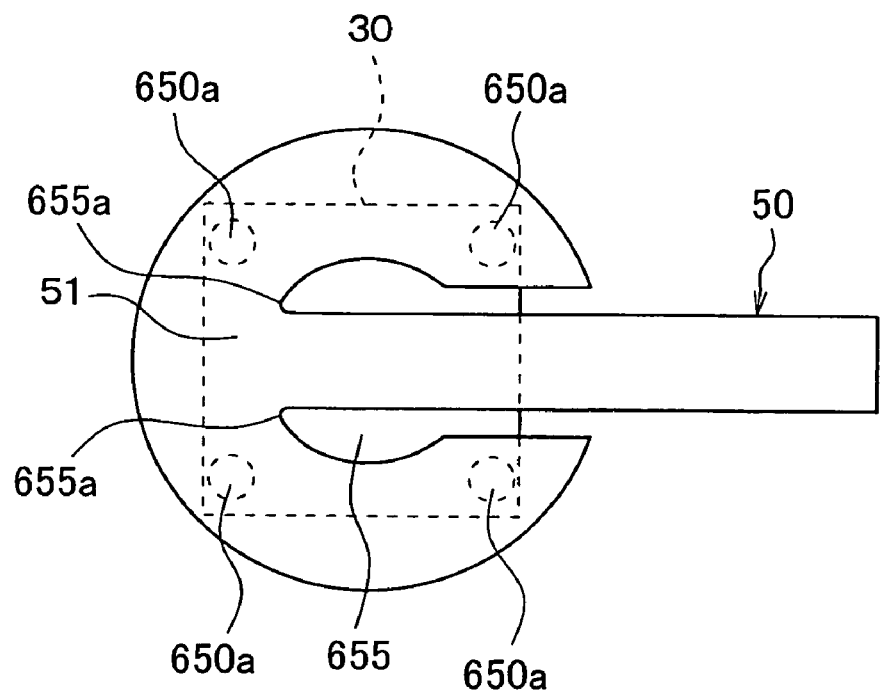
FIG. 8A is a plan view showing connection of a printed circuit board before the board is bent.
Figure 8B:
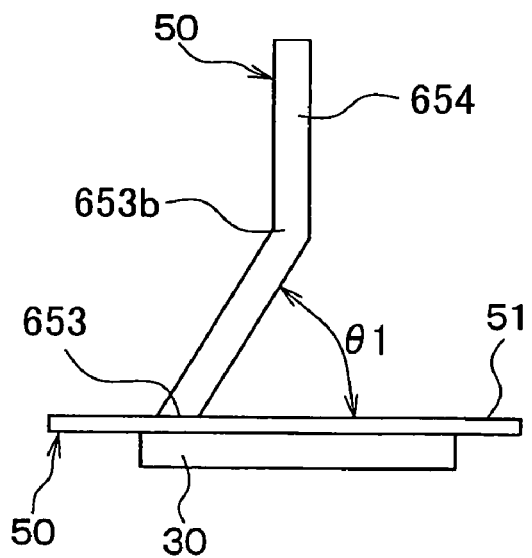
FIG. 8B is a side view showing the connection of the board after the board is bent, according to the sixth embodiment.

In view of the above problem, a flexible printed-circuit board 50 according to a sixth embodiment of the present invention is provided. FIG. 8A and FIG. 8B are diagrams for indicating a detailed joint of this flexible printed-circuit board 50. FIG. 8A is a plan view for showing such a condition before the flexible printed-circuit board 50 is bent. FIG. 8B is a side view for indicating such a condition after the flexible printed-circuit board 50 has been bent, namely such a condition that the flexible printed-circuit board 50 has been assembled to the pressure detecting apparatus 100. Referring also to FIGS. 8A and 8B, the flexible printed-circuit board 50 will now be described.

One edge portion 51 of the flexible printed-circuit board 50 has been electrically and mechanically joined with respect to the strain gauge 30 in the pressure sensitive element 20 by employing the joint member 650a such as solder. In this case, as shown in FIG. 8A, the joint members 650a have been arranged at four corner portions of the strain gauge 30.

Then, the flexible printed-circuit board 50 is bent from one edge portion 51 corresponding to a joint portion of the flexible printed-circuit board 50 to the pressure sensitive element 20. A portion of the flexible printed-circuit board 50, which is located on the side of the other edge portion 52 rather than this bending portion is elongated along the direction of the circuit board 40 within the pipe portion 12, namely, along a direction of the connector portion as a connector case 60 (will be explained later).

Now, in this embodiment, a bending angle "θ1" of a bending portion 653 in the flexible printed-circuit board 50 becomes an acute angle or an angle equal to or smaller than 90 degrees. In this case, as indicated in FIG. 8B, the bending angle "θ1" implies such an angle which is defined between a plane continued via the bending portion 653 and another plane of an extension portion 654 extended within the pipe portion 12. Specifically, the bending angle "θ1" is defined as a bent angle, which is disposed between the one edge portion 51 of the board 50 and the extension portion 654 in FIG. 8B. The bending angle "θ1" is equal to or smaller than 90 degrees. Thus, the extension portion 654 is firstly bent at the bending portion 653 with the bending angle equal to or smaller than 90 degrees. Then, the extension portion 654 is secondary bent at a portion 653b with another bending angle equal to or smaller than 90 degrees.

Figure 7:
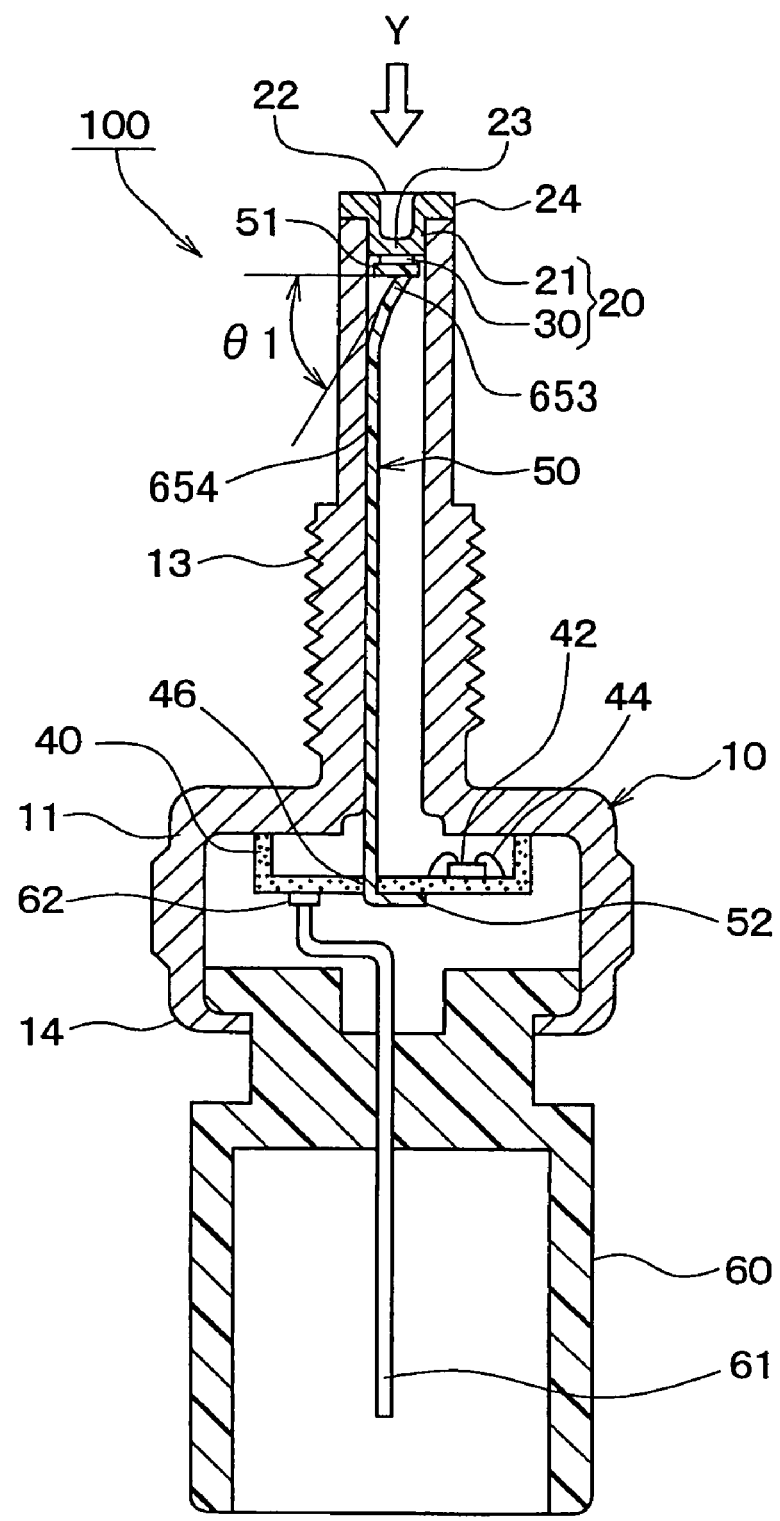
FIG. 7 is a cross sectional view showing pressure detecting apparatus according to a sixth embodiment of the present invention.

Thus, as indicated in FIG. 7, FIGS. 8A and 8B, the flexible printed-circuit board 50 has also been bent at the portion 653b of the other edge portion 52 rather than the bending portion 653. In other words, in this example, the flexible printed-circuit board 50 has been bent not at one place (namely, in prior art), but at a plurality of places.

Also, as shown in FIG. 7, the bending portion 653 within the flexible printed-circuit board 50 is located at a position close to one inner wall (namely, right-sided inner wall in FIG. 7) of opposite walls in the pipe portion 12, whereas the extension portion 654 is located at a position close to another inner wall (namely, left-sided inner wall in FIG. 7) of the opposite inner walls, contrary to the above-explained bending portion 653. This extension portion 654 of the flexible printed-circuit board 50 is extended along the direction of the connector portion 60 within the pipe portion 12. In this example, as shown in FIG. 7, the extension portion 654 is extended along the direction of the connector portion 50 under such a condition that this extension portion 654 is contacted to the other inner wall of the opposite inner walls.

Moreover, as shown in FIGS. 8A and 8B, a through hole 655 has been formed in one edge portion 51 in such a manner that the pressure sensitive element 20, namely, the strain gauge 30 is exposed. One edge portion 51 corresponds to the joint portion within the flexible printed-circuit board 50 with respect to the pressure sensitive element 20, namely, the strain gauge 30.

Also, a boundary portion between this through hole 655 and the bending portion 653 constitutes an "R" portion 655a having an R-shape which is not made in a rectangular shape, but is rounded. This "R" portion 655a may reduce concentration of stresses, and may suppress damages given to the flexible printed-circuit board 50, as compared with such a case that this boundary portion is made in the rectangular portion.

On the other hand, as shown in FIG. 7, the portion of the flexible printed-circuit board 50 on the side of the other edge portion 52 thereof is positioned at the main body portion 11 of the housing 10. Then, the other edge portion 52 of the flexible printed-circuit board 50 is positioned via a through hole 46 from a mounting plane of the circuit board 40, which mounts thereon the IC chip 42 to a plane of this circuit board 40, which is located opposite to the IC chip mounting plane. The though hole 46 is formed in the circuit board 40.

Then, the other edge portion 52 of the flexible printed-circuit board 50 has been electrically connected to the circuit board 40 on the plane of the circuit board 40, which is located opposite to the mounting plane of the IC chip 42 by way of solder, and the like.

Also, as shown in FIG. 7, in the housing 10, a connector case 60 having a terminal 61 has been provided as the connector portion at a position opposite to the connecting plane of the circuit board 40 with respect to the flexible printed-circuit board 50.

This connector case 60 is made of a resin such as PPS (polyphenylene salfide). The terminal 61 has been formed with the connector case 60 in an integral form by way of insert molding, and the like. This connector case 60 has been constructed as a connector portion capable of deriving a signal from the pressure sensitive element 20.

Then, the terminal 61 of the connector case 60 has been electrically connected to the circuit board 40 via a spring member 62 by way of a spring contact. As a result, the pressure sensitive element 20 has been electrically connected via both the flexible printed-circuit board 50 and the circuit board 40 to the connector case 60.

Also, since the edge portion 14 of the main body portion 11 of the housing 10 is caulked to the connector case 60, the connector case 60 has been fixed on the housing 10 in an internal manner. Then, the terminal 61 may be electrically connected via a wiring member (not shown) to an ECU of an automobile, and the like.

A description is made of one example as to a method for assembling the pressure detecting apparatus 100 having the above-explained structure. First, the pressure sensitive element 20 in which the metal stem 21 and the strain gauge 30 have been formed in an integral body is prepared. The one edge portion 51 of the flexible printed-circuit board 50 is connected via the joint member 650a such as solder with respect to the strain gauge 30 of this pressure sensitive element 20. This condition is represented in FIG. 8A.

Thereafter, in order to insert the other edge portion 52 of the flexible printed-circuit board 50 into the pipe portion 12, the flexible printed-circuit board 50 is bent to be formed. This condition is shown in FIG. 8B.

Next, the portion of the flexible printed-circuit board 50 on the side of the other edge portion 52 thereof is inserted from the tip portion of the pipe portion 12 of the housing 10, and then, the other edge portion 52 of the flexible printed-circuit board 50 is drawn out up to an internal portion of the main body portion 11 of the housing 10.

Subsequently, the other edge portion 52 of the flexible printed-circuit board 50 is penetrated through the through hole 60 of the circuit board 40, and the circuit board 40 is joined to the main body portion 11 of the housing 10 so as to be fixed on this main body portion 11. Next, the other edge portion 52 of the flexible printed-circuit board 50 is connected to the circuit board 40 by way of solder, or the like. The IC chip 42 has been mounted on this circuit board 40 by way of the wire bonding manner.

Thereafter, the connector case 60 is assembled to the main body portion 11 of the housing 10, and since the edge portion 14 of the housing 10 is caulked, the connector case 60 is fixed with the housing 10.

When this connector case 60 is assembled in the housing 10, the terminal 61 is contacted via the spring member 62 to the circuit board 40 in the spring contact manner so as to electrically connect the terminal 61 with the circuit board 40. As a result, the pressure detecting apparatus 100 shown in FIG. 7 may be accomplished in accordance with the above-explained manner.

Since the accomplished pressure detecting apparatus 100 is mounted via the screw portion 13 of the housing 10 in the screw hole, this pressure detecting apparatus 100 may be connected/fixed on the engine block. The screw hole 20 has been formed in the engine block functioning as the object to be detected.

Then, when pressure (namely, internal cylinder pressure) within the combustion chamber is applied to the diaphragm 23 of the pressure sensitive element 20 as indicated by the arrow "Y" in FIG. 7, the diaphragm 23 of the metal stem 21 is deformed by this applied pressure, and then, this deformation is converted into an electric signal by the strain gauge 30 so as to detect the pressure.

Then, the electric signal derived from the strain gauge 30 is transferred via the flexible printed-circuit board 50 to the circuit board 40, and is processed by the IC chip 42, and thereafter, the processed signal is outputted from the terminal 61 to an external unit.

On the other hand, according to this embodiment, in the pressure detecting apparatus 100 comprising: the housing 10; the pipe portion 12 having the elongate shape provided in the housing 10 in such a manner that the pipe portion 12 is projected from one edge side of the housing 10; and the pressure sensitive element 20 for outputting the signal in response to the detecting pressure, in which the detecting pressure is applied to the tip portion of the pipe portion 12, the below-mentioned featured points are provided.

That is, the pressure sensitive element 20 is provided on the tip portion of the pipe portion 12, and the connector portion 60 for deriving the signal from the pressure sensitive element 20 is provided in the housing 10 (refer to FIG. 7).

The flexible printed-circuit board 50 for electrically connecting the pressure sensitive element 20 to the connector portion 60 is stored inside the pipe portion 12. The one edge portion 51 of this flexible printed-circuit board 50 is jointed to the pressure sensitive element 20, and also, is bent from the one edge portion 51 as this joint portion. The portion of the flexible printed-circuit board 50 on the side of the other edge portion 52 rather than this bending portion 653 is extended along the direction of the connector portion 60 in the pipe portion 12 (refer to FIG. 7).

The bending angle "θ1" of the bending portion 653 in the flexible printed-circuit board 50 becomes the acute angle smaller than 90 degrees (refer to FIGS. 8A and 8B).

In accordance with the pressure detecting apparatus 100 of this embodiment with employment of these featured structures, since the bending angle "θ1" of the bending portion 653 in the flexible printed-circuit board 50 is set to the acute angle smaller than 90 degrees, the damages caused by bending the flexible printed-circuit board 50 can be reduced, as compared with the conventional pressure detecting apparatus in which the bending angle has been set to such an angle larger than, or equal to 90 degrees.

Also, in the pressure detecting apparatus 100 of this embodiment, the flexible printed-circuit board 50 has also been bent at such a portion thereon on the side of the other edge portion (52) rather than the bending portion 653 in addition to the bending portion 653 (refer to FIG. 7 and FIGS. 8A and 8B).

As previously explained, the flexible printed-circuit board 50 is bent not at one place as explained in the prior art, but is bent plural times, so that the bending angle of each of the bending portions can be decreased. As a result, such a technical idea that the bending angle "θ1" of the bending portion 653 in the flexible printed-circuit board 50 is set to the acute angle smaller than 90 degrees may be properly realized.

Also, in the pressure detecting apparatus 100 of this embodiment, the bending portion 653 within the flexible printed-circuit board 50 is located at the position close to one inner wall of opposite walls in the pipe portion 12, whereas the extension portion 654 is located at the position close to another inner wall of the opposite inner walls in the pipe portion 12. This extension portion 654 of the flexible printed-circuit board 50 is extended along the direction of the connector portion 60 within the pipe portion 12 (see FIG. 7).

In other words, in this embodiment, both the bending portion 653 of the extension portion 654 of the flexible printed-circuit board 50 are located at such positions which are close to the different inner walls within the opposite inner walls in the pipe portion 12.

As a consequence, such a technical idea that the bending angle "θ1" of the bending portion 653 in the flexible printed-circuit board 50 is set to the acute angle smaller than 90 degrees may be properly realized. In addition, in the joint portion 51 with respect to the pressure sensitive element 20 in the flexible printed-circuit board 50, the stress applied to the direction along which the flexible printed-circuit board 50 is stripped from the strain gauge 30 can be reduced, and the joint strength in this joint portion 51 can be properly secured.

For instance, in the structure of the conventional flexible printed-circuit board 50 shown in FIG. 13, since both the bending portion 653 and the extension portion 654 in this conventional flexible printed-circuit board 50 are located at the positions close to the same-sided inner wall of the opposite inner walls in the pipe portion 12, it is practically difficult that the above-described bending angle "θ2" is set to such an angle smaller than 90 degrees.

Also, in the pressure detecting apparatus 100 of this embodiment, a through hole 655 has been formed in one edge portion 51 in such a manner that the pressure sensitive element 20 is exposed (refer to FIGS. 8A and 8B). This one edge portion 51 corresponds to the joint portion with respect to the pressure sensitive element 20 in the flexible printed-circuit board 50.

As a result, there is no opportunity that the detecting plane of the pressure sensitive element 20 is tightly closed by the flexible printed-circuit board 50, and thus, air can be freely entered and derived into/from the detecting plane of the pressure sensitive element 20, namely the detecting plane of the strain gauge 30 in FIG. 7. Accordingly, it is possible to avoid disturbance as to the pressure detection by the pressure sensitive element 20. As a consequence, the pressure detecting apparatus 100 having the higher sensitivity can be realized.

It should be noted that this through hole 655 need not be formed in the center portion of the one edge portion 51 in the flexible printed-circuit board 50. Also, a total number of the through hole 655 need not be selected to be 1, but may be alternatively selected to be plural pieces.

Also, in accordance with the pressure detecting apparatus 100 of this embodiment, since this pressure detecting apparatus 100 is arranged in such a manner that the pressure sensitive element 20 is provided in the tip portion of the pipe portion 12, the conventionally provided rod can be omitted.

In particular, in this embodiment, while the pressure sensitive element 20 has been arranged under such an environment of the detecting pressure, namely, in this example, this pressure sensitive element 20 is exposed to the combustion chamber, the detecting pressure may be directly applied to the pressure sensitive element 20.

In the conventional pressure detecting apparatus, while the diaphragm for receiving the detecting pressure is provided on the tip portion of the pipe portion, and the pressure transferring member having the rod shape (referred to as "rod") is provided in the pipe portion, the detecting pressure may be transferred from the diaphragm via the rod to the pressure sensitive element.

In this case, the length of the rod must be elongated in response to the length of the pipe portion, namely, the transfer distance of pressure. For example, in the combustion pressure sensor, if the length of the rod is made longer, then the weight of this rod is increased. As a result, a resonant frequency of the rod is superimposed with a vibration frequency of knocking of combustion, so that a resonant phenomenon may occur in the rod. Accordingly, such a problem may occur with respect to a sensor characteristic. That is, knocking signals are embedded in noise which is produced by the resonant phenomenon of the rod, so that the knocking signals cannot be measured.

Also, in the case that the length of the rod is made long, since the rod itself may be easily deformed, contact conditions between the rod and either the diaphragm or the pressure sensitive element are changed. If such a change in the contact conditions happens to occur, then precision in pressure transfer characteristics is deteriorated, which may give an adverse influence to the sensor characteristic.

To the contrary, as explained in this embodiment, if the pressure detecting apparatus 100 is constituted by omitting the rod, then such a problem caused by this rod can be solved. That is, as to this problem, the resonant phenomenon of the rod occurs, and the pressure transferring precision is deteriorated.

As a consequence, in accordance with this embodiment, in such a pressure detecting apparatus 100 arranged by that the pressure sensitive element 20 is provided inside the housing 10 having the elongate-shaped pipe portion 12 which is projected from one edge side of the housing 10, and the connector portion 60 is provided in the housing 10, the adverse influence given to the sensor characteristic can be suppressed, which is caused by the elongate pipe portion and the rod stored in this elongate pipe portion.

Seventh Embodiment

On the other hand, in the pressure detecting apparatus 100 shown in FIG. 7 and FIGS. 8A and 8B, while the pressure sensitive element 20 has been arranged in such a manner that this pressure sensitive element 20 is exposed under the environment of the detecting pressure, the detecting pressure has been directly applied to the pressure sensitive element 20.

In the below-mentioned seventh embodiment of the present invention, such arrangements that detecting pressure is applied via diaphragms to the pressure sensitive element 20 is provided.

Figure 9:
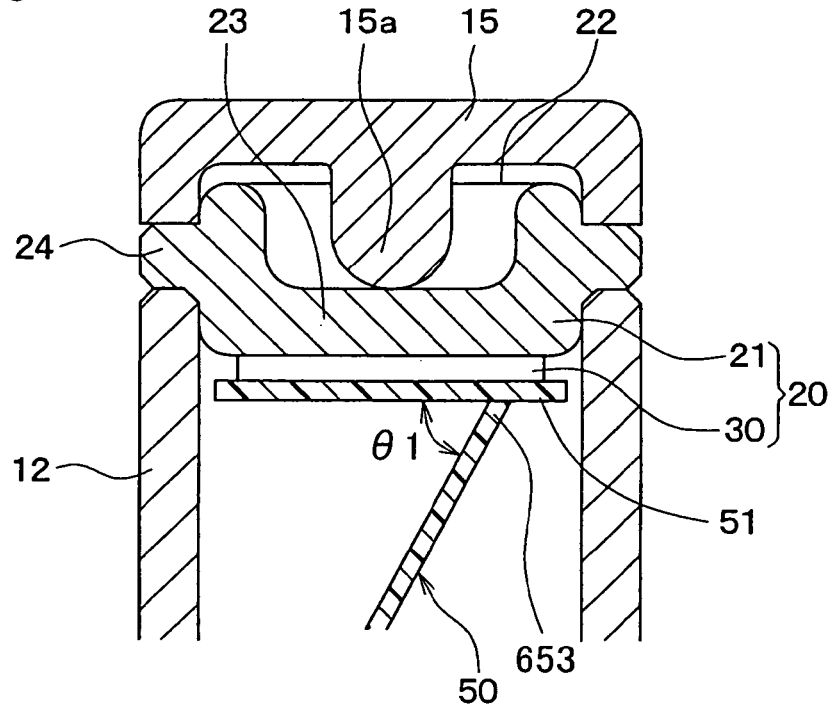
FIG. 9 is a partially enlarged cross sectional view showing a top end of pressure detecting apparatus according to a first example of a seventh embodiment of the present invention.

FIG. 9 is a sectional view for schematically indicating a major portion of a pressure detecting apparatus as a first example according to the seventh embodiment of the present invention.

In the pressure detecting apparatus indicated in FIG. 9, a diaphragm 15 has been provided on the tip portion of the pipe portion 12 in the housing 10 in such a manner that this diaphragm 15 covers the pressure sensitive element 20. Thus, detecting pressure may be applied via this diaphragm 15 to the pressure sensitive element 20.

It should be understood that this diaphragm 15 will be referred to as "pressure-receiving-purpose diaphragm 15" hereinafter in order that this pressure-receiving-purpose diaphragm 15 may be discriminated from the above-explained diaphragm 23 of the metal stem 21.

In particular, in this first example, the pressure-receiving-purpose diaphragm 15 is directly made contact to the pressure sensitive element 20. Concretely speaking, as shown in FIG. 9, a convex portion 15a which is projected along the direction of the pressure sensitive element 20 has been formed on the pressure-receiving-purpose diaphragm 15, and a tip portion projected from this convex portion 15a has been contracted to the rear plane of the diaphragm 23 of the metal stem 21.

In this case, the pressure-receiving-purpose diaphragm 15 is made in, for example, a disk shape, and the convex portion 15a has a shape similar to a "navel" which is located at a center position of this circle. Also, since the peripheral portion of the pressure-receiving-purpose diaphragm 15 is joined to the flange 24 of the metal stem 21 by way of welding so as to be fixed on this flange 24, this pressure-receiving-purpose diaphragm 15 has been formed with the pressure sensitive element 20 in an integral body.

The pressure detecting apparatus of this first example can be manufactured as follows: That is, with respect to the pressure sensitive element 20 formed with the pressure-receiving-purpose diaphragm 15 in the integral body, one edge portion 51 of the flexible printed-circuit board 50 is connected by way of solder, or the like. Thereafter, an assembling method similar to that of the sixth embodiment is carried out so as to manufacture the above-explained pressure detecting apparatus of this embodiment.

Then, in a pressure detecting operation of this first example, when pressure (internal cylinder pressure) within the combustion chamber is applied to the pressure-receiving-purpose diaphragm 15, this weight is applied from the convex portion 15a of the pressure-receiving-purpose diaphragm 15 to the diaphragm 23 of the metal stem 21. Then, a deformation of the diaphragm 23 of the metal stem 21 is converted into an electric signal by the strain gauge 30 in order to detect pressure.

Figure 10:
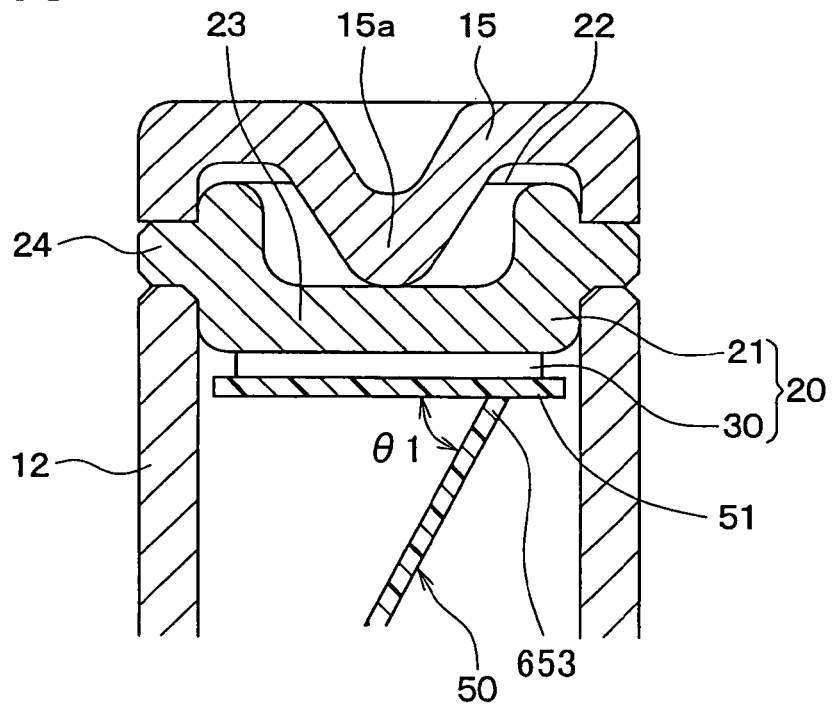
FIG. 10 is a partially enlarged cross sectional view showing a top end of pressure detecting apparatus according to a second example of the seventh embodiment.

FIG. 10 is a sectional view for schematically indicating a major portion of a pressure detecting apparatus as a second example according to the seventh embodiment of the present invention.

In the above-described first modification shown in FIG. 9, the convex portion 15a of the pressure-receiving-purpose diaphragm 15 has been formed by way of a cutting process or the like. In contract, in a pressure-receiving-purpose diaphragm 15 shown in FIG. 10, a convex portion 15a has been manufactured by denting a diaphragm plane having a flat plate shape by way of a pressing process, so that this convex portion 15a may be formed in a simple manner.

Figure 11:
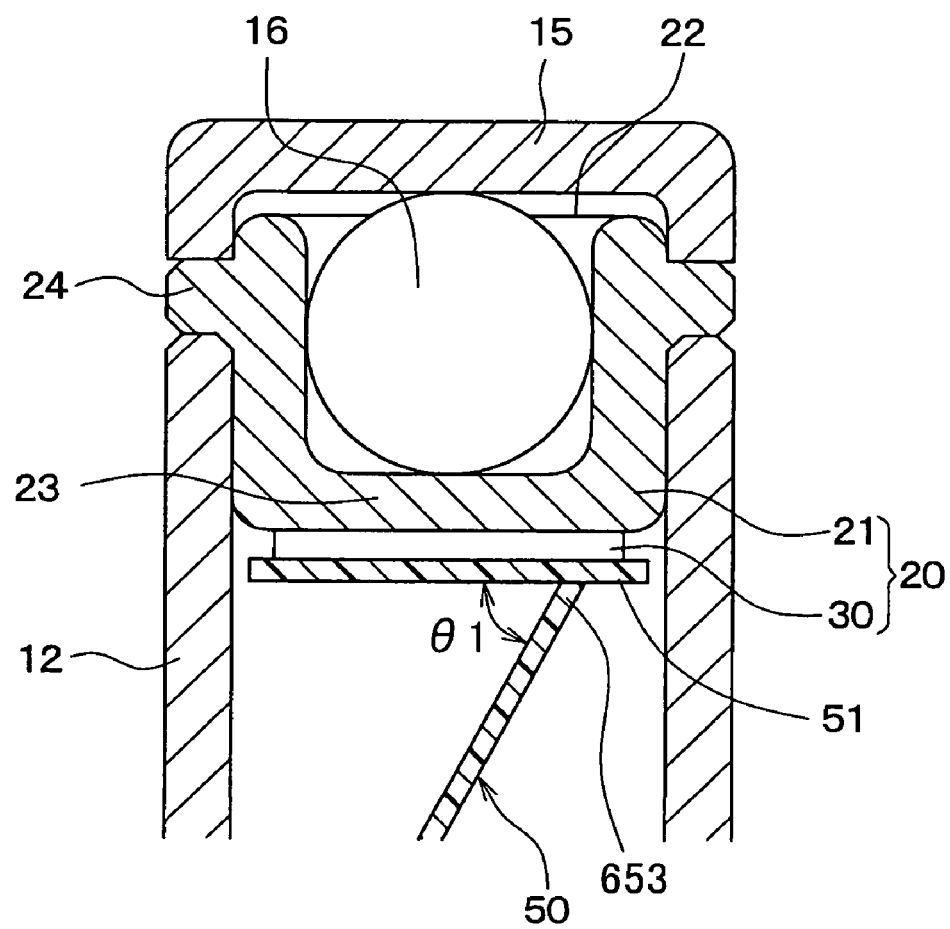
FIG. 11 is a partially enlarged cross sectional view showing a top end of pressure detecting apparatus according to a third example of the seventh embodiment.

FIG. 11 is a sectional view for schematically indicating a major portion of a pressure detecting apparatus as a third example according to the seventh embodiment of the present invention.

As shown in FIG. 11, also in this third example, similar to the above-described first and second examples, the pressure-receiving-purpose diaphragm 15 is provided on the tip portion of the pipe portion 12 in such a manner that this diaphragm 15 covers the pressure sensitive element 20, so that detecting pressure is applied via the pressure-receiving-purpose diaphragm 15 to the pressure sensitive element 20.

In the above-described first and second examples, while the convex portion 15a has been provided on the pressure-receiving-purpose diaphragm 15, this pressure-receiving-purpose diaphragm 15 has been directly made contact to the pressure sensitive element 20, so that this pressure detecting apparatus can be arranged by omitting the rod.

In contrast to the first and second examples, in this third example shown in FIG. 11, one piece of a pressure transferring member 16 is interposed between the pressure-receiving-purpose diaphragm 15 and the pressure sensitive element 20. Then, detecting pressure is applied from the pressure-receiving-purpose diaphragm 15 via the pressure transferring member 16 to the pressure sensitive element 20.

In accordance with this third example, since the pressure sensitive element 20 is provided on the tip portion of the pipe portion 12, a distance between the pressure-receiving-purpose diaphragm 15 and the pressure sensitive element 20 can be made as short as possible, and thus, such an arrangement that the pressure transferring member 16 (namely, rod) is shortened can be realized. As a result, the above-explained resonance problem caused by prolonging the rod, and such a problem that the rod itself is deformed can be suppressed as being permitted as possible.

As the pressure transferring member 16 employed in the arrangement as explained in this third example, a rod-shaped member which is similar to the rod of the conventional pressure detecting apparatus may be employed. More specifically, in the example shown in FIG. 11, a spherical-shaped member 16 has been employed as the pressure transferring member 16.

In the case of this arrangement, as to the spherical-shaped member 16 functioning as the pressure transferring member, both a plane of this spherical-shaped member 16 which is contacted to the pressure-receiving-purpose diaphragm 15, and another plane thereof which is contacted to the pressure sensitive element 20 (namely, diaphragm 23 of metal stem 21) constitute spheres.

According to this example, the contacts between the pressure-receiving-purpose diaphragm 15 and the pressure sensitive element 20, and the pressure transferring member 16 can be set as stable point contacts. Further, a total contact number between the pressure-receiving-purpose diaphragm 15 and the pressure sensitive element 20, and the pressure transferring member 16 can be reduced.

As a consequence, the changes of the contact conditions between the pressure-receiving-purpose diaphragm 15 and the pressure sensitive element 20, and the pressure transferring member 16 can be suppressed as minimum as possible, the stable contact conditions can be secured in the respective contact portions, and also, deteriorations of the pressure transfer precision can be suppressed.

In specifically, in such a case that the pressure transferring member 16 is constructed of the spherical member 16, the spherical member 16 functioning as the pressure transferring member can be hardly deformed, as compared with the rod of the prior art. As a result, the stable contact conditions between this spherical member 16, and the pressure-receiving-purpose diaphragm 15 and the pressure sensitive element 20 can be preferably maintained under suitable contact conditions.

It should also be noted that this spherical member 16 may not be a complete spherical shape, and may be alternatively replaced by a slightly elliptical sphere, or a "Rugby ball" shape. Also, as the pressure transferring member 16 whose contact planes with respect to the pressure-receiving-purpose diaphragm 15 and the pressure sensitive element 20 become the spherical planes, the invention is not limited only to a spherical-shaped member in this example. For instance, both the contact planes may be made of spherical planes, but an intermediate portion between both the spherical contact planes may be made of a pillar shape.

It should also be noted that the extension portion 654 of the flexible printed-circuit board 50, which is elongated within the above-explained pipe portion 12, may be alternatively twisted so as to form a spiral shape.

Alternatively, in the pipe portion 12, the flexible printed-circuit board 50 may be adhered to the pipe portion 12 so as to be fixed thereon.

Further, in the flexible printed-circuit board 50 located within the pipe portion 12, a component having light weight such as a capacitor may be alternatively mounted on the surface of this flexible printed-circuit board 50.

Also, in the above-described respective embodiments, the pressure sensitive element 20 is provided on the tip portion of the pipe portion 12 which is located close to the pressure to be detected environment, so that the temperature of the pressure sensitive element 20 may be easily increased.

As a solving measure in such a case, in the pressure detecting apparatus, a heat radiation member may be provided in such a way that this heat radiation member is made in contact with the pressure sensitive element 20. In accordance with this embodiment, since heat of the pressure sensitive element 20 is radiated through the heat radiation member, the temperature reduction of the pressure sensitive element 20 can be preferably improved.

As such a heat radiation member, for example, the following heat radiation member may be employed which is made of a material having a superior heat resisting characteristic and a superior heat radiating characteristic such as aluminum and stainless steel. Then, such a heat radiation member may be fixed with respect to the metal stem 21 in such a manner that the heat radiation member is connected to, for example, the metal stem 21 by way of welding, or solder.

In summary, the invention owns the following major structure. That is, in the pressure detecting apparatus comprising: the housing 10; the pipe portion 12 having the elongate shape provided in the housing 10 in such a manner that the pipe portion 12 is projected from one edge side of the housing 10; and the pressure sensitive element 20 for outputting the signal in response to the detecting pressure, in which the detecting pressure is applied to the tip portion of the pipe portion 12, such a major structure is featured by that the pressure sensitive element 20 is provided on the tip portion of the pipe portion 12; the connector portion 60 is provided in the housing 10; and the wiring member 50 for electrically connecting the pressure sensitive element 20 to the connector portion 60 is stored inside the pipe portion 12; further, as explained above, the bending angle "θ1" of the bending portion 653 in the flexible printed-circuit board 50 is set to the acute angle equal to or smaller than 90 degrees; and other structural portions may be properly changed.

As apparent from the foregoing descriptions, the pressure detecting apparatus of the invention is not limited to be utilized as the above-explained combustion pressure sensor for detecting the pressure (internal cylinder pressure) within the combustion chamber.

Eighth Embodiment

The inventors have tried to manufacture such an arrangement that in a pressure detecting apparatus, a sensing unit is located closer to the pressure detecting environment side in order to improve the sensitivity thereof.

Figure 26:
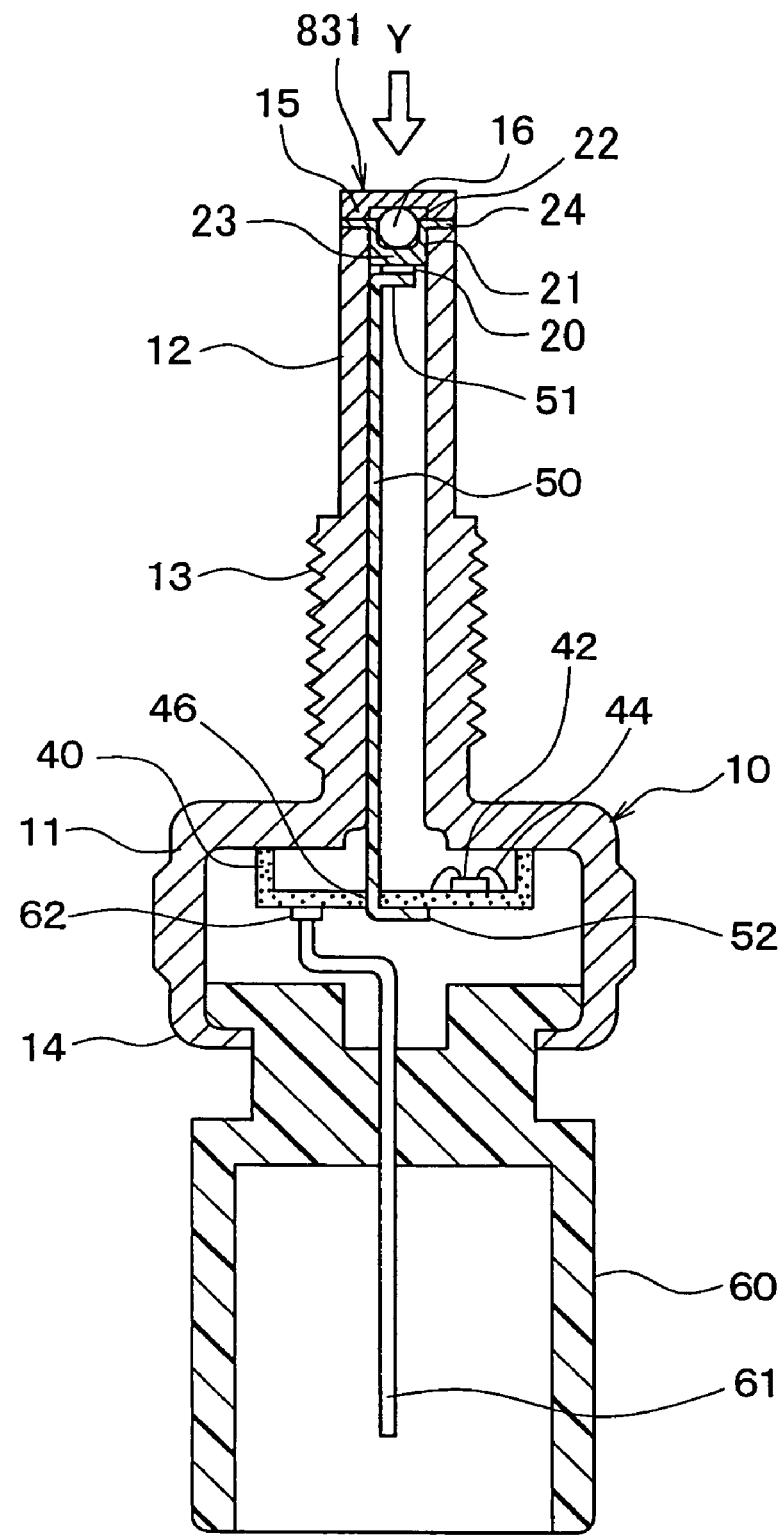
FIG. 26 is a cross sectional view showing pressure detecting apparatus according to a comparison of the eighth embodiment.

FIG. 26 is a sectional view for schematically indicating an entire structure of the pressure detecting apparatus as a prototype model manufactured by the inventors.

Also, a sensing unit 831 for outputting a signal in response to detected pressure has been provided on the tip portion of the pipe portion 12 in the housing 10.

In this case, the sensing unit 831 has been constituted by a pressure-receiving-purpose diaphragm 15, a metal stem 21, a pressure transferring member 16, and a pressure sensitive element 20. The pressure-receiving-purpose diaphragm 15 is provided on the tip portion of the pipe portion 12, and is to receive detected pressure (namely, pressure which should be detected). The pressure transferring member 16 has been provided in the metal stem 21. The detected pressure is transferred from the pressure-receiving-purpose diaphragm 15 via the pressure transferring member 16 to the pressure sensitive element 20.

Concretely speaking, the pressure sensitive element 20 has been mounted on a surface of a diaphragm 23 by way of a glass joint in the metal stem 21 functioning as a holding member having a hollow cylindrical shape, one edge side of which is an opening portion 22, and the other edge side of which is the diaphragm 23. This pressure sensitive element 20 owns a strain gauge function. This strain gauge function may output a signal in response to, for example, detected pressure based upon a strain caused by the detected pressure.

The pressure transferring member 16 has been provided in the hollow portion of this metal stem 21. The pressure-receiving-purpose diaphragm 15 has been fixed on the opening portion 22 of the metal stem 21 in such a manner that this diaphragm 15 may cover the opening 21.

Then, as indicated by an arrow "Y" in FIG. 26, the detected pressure may be applied from the pressure-receiving-purpose diaphragm 15 via the pressure transferring member 16 to a rear plane of the diaphragm 23 of the metal stem 21.

Then, when the diaphragm 23 of the metal stem 21 is deformed by pressure, an electric signal may be outputted from the pressure sensitive element 20 in response to this deformation.

Also, as shown in FIG. 26, a circuit board 40 has been provided inside the main body portion 11 of the housing 10. An IC chip 42 has been mounted on one plane of the circuit board 40 so as to be fixed thereon by way of adhesion. In this IC chip 42, a circuit is provided which processes an output signal from the pressure sensitive element 20 of the sensing unit 831.

Then, this IC chip 42 has been electrically connected to the circuit board 40 via a bonding wire 44. Further, the circuit board 40 has been electrically connected to the above-explained pressure sensitive element 20 of the sensing unit 831 by employing a flexible printed-circuit board 50. This flexible printed-circuit board 50 has been arranged inside the pipe portion 12 of the housing 10 in such a manner that the flexible printed-circuit board 50 extends along the longitudinal direction of the pipe portion 12.

In this pressure detecting apparatus, one edge portion 51 of the flexible printed-circuit board 50 has been electrically joined with respect to the pressure sensitive element 20, and the other edge portion 52 thereof is elongated inside the pipe portion 12 along the direction of the circuit board 40. Then, the other edge portion 52 of the flexible printed-circuit board 50 has been electrically connected to the circuit board 40 by way of solder, and the like.

Also, in the housing 10, a connector case 60 having a terminal 61 has been provided at a position opposite to the circuit board 40. This connector case 60 has been constructed as a connector portion capable of deriving a signal from the pressure sensitive element 20 of the sensing unit 831 in this pressure detecting apparatus.

Then, the terminal 61 of the connector case 60 has been electrically connected to the circuit board 40 via a spring member 62 by way of a spring contact. As a result, the pressure sensitive element 20 of the sensing unit 831 has been electrically connected via both the flexible printed-circuit board 50 and the circuit board 40 to the connector case 60, namely a connector portion 60.

In accordance with the pressure detecting apparatus shown in FIG. 26, since such an arrangement is employed that the sensing unit 831 has been provided on the tip portion of the pipe portion 12 corresponding to one edge portion of the housing 10, the length of the pressure transferring member can be shortened as being permitted as possible, although this pressure transferring member has been conventionally arranged so as to extend over the entire pipe portion.

As previously explained, in the pressure detecting apparatus shown in FIG. 26, the electrical connection from the pressure sensitive element 20 located at the tip portion of the pipe portion 12 to the connector portion 60 is realized by employing the flexible printed-circuit board 50.

In this case, it can be conceived that the connection between the pressure sensitive element 20 of the sensing unit 831 and the flexible printed-circuit board 50 is realized by a joint by way of a wire bonding technique. However, the inventors of the invention conceived to employ a flip chip joint whose necessary area is smaller than that of a wire bonding joint so as to realize a more compact structure instead of the wire bonding joint.

Figure 27A:
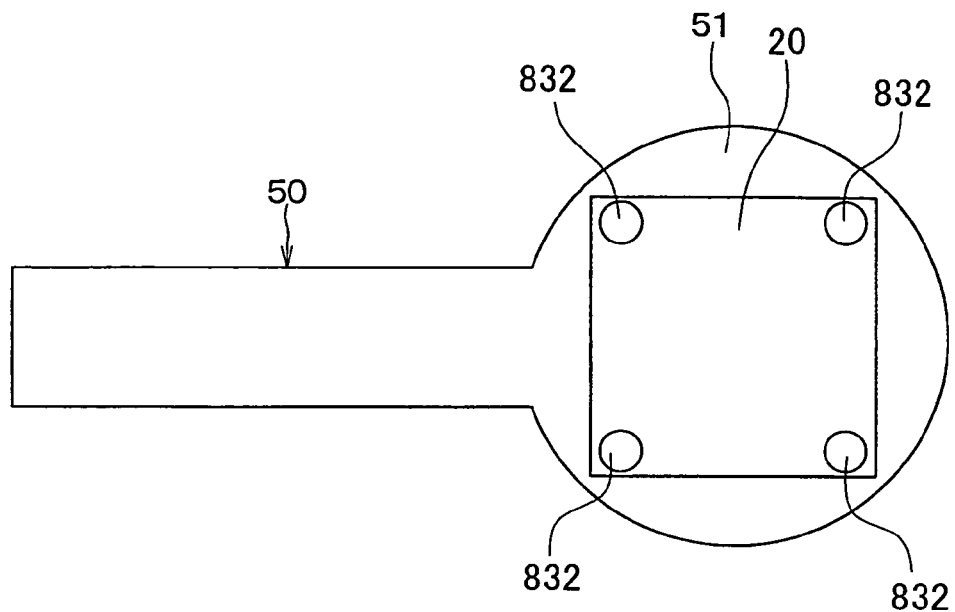
FIG. 27A is a plan view showing connection of a printed circuit board before the board is bent.
Figure 27B:
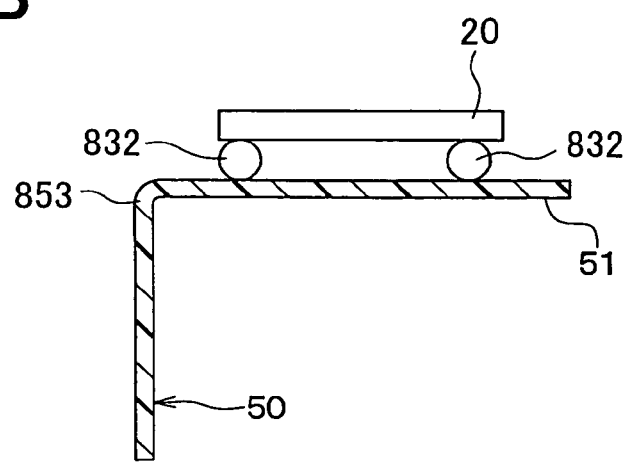
FIG. 27B is a cross sectional view showing the connection of the board after the board is bent, according to the comparison of the eighth embodiment.

FIG. 27A and FIG. 27B are diagrams for indicating detailed structures as to a flip chip joint between one edge portion 51 of the flexible printed-circuit board 50 and the pressure sensitive element 20 of the sensing unit 831 in the pressure detecting apparatus functioning as the prototype model shown in FIG. 26. This flip chip joint has employed a typical arrangement of bumps 832.

In the drawings, FIG. 27A is a plan view for indicating a condition of a flip chip joint in the flexible printed-circuit board 50 before being bent. FIG. 27B is a side view for representing a condition of a flip chip joint under such a status that the flexible printed-circuit board 50 has been assembled to the pressure detecting apparatus, namely, after the flexible printed-circuit board 50 has been bent.

It should be understood that FIG. 27A is the plan view which corresponds to such a plane of FIG. 27B viewed from the upper direction. The bumps 832 which are located under the pressure sensitive element 20 should be indicated by using a hidden line. However, for the sake of a simple observation, the bumps 832 are indicated by using a solid line in FIG. 27A.

As to the flexible printed-circuit board 50, after one edge portion 51 thereof has been connected to the pressure sensitive element 20 via the bumps 832 such as solder bumps, or stud bumps, the other edge portion 52 thereof is inserted into the pipe portion 12. As a result, a portion 853 of this flexible printed-circuit board 50 is bent as represented in FIG. 27B.

Then, in this case, as a typical arrangement of the bumps 832 on the arranging plane of the bumps 832 in the sensing unit 831, the bumps 832 have been arranged at four corner portions of a surface of the pressure sensitive element 20. Thus, the pressure sensitive element 20 has been electrically and mechanically connected to the flexible printed-circuit board 50 by way of the flip chip joint via these bumps 832.

As previously explained, in the case of such a pressure detecting apparatus that the pressure sensitive element 20, namely the sensing unit 831 has been connected to the flexible printed-circuit board 50 by way of the flip flop joint, if a cooling/heating cycle is repeatedly carried out, then a large amount of stresses may be produced in the bump joint portions, because of differences in thermal expansion coefficients of these structural elements, in particular, a difference between a thermal expansion coefficient as to the pressure sensitive element 20 made of silicon, and another thermal expansion coefficient as to the flexible printed-circuit board 50 made of resin.

Also, while the sensing unit 831 repeatedly receives pressure by the detected pressure, the bumps 832 are depressed by this pressure, so that a large amount of stresses may be produced in the bump joint portions. Then, in the bump joint portions which have received the stresses, there is such a risk that a wire disconnection may eventually occur.

Figure 14:
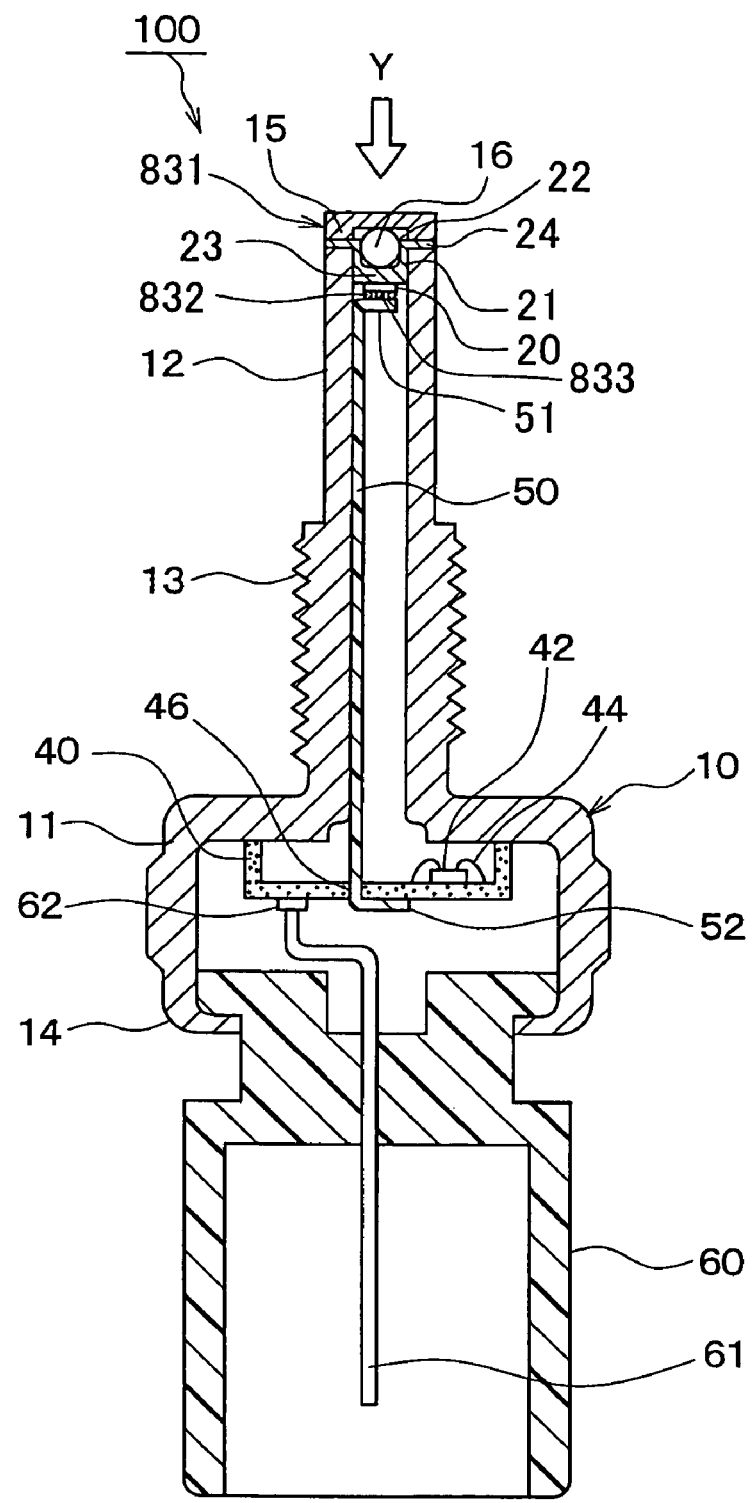
FIG. 14 is a cross sectional view showing pressure detecting apparatus according to an eighth embodiment of the present invention.

In view of the above problem, pressure detecting apparatus according to an eighth embodiment of the present invention is provided. FIG. 14 is a sectional view for schematically showing an entire structure of the pressure detecting apparatus 100 according to the eighth embodiment.

Figure 15A:
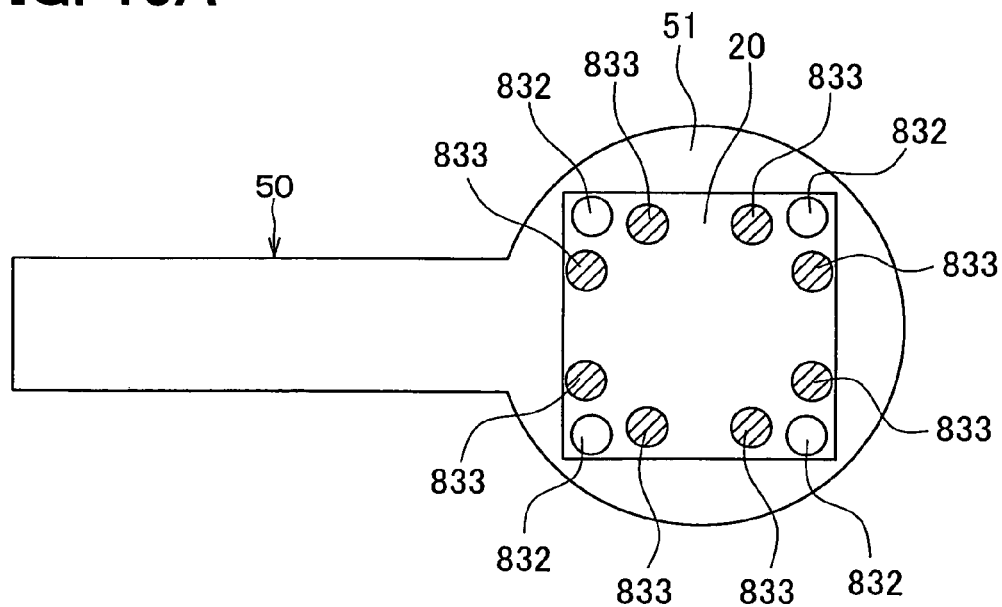
FIG. 15A is a plan view showing connection of a printed circuit board before the board is bent.
Figure 15B:
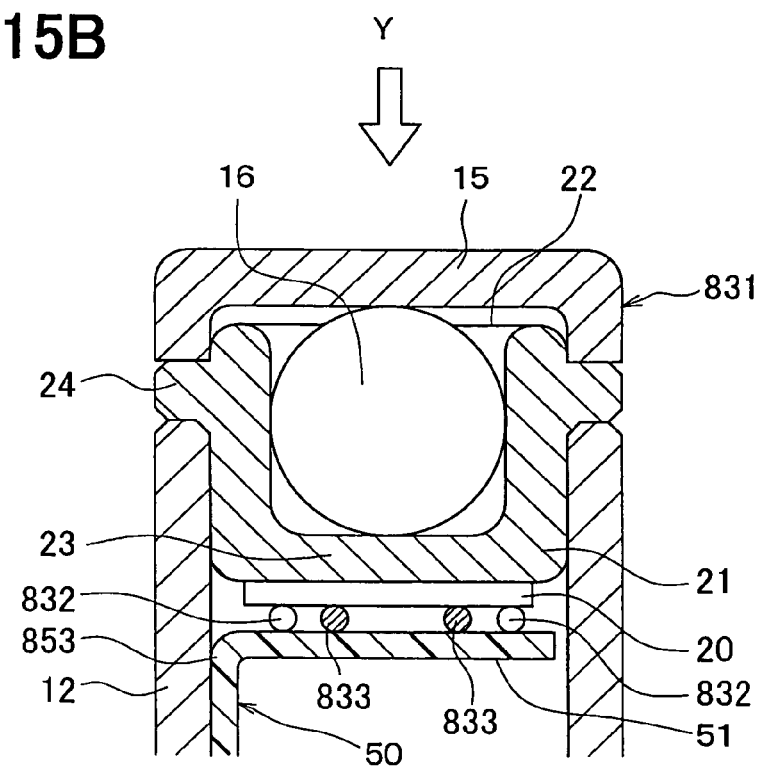
FIG. 15B is a partially enlarged cross sectional view showing a top end of pressure detecting apparatus, according to the eighth embodiment.

Also, FIG. 15A and FIG. 15B are enlarged views for showing flip chip joint portions between a pressure sensitive element 20 of a sensing unit 831 and a flexible printed-circuit board 50 indicated in FIG. 14. FIG. 15A is a plan view for indicating a condition of a flip chip joint in the flexible printed-circuit board 50 before being bent. FIG. 15B is a side view for representing a condition of a flip chip joint under such a status that the flexible printed-circuit board 50 has been assembled to the pressure detecting apparatus, namely, after the flexible printed-circuit board 50 has been bent.

It should be understood that FIG. 15A is a plan view which corresponds to such a plane of FIG. 15B viewed from the upper direction. Bumps 832 and dummy bumps 833 which are located under the pressure sensitive element 20 should be indicated by using a hidden line. However, for the sake of a simple observation, both the dummy bump 833 and the bumps 832 are indicated by using a solid line in FIG.

15A. Further, in FIG. 15A, in order to discriminate the bump 832 from the dummy bums 833, the dummy bumps 833 have been hatched.

Although usage of the pressure detecting apparatus 100 is not limited, this pressure detecting apparatus 100 may be applied as a combustion pressure sensor.

In this case, the combustion pressure sensor corresponds to such a sensor that while a pipe portion 12 of a housing 10 is mounted in a mounting hole formed in, for example, an engine block of an automobile as an object to be detected by way of a screw coupling manner, pressure (namely, internal cylinder pressure) within a combustion chamber is detected as detected pressure.

The pressure detecting apparatus 100 according to this embodiment is arranged by mainly comprising: the housing 10; the sensing unit 831 provided on the housing 10, for outputting a signal in response to detected pressure; a connector unit as a connector case 60 provided on the housing 10, for deriving the signal from the sensing unit 831; and also, the flexible printed-circuit board 50 stored in the housing 10, for electrically connecting the sensing unit 831 to the connector unit as a connector case 60.

The housing 10 is constituted by a cylindrical main body portion 11 and the pipe portion 12. The pipe portion 12 having as elongated cylindrical shape is made narrower than the main body portion 11.

These main body portion 11 and pipe portion 12 are made of a metal such as a stainless steel, which has been processed by cutting, cold forging operation, and the like. In this embodiment, although the pipe portion 12 has a cylindrical pipe shape, the pipe portion 12 may alternatively have a rectangular pipe shape.

It should also be noted that in the housing 10, the main body portion 11 and the pipe portion 12 may be formed in an integral body. Alternatively, the main body portion 11 and the pipe portion 12 may be separately formed, and thereafter, both of these portions 11 and 12 may be joined with each other to be formed in an integral body by way of welding, adhering, press-fitting, screw coupling, caulking etc.

Also, a screw portion 13 has been formed on an outer peripheral plane of the pipe portion 12 in the housing 10. The screw portion 13 can be screw-coupled to the above-described engine block functioning as the object to be detected.

As previously described, the pressure detecting apparatus 100 of this embodiment has been arranged in such a manner that the housing 10 is provided with the pipe portion 12 having the elongate shape, while the pipe portion 12 is projected from one edge side of this housing 10.

In this case, the pipe portion 12 of the housing 10 is inserted into the mounting hole, and is mounted via the screw portion 13. The mounting hole has been formed in the engine block as a screw hole. As a result, the pressure detecting apparatus 100 is mounted on the engine block.

Then, under such a condition that this pressure detecting apparatus 100 is mounted on the engine block, pressure (namely, internal cylinder pressure) within the combustion chamber as detected pressure is applied from the tip portion of the pipe portion 12 as indicated by an arrow "Y" in FIG. 14 and FIG. 15A, FIG. 15B in a reverse printing manner. In other words, in the pressure detecting apparatus 100 of this first embodiment, the detected pressure is applied to one edge portion of the housing 10.

Also, in this pressure detecting apparatus 100, the sensing unit 831 for outputting a signal in response to detected pressure has been provided on one edge portion of the housing 10, namely, the tip portion of the pipe portion 12.

In this case, the sensing unit 831 has been constituted by a pressure-receiving-purpose diaphragm 15, a metal stem 21, a pressure transferring member 16, and a pressure sensitive element 20. The pressure-receiving-purpose diaphragm 15 is provided on the tip portion of the pipe portion 12, and is to receive detected pressure (namely, pressure which should be detected). The pressure transferring member 16 has been provided in the metal stem 21. The detected pressure is transferred from the pressure-receiving-purpose diaphragm 15 via the pressure transferring member 16 to the pressure sensitive element 20.

Concretely speaking, the pressure sensitive element 20 has been mounted on a surface of a diaphragm 23 by way of a glass joint in the metal stem 21 functioning as a holding member having a hollow cylindrical shape, one edge side of which is an opening portion 22, and the other edge side of which is the diaphragm 23.

In this pressure detecting apparatus 100, this pressure sensitive element 20 owns a strain gauge function. This strain gauge function may output a signal in response to, for example, detected pressure based upon a strain caused by the detected pressure.

The metal stem 21 is such a metal member which has been processed so as to have the hollow cylindrical shape. A flange 24 has been formed on an opening edge portion of the opening portion 22, while this flange 24 is projected along a direction perpendicular to a circumferential plane thereof. In this embodiment, although the hollow portion of the metal stem 21 has a cylindrical shape, the invention is not limited thereto. Alternatively, this hollow portion may have a rectangular cylindrical shape.

Then, the metal stem 21 has been inserted into the pipe portion 12 in such a manner that the diaphragm-sided portion 23 of this metal stem 21 is directed to the inner portion of the pipe portion 12, and the opening portion-sided portion thereof is directed to the combustion chamber. Then, the flange 24 of the metal stem 21 has been fixed to the opening edge portion of the tip portion of the pipe portion 12 by way of an adhering member, a welding manner, or a pressure welding manner.

Furthermore, in the pressure detecting apparatus 100 of this embodiment, as indicated in FIG. 14, FIG. 15A and FIG. 15B, a diaphragm 15 has been provided on the tip portion of the pipe portion 12 in the housing 10 in such a manner that this diaphragm 15 covers the opening portion 22 of the metal stem 21.

It should be understood that this diaphragm 15 will be referred to as "pressure-receiving-purpose diaphragm 15" hereinafter in order to be discriminated from the above-explained diaphragm 23 of the metal stem 21 in this embodiment and the respective embodiments (will be explained later).

In this case, the pressure-receiving-purpose diaphragm 15 is made to a disk shape, for example, from stainless steel. A peripheral portion of the pressure-receiving-purpose diaphragm 15 is joined to the flange 24 of the metal stem 21 by way of welding so as to be fixed on this flange 24. As a result, this pressure-receiving-purpose diaphragm 15 has been formed with the metal stem 21 in an integral body.

Then, this pressure-receiving-purpose diaphragm 15 receives the detected pressure as indicated by the arrow in the reverse printing manner in FIG. 14. Concretely speaking, the pressure-receiving-purpose diaphragm 15 is set so as to receive combustion pressure (internal cylinder pressure), while this diaphragm 15 is faced to the combustion chamber under such a condition that the pressure detecting apparatus 100 is mounted on the engine block.

Also, as shown in FIG. 14, FIG. 15A, and FIG. 15B, in this pressure detecting apparatus 100, a pressure transferring member 16 has been provided in the hollow portion of the metal stem 21. In other words, the pressure transferring member 16 has been interposed between the pressure-receiving-purpose diaphragm 15 and the pressure sensitive element 20. This pressure transferring member 16 is made of, for example, a metal, ceramics, or the like.

In this case, one edge portion of the pressure transferring member 16 is contacted to the diaphragm 23 of the metal stem 21 under such a condition that this pressure transferring member 16 applies weight to this diaphragm 23. The other edge portion of the pressure transferring member 16 is contacted to the pressure-receiving-purpose diaphragm 15 under such a condition that this other edge portion applies weight to this diaphragm 15.

As a consequence, as previously explained, even when the pressure transferring member 16 is shrunk by the linear expansion coefficient thereof, and the pressure within the combustion chamber becomes negative pressure, the contacts between the pressure transferring member 16 and both the diaphragms 15 and 23 can be properly secured.

In the examples shown in FIG. 14, FIG. 15A, and FIG. 15B, although the pressure transferring member 16 is a spherical-shaped member, the shape of the pressure transferring member 16 is not limited only to this spherical shape in this pressure detecting apparatus 100.

Then, the detected pressure is received by the pressure-receiving-purpose diaphragm 15, and is applied from this pressure-receiving-purpose diaphragm 15 via the pressure transferring member 16 to both the diaphragm 23 of the metal stem 21 and the pressure sensitive element 20.

Also, although not limited to the above-described pressure sensitive element 20 in this embodiment, such an element may be employed as the pressure sensitive element 20 having the strain gauge function. That is, in this pressure sensitive element, a bridge circuit constructed of a diffusion resistance element is formed with respect to a silicon semiconductor chip by way of, for example, a semiconductor process.

Such a semiconductor chip having the strain gauge function may own the following function. That is, when the diaphragm 23 of the metal stem 21 is deformed by pressure, since the strain gauge 30 itself is strained in response to this deformation, a change in resistance values which is produced by this strain, is converted into an electric signal, and then, this electric signal is outputted.

While the diaphragm 23 of the metal stem 21 and the pressure sensitive element 20 are arranged as strain portions which are strained by receiving weights produced by the detected pressure, these strain portions may give an influence to basic performance of the pressure detecting apparatus 100.

In this case, as to metal materials which constitute the metal stem 21, low thermal expansion coefficients are necessarily required, since these metal materials receive high pressure, so that strengths of the metal materials are high, and also, since the pressure sensitive element 20 made of a Si semiconductor and the like is joined to the metal stem 21 by low melting glass.

Concretely speaking, as a metal material for the metal stem 21, Fe, Ni, Co, or a material whose primary constituent is Fe or Ni and to which Ti, Nb, Al, or Ti, Nb are added as a precipitation emphasizing material may be selected. For example, precipitation hardening type stainless steel may be selected. The metal stem 21 may be formed by way of pressing, cutting, and cold forging operation.

Also, as shown in FIG. 14, a circuit board 40 formed of a ceramic substrate, or the like, has been provided inside the main body portion 11 of the housing 10 in the pressure detecting apparatus 100 of this embodiment.

This circuit board 40 has been provided so as to cover the opening portion of the pipe portion 12 at a boundary with respect to the main body portion 11. A peripheral portion of the circuit board 40 has been fixed on the housing 10 by way of, for example, an adhering manner.

An IC chip 42 has been adhered on a plane of the circuit board 40 so as to be mounted thereon. This plane is located opposite to the opening portion of the pipe portion 12. In this IC chip 42, a circuit has been manufactured which amplifies and adjusts an output signal from the pressure sensitive element 20.

Then, this IC chip 42 has been electrically connected to the circuit board 40 by using a bonding wire 44 made of aluminum (Al), or gold.

Further, as indicated in FIG. 14, FIG. 15A, and FIG. 15B, in this pressure detecting apparatus 100, the circuit board 40 has been electrically connected to the above-explained pressure sensitive element 20 of the sensing unit 831 by employing the flexible printed-circuit board 50 corresponding to the wiring member.

As the flexible printed-circuit board 50, a general-purpose printed-circuit board may be employed which has been manufactured by patterning a conductor such a copper (Cu) on a base, e.g., polyimide resin. As indicated in FIG. 14, this flexible printed-circuit board 50 has been arranged inside the pipe portion 12 of the housing 10 so as to extend along the longitudinal direction of the pipe portion 12.

In the example as shown in FIG. 15A and FIG. 15B, one edge portion 51 of the flexible printed-circuit board 50 has been electrically and mechanically joined via a plurality of bumps 832 with respect to the pressure sensitive element 20 of the sensing unit 831 by way of a flip chip joint.

As this bump 832, a solder bump, a stud bump such as gold, and the like may be employed. Concretely speaking, although not shown in the drawing, pads formed on the surface of the pressure sensitive element 20 have been connected via the bumps 832 to conductor portions such as pads formed on the surface of the flexible printed-circuit board 50.

In this case, in this embodiment, the pressure sensitive element 20 corresponds to a connection portion with respect to the bumps 832 in the sensing unit 831. The surface of the pressure sensitive element 20 which is located opposite to the flexible printed-circuit board 50 constitutes an arranging plane of the bumps 832 of the sensing unit 831.

Then, as shown in FIG. 15A, in this embodiment, similar to the typical bump arrangement (refer to FIG. 27A), the bumps 832 have been arranged at 4 corner portions on the arranging plane, namely the surface of the pressure sensitive element 20.

Further, as shown in FIG. 15A and FIG. 15B, in the pressure detecting apparatus 100 of this first embodiment, dummy bumps 833 have been provided in the vicinity of the bumps 832 between the sensing unit 831, namely the pressure sensitive element 20, and the one edge portion 51 of the flexible printed-circuit board 50. The dummy bumps 833 are used so as to relax stresses which are applied to the bumps 832.

As this dummy bump 833, such a bump constructed of a solder bump, a stud bump, or the like, may be employed similar to the above-explained bumps 832 which are employed so as to flip-chip-join the pressure sensitive element 20 to the flexible printed-circuit board 50.

Then, the pressure sensitive element 20 of the sensing unit 831 has been mechanically connected to the one edge portion 51 of the flexible printed-circuit board 50 via the dummy bumps 833. It should also be noted that the dummy bumps 833 may not electrically connect the pressure sensitive element 20 to the flexible printed-circuit board 50.

Then, as shown in FIG. 14, the flexible printed-circuit board 50 has been bent from the one edge portion 51 of this flexible printed-circuit board 50, and a portion of this flexible printed-circuit board 50 which is located on the side of the other edge portion 52 thereof rather than a bending portion 653 corresponding to this bending portion is elongated inside the pipe portion 12 along the direction of the circuit board 40. The above-described one edge portion 51 corresponds to the joint portion of the flexible printed-circuit board 50 to the pressure sensitive element 20.

On the other hand, the portion of the flexible printed-circuit board 50 on the side of the other edge portion 52 thereof is positioned at the main body portion 11 of the housing 10. Then, the other edge portion 52 of the flexible printed-circuit board 50 is positioned, on the circuit board 40 via a through hole 46 provided on the circuit board 40, on a plane opposite to the plane on which the IC chip 42 is mounted.

Then, the other edge portion 52 of the flexible printed-circuit board 50 has been electrically connected to the circuit board 40 on the plane of the circuit board 40, which is located opposite to the mounting plane of the IC chip 42 by way of solder, and the like.

Also, in this pressure detecting apparatus 100, as shown in FIG. 14, in the housing 10, a connector case 60 having a terminal 61 has been provided at a position opposite to the connecting plane of the circuit board 40 with respect to the flexible printed-circuit board 50.

This connector case 60 is made of such a resin as PPS (polyphenylene salfide). The terminal 61 has been formed with the connector case 60 in an integral form by way of insert molding, and the like. This connector case 60 has been constructed as a connector portion 60 capable of deriving a signal from the pressure sensitive element 20 of the sensing unit 831.

Then, the terminal 61 of the connector case 60 has been electrically connected to the circuit board 40 via a spring member 62 by way of a spring contact. As a result, the pressure sensitive element 20 of the sensing unit 831 has been electrically connected via both the flexible printed-circuit board 50 and the circuit board 40 to the connector case 60.

Also, as indicated in FIG. 14, since the edge portion 14 of the main body portion 11 of the housing 10 is caulked to the connector case 60, the connector case 60 has been fixed on the housing 10 in an integral manner.

Then, the terminal 61 of the connect portion 60 may be electrically connected via a wiring member (not shown) to an ECU of an automobile, and the like. As a result, this pressure detecting apparatus 100 may transmit/receive a signal with respect to an external unit.

A description is made of a method for manufacturing the pressure detecting apparatus 100 having the above-described structure.

First, the pressure transferring member 16 is interposed between the metal stem 21 and the pressure-receiving-purpose diaphragm 15. Concretely speaking, the pressure transferring member 16 is inserted into the hollow portion of the metal stem 21, and then, the pressure-receiving-purpose diaphragm 15 is mounted so as to cover the opening portion 22 of the metal stem 21.

Next, under such a condition that weight is applied from the pressure-receiving-purpose diaphragm 15 via the pressure transferring member 16 to the diaphragm 23 of the metal stem 21, this pressure-receiving-purpose diaphragm 15 is welded. As a result, the pressure-receiving-purpose diaphragm 15 is connected to the metal stem 21 in an integral body.

In other words, while keeping such a condition that the weight is applied in a direction along which the pressure transferring member 16 is sandwiched by both the metal stem 21 and the pressure-receiving-purpose diaphragm 15, the entire peripheral portion of the pressure-receiving purpose diaphragm 15 is welded with respect to the flange 24 by way of a laser welding manner.

After the pressure-receiving-purpose diaphragm 15 has been welded so as to connect this pressure-receiving-purpose diaphragm 15 to the metal stem 21 in the integral body in the above-explained manner, the pressure sensitive element 20 is mounted on the metal stem 21.

Concretely speaking, the pressure sensitive element 20 is mounted on an outer surface of the diaphragm 23 of the metal stem 21 while interposing low-melting-point glass (not shown). Then, this glass is sintered in order that the pressure sensitive element 20 is glass-joined to the metal stem 21.

Next, in such a unit that the pressure transferring member 16, the metal stem 21, the pressure sensitive element 20, and the pressure-receiving-purpose diaphragm 15 have been assembled in the integral form, namely in the sensing unit 831, the one edge portion 51 of the flexible printed-circuit board 50 is joined via the bumps 832 with respect to the pressure sensitive element 20 in the flip chip joint manner.

Now, while the bumps 832 have been previously formed on the surface of the pressure sensitive element 20, the one edge portion 51 of the flexible printed-circuit board 50 is contacted to the pressure sensitive element 20 formed on the bumps 832, and then, the connection is carried out via the bumps 832 by way of solder reflow, and pressure adhesion manners.

Next, the portion of the flexible printed-circuit board 50 on the side of the other edge portion 52 thereof is inserted from the tip portion of the pipe portion 12 of the housing 10, and then, the other edge portion 52 of the flexible printed-circuit board 50 is drawn out up to an internal portion of the main body portion 11 of the housing 10.

Subsequently, the other edge portion 52 of the flexible printed-circuit board 50 is penetrated through the through hole 60 of the circuit board 40, and is connected to the circuit board 40 by way of solder, or the like. The IC chip 42 has been mounted on this circuit board 40 by way of the wire bonding manner.

Next, the circuit board 40 is joined to the main body portion 11 of the housing 10 so as to be fixed on this main body portion 11. Thereafter, the connector case 60 is assembled to the main body portion 11 of the housing 10, and since the edge portion 14 of the housing 10 is caulked, the connector case 60 is fixed with the housing 10.

When this connector case 60 is assembled in the housing 10, the terminal 61 is contacted via the spring member 62 to the circuit board 40 in the spring contact manner so as to electrically connect the terminal 61 with the circuit board 40. As a result, the pressure detecting apparatus 100 shown in FIG. 14 may be accomplished in accordance with the above-explained manner.

Since the accomplished pressure detecting apparatus 100 is mounted via the screw portion 13 of the housing 10 in the screw hole formed in the engine block, the object to be detected, this pressure detecting apparatus 100 may be connected/fixed on the engine block.

Then, when pressure (namely, internal cylinder pressure) within the combustion chamber is applied to the diaphragm 23 of the metal stem 21 as indicated by the arrow "Y" in FIG. 14, FIG. 15A, and FIG. 15B, from the pressure-receiving-purpose diaphragm 15 via the pressure transferring member 16, the diagram 22 of the metal stem 21 is deformed by this applied pressure, and then, this deformation is converted into an electric signal by the pressure sensitive element 20 so as to detect the pressure.

Then, the electric signal derived from the pressure sensitive element 20 of the sensing unit 831 is transferred via the flexible printed-circuit board 50 to the circuit board 40, and is processed by the IC chip 42, for example. The processed signal is outputted from the terminal 61 to an external unit.

In the above-described manufacturing method, after the pressure-receiving-purpose diaphragm 15 had been welded so as to construct the pressure-receiving-purpose diaphragm 15, the pressure transferring member 16, and the metal stem 21 in the integral form, the pressure sensitive element 20 has been mounted on the metal stem 21. Alternatively, after the pressure sensitive element 20 has been mounted on the metal stem 21, the pressure-receiving-purpose diaphragm 15, the pressure transferring member 16, and the metal stem 21 may be formed in an integral body.

However, the following manufacturing method may be preferably employed as explained in the above-described manufacturing method. That is, while the pressure transferring member 16 is interposed between the metal stem 21 and the pressure-receiving-purpose diaphragm 15, under such a condition that the weight is applied from the pressure-receiving-purpose diagram 15 via the pressure transferring member 16 to the metal stem 21, after the pressure-receiving-purpose diaphragm 15 is welded, the pressure sensitive element 20 is mounted on the metal stem 21.

This reason is given as follows: That is, in such a method that after the pressure receiving element 20 has been mounted on the metal stem 21 by way of the glass joint, the pressure-receiving-purpose diaphragm 15 is welded to the metal stem 21, the below-mentioned problems may occur.

As a first problem, since the length of the pressure transferring member 16 is shortened so as to reduce the distance between the pressure sensitive element 20 and the welding portion of the pressure-receiving-purpose diaphragm 15, an adverse influence caused by the welding heat becomes large. As a result, the welding heat of the pressure-receiving-purpose diaphragm 15 may give a thermal damage with respect to the pressure sensitive element 20 on the metal stem 21.

As a second problem, after the pressure sensitive element 20 has been attached to the metal stem 21, under such a condition that the weight is applied from the pressure transferring member 16 via the diaphragm 23 of the metal stem 21 to the pressure sensitive element 20, the pressure-receiving-purpose diaphragm 15 is fixed in the welding manner. As a result, the weight which was applied at this time is left in the pressure sensitive element 20 after the pressure-receiving-purpose diaphragm 15 has been welded. As a consequence, this remaining weight may produce an offset of an output.

To the contrary, in accordance with this preferred manufacturing method, before the pressure sensitive element 20 is mounted on the metal stem 21, while the weight is applied from the pressure-receiving-purpose diaphragm 15 via the pressure transferring member 16, the pressure-receiving-purpose diaphragm 15 is welded to the metal stem 21.

As a result, when the pressure-receiving-purpose diaphragm 15 is welded while applying the weight, the pressure sensitive element 20 is not yet mounted on the metal stem 21 but is not present. As a consequence, there is no such a problem that the thermal damage is given to the pressure sensitive element 20 by welding the pressure-receiving-purpose diaphragm 15, and the weight is applied. Based upon this reason, the above-explained manufacturing method is preferable.

On the other hand, according to this embodiment, in the pressure detecting apparatus comprising: the housing 10; the sensing unit 831 provided in the housing 10, for outputting the signal in response to the detected pressure; and the connector portion 60 provided on the housing 10, for deriving the signal from the sensing unit 831, such a pressure detecting apparatus 100 having the below-mentioned feature points may be provided.

That is, the sensing unit 831 is provided on the one edge side of the housing 10, namely, the tip portion of the pipe portion 12 in this embodiment, and also, the detected pressure is applied to the one edge portion of the housing 10.

The flexible printed-circuit board 50 for electrically connecting the sensing unit 831 to the connector portion 60 is stored inside the housing 10. The sensing unit 831 is mechanically and electrically connected to the one edge portion 51 of the flexible printed-circuit board 50 via the plurality of bumps 832 by way of the flip chip joint manner.

Furthermore, the dummy bumps 833 for relaxing the stresses applied to the bumps 832 are provided between the sensing unit 831 and the one edge portion 51 of the flexible printed-circuit board 50 in the vicinity of the bumps 832. The sensing unit 831 is mechanically connected via the dummy bumps 833 to the one edge portion 51 of the flexible printed-circuit board 50.

In accordance with the pressure detecting apparatus 100 having such featured points, since the sensing unit 831 can be located in the vicinity of the pressure detecting environment, sensor characteristics such as sensitivity can be improved.

Concretely speaking, since the sensing unit 831 is located close to the pressure detecting environment, the distance between the pressure-receiving-purpose diaphragm 15 and the pressure sensitive element 20 can be shortened, and the length of the pressure transferring member 16 can be made shorter than that of the prior art. As a result, the sensor characteristic may be improved.

For instance, in such a case that the pressure detecting apparatus 100 is applied as a combustion pressure sensor of an engine, when the length of the pressure transferring member 16 is made long, a resonant frequency of the pressure transferring member 16 is superimposed with a vibration frequency of knocking of combustion, so that a resonant phenomenon may occur in the pressure transferring member 16. Accordingly, such a problem may occur with respect to a sensor characteristic. That is, knocking signals which are not originally large are embedded in noise which is produced by the resonant phenomenon of the pressure transferring member 16, so that the knocking signals cannot be measured.

Also, in the case that the length of the pressure transferring member 16 is long, since the pressure transferring member 16 itself may be easily deformed, contact conditions between the pressure transferring member 16 and either the pressure-receiving-purpose diaphragm 15 or the pressure sensitive element 20 are changed. If such a change in the contact conditions happens to occur, then precision in pressure transfer characteristics is deteriorated, which may give an adverse influence to the sensor characteristic.

To the contrary, since the pressure detecting apparatus 100 of the present embodiment is constituted by positing the pressure sensitive element 20 closer to the pressure detecting environment so as to shorten the pressure transferring member 16, it is possible to suppress the resonant problem and the deformation of the pressure transferring member 16 as much as possible, which are caused by making the pressure transferring member 16 long. Thus, the sensor characteristic can be improved.

Also, in accordance with the pressure detecting apparatus 100 of this embodiment, the electric connection between the sensing unit 831 and the connector portion 60 which is separated far from the sensing unit 831 can be properly realized by employing the flexible printed-circuit board 50. Furthermore, since the sensing unit 831 is joined to the flexible printed-circuit board 50 by way of the flip chip joint manner, such an arrangement capable of suitably making the pressure detecting apparatus 100 compact may be realized.

Also, in accordance with this pressure detecting apparatus 100, by the dummy bumps 833, such an equivalent effect may be achieved as when the distances between the bumps 832 which are essentially located adjacent to each other are reduced. As a result, expansion strains between the bumps 832 can be decreased. Also, since the total number of the bumps 832 is essentially increased, a strain amount per one piece of the bump 832 can be reduced.

In other words, in this pressure detecting apparatus 100, since by the structure of providing the dummy bumps 833, a stress relaxing construction capable of relaxing the stress applied to the bumps 832 may be realized. Then, since such a stress relaxing construction using the dummy bumps 833 is employed, even when the stresses are applied to the bumps 833, the applied stresses may be relaxed.

As a consequence, in accordance with this embodiment, in such a pressure detecting apparatus 100 that the sensing unit 831 provided on the one edge portion of the housing 10 is connected to the connector portion 60 provided on the housing 10 by the flexible printed-circuit board 50, when the sensing unit 831 is joined to the flexible printed-circuit board 50 by the flip chip joint, even if the stresses are applied to the bumps 832 by the detected pressure and the cooling/heating cycle, line disconnections of the bump joint portions can be suppressed.

Also, in the pressure detecting apparatus 100 of this embodiment, the following construction may cause one of the features. That is, while the one edge portion 51 of the housing 10 has been arranged as the pipe portion 12 having the elongate shape, the sensing unit 831 is provided on the tip portion of the pipe portion 12; the flexible printed-circuit board 50 is provided inside the pipe portion 12, and the one edge portion 51 is joined to the sensing unit 831 and is bent from this joint portion; and, the portion on the side of the other edge portion 52 rather then this bending portion 653 is extended along the connector portion 60 within the pipe portion 12 to be electrically connected (via circuit board 40 in this example) to the connector portion 60.

As explained above, according to the pressure detecting apparatus 100 having the elongate shape, this structure may be suitably arranged as a combustion pressure sensor, and the like.

Also, in the pressure detecting apparatus 100 of this embodiment, the following arrangement may constitute one of the featured arrangements thereof. That is, the sensing unit 831 is arranged by employing the pressure-receiving-purpose diaphragm 15 which is strained by receiving the detected pressure, and the pressure sensitive element 20 for outputting the signal based upon this strain of the pressure-receiving-purpose diaphragm 15; and the pressure sensitive element 20 constitutes the connecting portions with the bumps 832 in the sensing unit 831.

Then, in the pressure detecting apparatus 100 of this embodiment, the following arrangement may constitute one of the featured arrangements thereof. That is, the pressure sensitive element 20 has the strain gauge function for outputting the signal in response to the detected pressure based upon the strain caused by the detected pressure.

Moreover, in the pressure detecting apparatus 100 of this embodiment, the following arrangement may constitute one of the featured arrangements thereof. That is, the pressure transferring member 16 is interposed between the pressure-receiving-purpose diaphragm 15 and the pressure sensitive element 20, while this pressure transferring member 16 transfers the pressure received by the pressure-receiving-purpose diaphragm 15 to the pressure sensitive element 20.

As the pressure transferring member 16, although a rod-shaped member may be employed, a spherical-shaped member has been employed as the pressure transferring member 16 in the example. In the case of the specific arrangement, as to the spherical-shaped member 16 functioning as the pressure transferring member, both a plane of this spherical-shaped member 16 which is contacted to the pressure-receiving-purpose diaphragm 15, and another plane thereof which is contacted to the diaphragm 23 of metal stem 21 are spheres.

As a result, the contacts between these contact planes can be set as stable point contacts. Further, a total contact number between the pressure-receiving-purpose diaphragm 15 and the diaphragm 23 of the metal stem 21, and the pressure transferring member 16 can be reduced.

As a consequence, the changes of the contact conditions between the pressure-receiving-purpose diaphragm 15 and the diaphragm 23, and the pressure transferring member 16 can be suppressed as much as possible, the stable contact conditions can be secured in the respective contact portions, and also, deteriorations of the pressure transfer precision can be suppressed.

In this case, the spherical member functioning as the pressure transferring member 16 is hardly deformed, as compared with the rod-shaped pressure transferring member of the prior art, due to its shape effect. As a result, the stable contact conditions between this spherical member, and the pressure-receiving-purpose diaphragm 15 and the diaphragm 23 can be preferably maintained under suitable contact conditions.

It should also be noted that this spherical member as the pressure transferring member 16 may be not be a complete spherical shape as shown in FIG. 14, FIG. 15A, and FIG. 15B, but may be replaced by a slightly deformed sphere. For example, an elliptical sphere, or a "rugby ball" shaped sphere may be employed as this spherical member.

Also, as the pressure transferring member 16 whose contact planes with respect to the pressure-receiving-purpose diaphragm 15 and the diaphragm 23 of the metal stem 21 are spherical planes, the invention is not limited only to a spherical-shaped member. For instance, a member whose contact planes with the diaphragms 15, 23 are spherical, but whose intermediate portion between both the spherical contact planes is a pillar shape may be employed.

In the above-described embodiment shown in FIG. 14, FIG. 15A, and FIG. 15B, the sensing unit 831 is comprised of the pressure-receiving-purpose diaphragm 15 and the metal stem 21 which are provided on the tip portion of the pipe portion 12, the pressure transferring member 15 provided inside the metal stem 21, and the pressure sensitive element 20 provided in the diaphragm 23 of the metal stem 21.

The sensing unit 831 of this embodiment is not limited only to the example represented in FIG. 14, FIG. 15A, and FIG. 15B, but any type of sensing unit may be employed if it may output signals in response to the pressure received by these sensing units.

Figure 16:
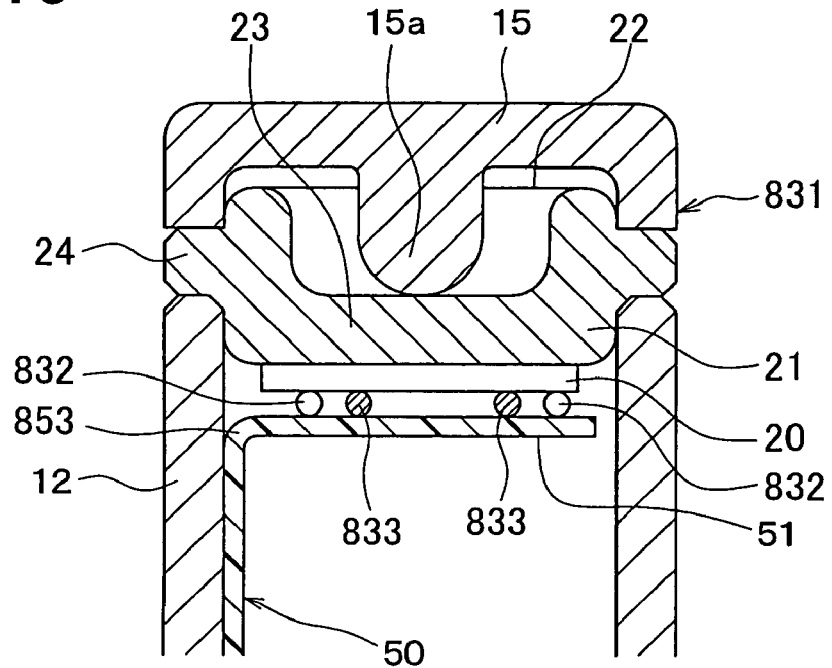
FIG. 16 is a partially enlarged cross sectional view showing a top end of showing pressure detecting apparatus according to a first modification of the eighth embodiment.
Figure 17:
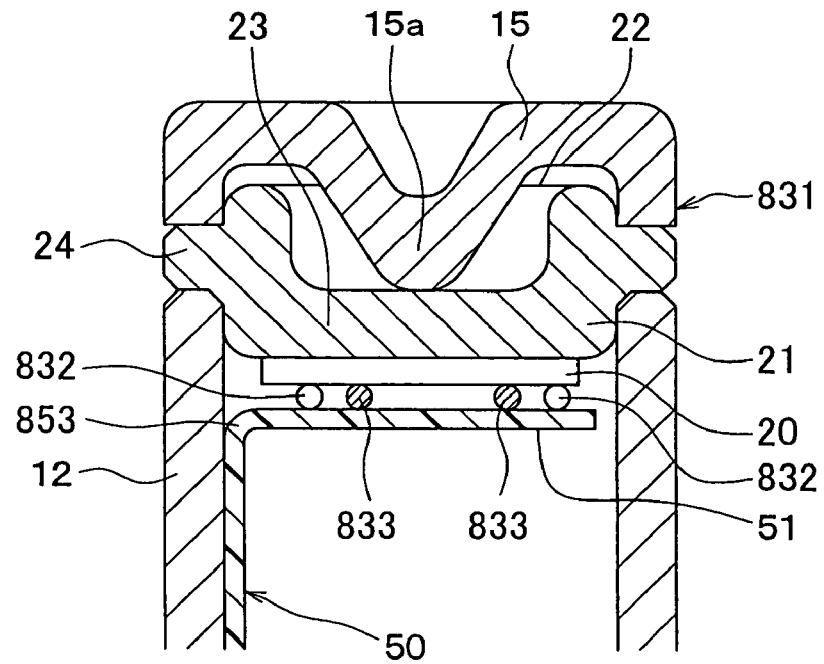
FIG. 17 is a partially enlarged cross sectional view showing a top end of showing pressure detecting apparatus according to a second modification of the eighth embodiment.
Figure 18:
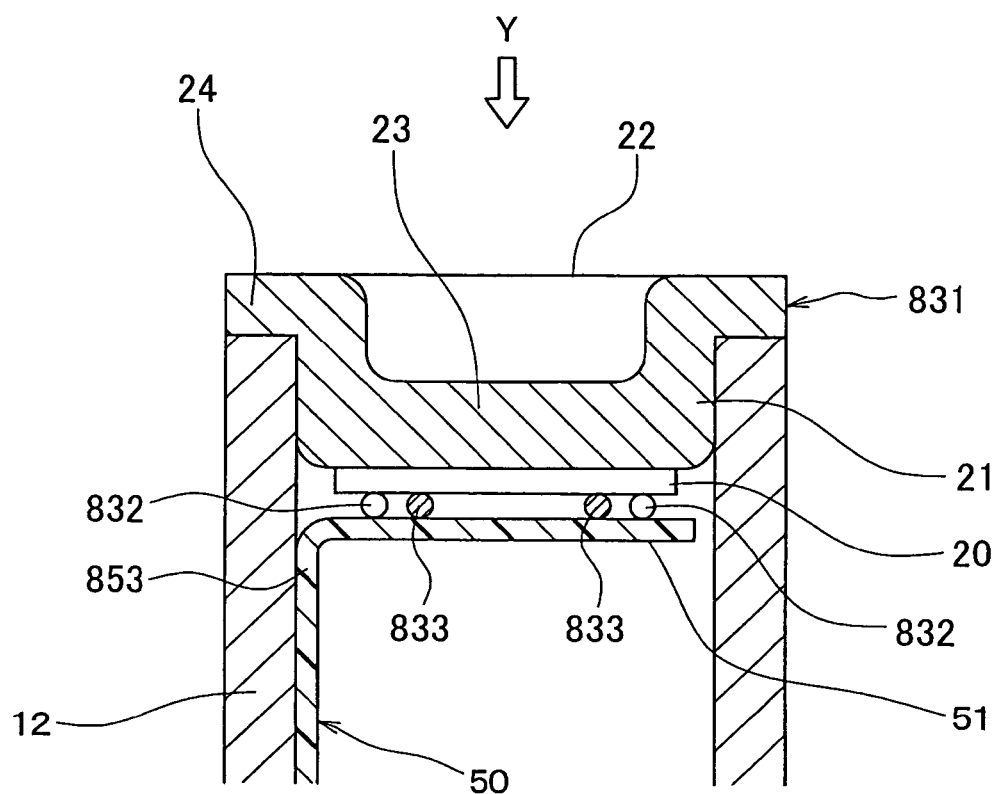
FIG. 18 is a partially enlarged cross sectional view showing a top end of showing pressure detecting apparatus according to a third modification of the eighth embodiment.

Next, other examples of the sensing unit 831, which may be employed in this first embodiment, are indicated in FIG. 16 to FIG. 18.

FIG. 16 is a sectional view for schematically showing a sensing unit 831 as a first modification. FIG. 17 is a sectional view for schematically showing a sensing unit 831 as a second modification. FIG. 18 is a sectional view for schematically showing a sensing unit 831 as a third modification. It should also be understood that these sensing units 31 may be alternatively employed in the below-mentioned respective embodiments.

In the first modification shown in FIG. 16, the sensing unit 831 comprises the pressure-receiving-purpose diaphragm 15, the metal stem 21, and the pressure sensitive element 20. The pressure sensitive element 20 constitutes a connecting portion with the bumps 832 in the sensing unit 831, which is similar to the above-explained sensing unit 831.

However, in this first modification, there is no pressure transferring member between the pressure-receiving-purpose diaphragm 15 and the pressure sensitive element 20, whereas the pressure-receiving-purpose diaphragm 15 is directly contacted to the diaphragm 23 of the metal stem 21.

Concretely speaking, as shown in FIG. 16, a convex portion 15*a* which is projected along the direction of the pressure sensitive element 20 has been formed on the pressure-receiving-purpose diaphragm 15, and a projected tip portion of this convex portion 15*a* has been contracted to the rear plane of the diaphragm 23 of the metal stem 21. In this case, the pressure-receiving-purpose diaphragm 15 is in, for example, a disk shape, and the convex portion 15*a* has such a shape similar to a "navel" which is located at a center position of this circle.

In the sensing unit 831 of this first modification, the detected pressure which has been applied the pressure-receiving-purpose diaphragm 15 is applied via the convex portion 15*a* to the diaphragm 23 of the metal stem 21. Then, the diaphragm 23 of the metal stem 21 is deformed, and the deformation is converted into an electric signal by the pressure sensitive element 20 in order to detect pressure.

In the second modification shown in FIG. 17, similar to the first modification shown in FIG. 16, this sensing unit 831 is also arranged in such a manner that while the convex portion 15*a* is provided on the pressure-receiving-purpose diaphragm 15, this pressure-receiving-purpose diaphragm 15 is directly made contact to the diaphragm 23 of the metal stem 21, so that a pressure transferring member is omitted. In this case, the convex portion 15*a* is further deformed.

In FIG. 16, the convex portion 15*a* of the pressure-receiving-purpose diaphragm 15 has been formed by way of a cutting process or the like. In contrast, in a pressure-receiving-purpose diaphragm 15 shown in FIG. 17, the convex portion 15*a* has been manufactured by conceiving a diaphragm plane having a flat plate shape by way of a pressing process, so that this convex portion 15*a* may be formed in a simple manner.

In the third modification shown in FIG. 18, the sensing unit 831 has been arranged by both the metal stem 21 and the pressure sensitive element 20, while a diaphragm has also been omitted.

As shown in FIG. 18, the opening portion 22 of the metal stem 21 is directly exposed to a pressure detecting environment such as a combustion chamber, and detected pressure such as internal cylinder pressure is directly applied to the diaphragm 23 of the metal stem 21.

In other words, in the sensing unit 831 of this third modification, the detected pressure is directly applied to the diaphragm 23 of the metal stem 21; the diaphragm 23 of the metal stem 21 is deformed by this pressure; and then, this deformation is converted into an electric signal by the pressure sensitive element 20 so as to detect the pressure.

Ninth Embodiment

FIGS. 19A to 19I are diagrams for schematically indicating plain structures of flip chip joint portions between a sensing unit 831 and one edge portion 51 of a flexible printed-circuit board 50, according to a ninth embodiment of the present invention. It should be noted that different points from the above-described embodiment will be mainly described, and the same portions thereof will be simply described.

It should be also understood that in FIGS. 19A to 19I, bumps 832 which are located under a pressure sensitive element 20 should be indicated by using a hidden line, however, for the sake of a simple observation, the bumps 832 are indicated by using a solid line.

Also, in a pressure detecting apparatus of this embodiment, the below-mentioned arrangements are similar to those of the above-described embodiments. That is, in the pressure detecting apparatus comprising: a housing 10, the above-described sensing unit 831 provided on the housing 10, and the above-described connector portion 60 provided on the housing 10, the sensing unit 831 is provided on one edge portion of the housing 10, and detected pressure is applied to the one edge portion of the housing 10; the flexible printed-circuit board has been stored inside the housing 10; and the pressure sensitive element 20 of the sensing unit 831 is electrically and mechanically connected via a plurality of bumps 832 with respect to the one edge portion 51 of the flexible printed-circuit board 50 by way of a flip chip joint.

The pressure detecting apparatus of this embodiment is featured by that as a stress relaxing structure in a flip chip joint portion between the sensing unit 831 and the flexible printed-circuit board 50, an arranging plane as to the bumps 832 of the sensing unit 831 has a feature, namely, an arranging mode of the bumps 832 on the surface of the pressure sensitive element 20 owns a feature.

In other words, the pressure detecting apparatus of this embodiment is featured by that in the pressure detecting apparatus 100 shown in FIG. 14, the structure of the flip chip joint portion between the sensing unit 831 and the flexible printed-circuit board 50 is modified, and other structural portions are similar to those shown in FIG. 14.

As indicated in FIG. 15A, these bumps 832 are generally arranged on the surface of the pressure sensitive element 20 at the four corner portions of the arranging plane of the bumps 832, namely, the surface of the pressure sensitive element 20.

In contract, in this embodiment, as shown in FIG. 19A to FIG. 19I, various sorts of examples may be employed.

In the examples shown in FIG. 19A to FIG. 19F, on the surface of the pressure sensitive element 20 having a rectangular disk shape, namely, on the arranging plane of the bumps 832, all of the bumps 832 are arrayed in one column from one side to the other of the opposing sides.

Figure 19A:
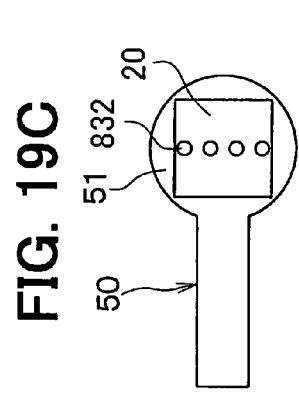
FIGS. 19A to 19I are plan views showing connections of a printed circuit board before the board is bent, according to a ninth embodiment of the present invention.
Figure 19B:
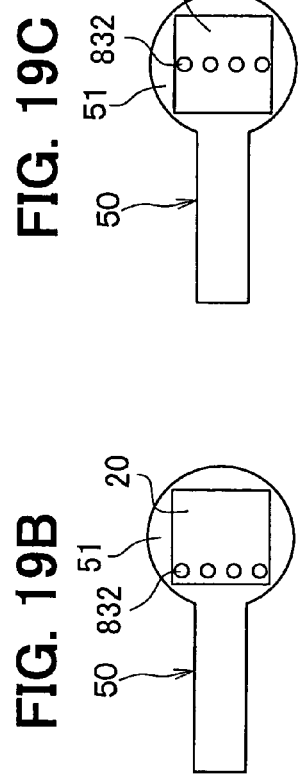
Figure 19C:
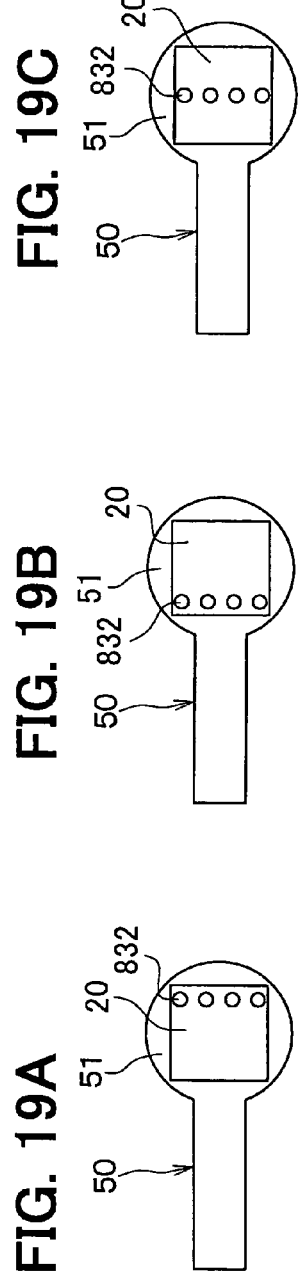
Figure 19D:
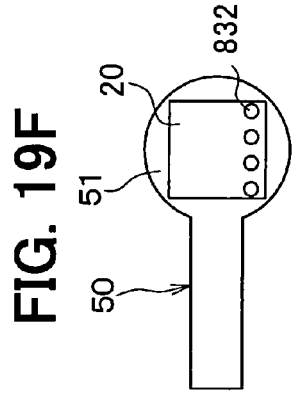
Figure 19E:
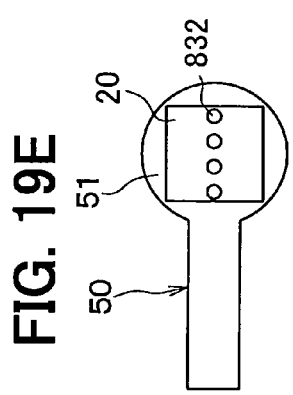
Figure 19F:
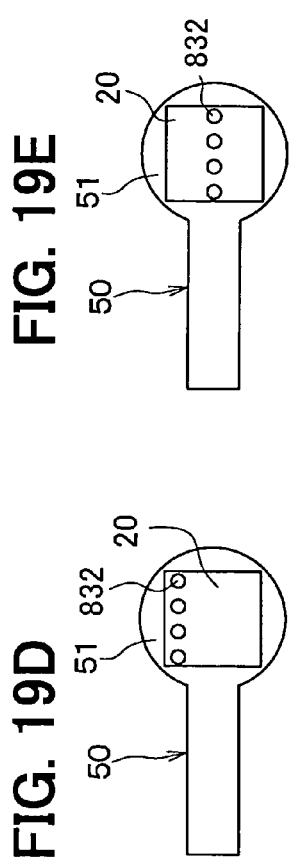
Figure 19G:
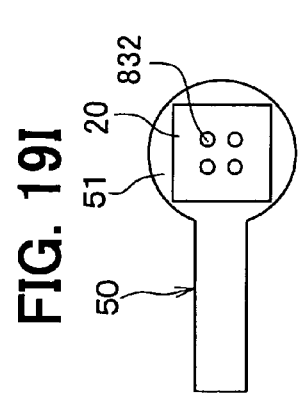
Figure 19H:
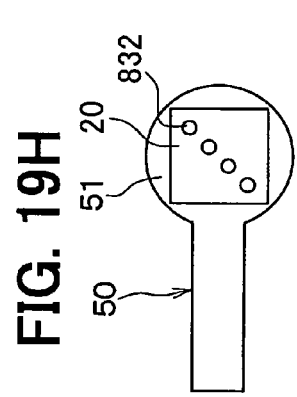

In the examples shown in FIG. 19G to FIG. 19H, on the surface of the pressure sensitive element 20 having a rectangular disk shape, namely, on the arranging plane of the bumps 832, all of the bumps 832 are arrayed in one column along a diagonal line.

Figure 19I:
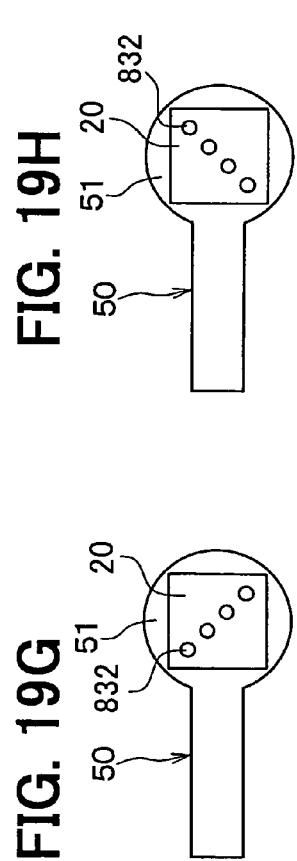

In the example shown in FIG. 19I, on the surface of the pressure sensitive element 20 having a rectangular disk shape, namely, on the arranging plane of the bumps 832, all the bumps 832 are arranged in the center portion thereof, instead of in the outer peripheral portion as explained in the prior art.

As previously explained, in this embodiment, such a pressure detecting apparatus may be provided in which on the arranging plane of the bumps 832 of the sensing units 31, namely, on the surface of the pressure sensitive element 20, all of the bumps 832 are arrayed in one column from one edge portion of the relevant arranging plane to the other edge portion thereof, or are arranged in the center portion of the arranging plane.

In accordance with this embodiment, the distances between the adjoining bumps 832 can be made shorter than those of the conventional arranging structure (refer to FIGS. 27A and 27B) of the bumps, and the expansion strains between the bumps 832 can be decreased. In other words, in this embodiment, one mode of the bumps 832 capable of reducing the distances between the bumps 832 may be provided.

As a consequence, in accordance with this embodiment, in such a pressure detecting apparatus 100 that the sensing unit 831 provided on the one edge portion of the housing 10 is connected to the connector portion 60 provided on the housing 10 by the flexible printed-circuit board 50, when the sensing unit 831 is joined to the flexible printed-circuit board 50 by the flip chip joint, even if the stresses are applied to the bumps 832 by the detected pressure and the cooling/heating cycle, line disconnections of the bump joint portions can be suppressed.

As apparently, such pressure detecting apparatus having the various sorts of featured points shown in the above-described embodiments may be additionally provided in this embodiment.

Tenth Embodiment

Figure 20:
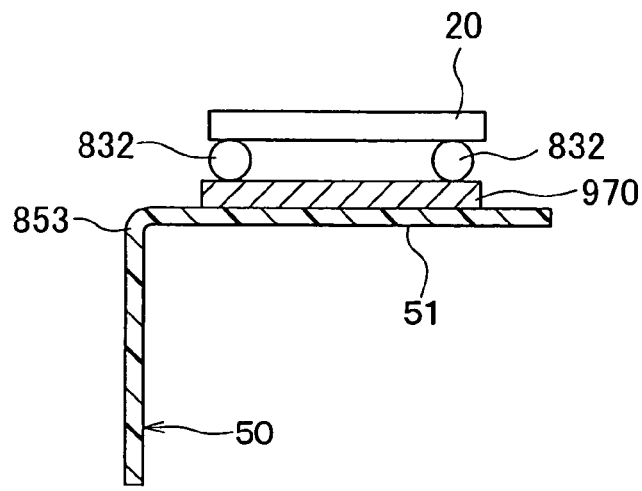
FIG. 20 is a side view showing connection of a printed circuit board after the board is bent, according to a tenth embodiment of the present invention.

FIG. 20 is a diagram for schematically indicating plain structures of flip chip joint portions between a sensing unit 831 and one edge portion 51 of a flexible printed-circuit board 50, according to a tenth embodiment of the present invention. It should be noted that different points from the above-described embodiments will be mainly described, and the same portions thereof will be simply described.

Also, in a pressure detecting apparatus of this embodiment, the below-mentioned arrangements are similar to those of the above-described embodiments. That is, in the pressure detecting apparatus comprising: a housing 10, the above-described sensing unit 831 provided on the housing 10, and the above-described connector portion 60 provided on the housing 10, the sensing unit 831 is provided on the one edge portion of the housing 10, and detected pressure is applied to the one edge portion of the housing 10; the flexible printed-circuit board has been stored inside the housing 10; and the pressure sensitive element 20 of the sensing unit 831 is electrically and mechanically connected via a plurality of bumps 832 with respect to the one edge portion 51 of the flexible printed-circuit board 50 by way of a flip chip joint.

The pressure detecting apparatus of this embodiment is featured by that as a stress relaxing structure in a flip chip joint portion between the sensing unit 831 and the flexible printed-circuit board 50, the below-mentioned interference member 970 is employed.

In other words, the pressure detecting apparatus of this embodiment is featured by that in the pressure detecting apparatus 100 shown in FIG. 14, the structure of the flip chip joint portion between the sensing unit 831 and the flexible printed-circuit board 50 is modified, and other structural portions are similar to those shown in FIG. 14.

Then, as shown in FIG. 20, in accordance with this embodiment, a pressure detecting apparatus is provided which is featured by that an interference member 970 capable of relaxing a stress produced by a difference in thermal expansion coefficients between the sensing unit 831 and the flexible printed-circuit board 50 is provided on the flexible printed-circuit board 50.

In the example shown in FIG. 20, the interference member 970 corresponds to a board 970. A thermal expansion coefficient of this board 970 is equal to that of the connection portion 30 with respect to the bump 832 in the sensing unit 831, namely that of the pressure sensitive element 20. Otherwise, the thermal expansion coefficient of the board 970 is equal to such an intermediate coefficient value between this pressure sensitive element 20 and the flexible printed-circuit board 50.

Then, the board 970 functioning as this interference member is interposed and fixed between the bumps 832 and the flexible printed-circuit board 50.

In this example, the bumps 832 are electrically and mechanically joined to the board 970, whereas the board 970 is electrically and mechanically joined via an electric conductive adhesive agent, or solder (which are not shown) to the flexible printed-circuit board 50. As a result, an electric conduction between the pressure sensitive element 20 and the flexible printed-circuit board 50 can be established.

Normally, since the pressure sensitive element 20 is made of silicon and the flexible printed-circuit board 50 is made of polyimide, as the board 970 having the above-explained thermal expansion coefficient characteristic, for instance, a board whose thermal expansion coefficient is nearly equal to that of silicon or intermediate between the thermal expansion coefficients of silicon and polyimide may be employed.

Although not limited, concretely speaking, in this embodiment, such a board made of ceramics, e.g., alumina and silica may be employed as the board 970 functioning as the interference member.

If such a board 970 is employed as the interference member, then the difference in the thermal expansion coefficients among the adjoining portions in the bump joint portion can be reduced. As a consequence, the stress which is produced by the cooling/heating cycle is the bump joint portion can be relaxed by the board 970 functioning as this interference member, and also, a strain amount per one bump 832 can be decreased by this board 970.

As a consequence, in accordance with this embodiment, in such a pressure detecting apparatus 100 that the sensing unit 831 provided on the one edge portion of the housing 10 is connected to the connector portion 60 provided on the housing 10 by the flexible printed-circuit board 50, when the sensing unit 831 is joined to the flexible printed-circuit board 50 by the flip chip joint, even if the stresses are applied to the bumps 832 by the detected pressure and the cooling/heating cycle, line disconnections of the bump joint portions can be suppressed.

Now, in this embodiment, as the interference member provided on the flexible printed-circuit board 50, if such an interference member is available that may relax the stress produced by the difference in the thermal expansion coefficients between the sensing unit 831 and the flexible printed-circuit board 50, then any types of interference members may be employed, and thus, the invention is not limited only to the board 970 shown in FIG. 20.

Figure 21:
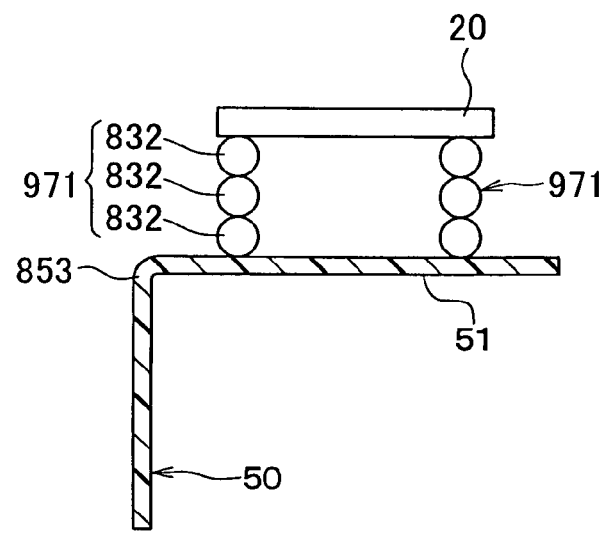
FIG. 21 is a side view showing connection of a printed circuit board after the board is bent, according to a first modification of the tenth embodiment.
Figure 22:
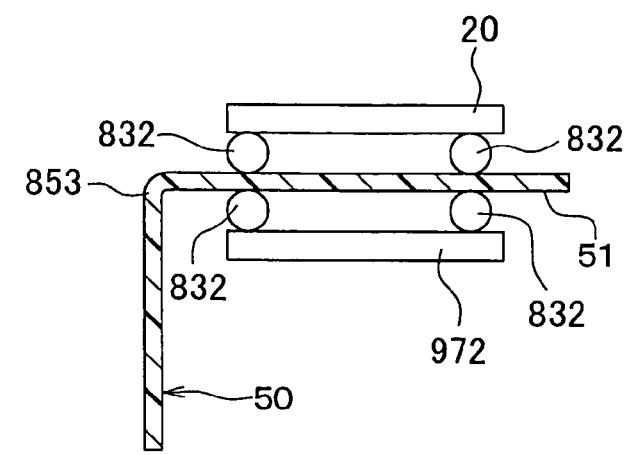
FIG. 22 is a side view showing connection of a printed circuit board after the board is bent, according to a second modification of the tenth embodiment.

Next, other examples of the interference member which may be employed in this third embodiment are represented in FIG. 21 and FIG. 22.

FIG. 21 is a diagram for schematically showing a side structure of a flip chip joint portion with employment of an interference member 971 as a first modification of this embodiment.

In the first modification shown in FIG. 21, the interference member 971 has been arranged in such a manner that a plurality of bumps 832 are stacked between the sensing unit 831 and the flexible printed-circuit board 50. In FIG. 21, while 3 pieces of these bumps 832 have been stacked, this stacked body 71 has been constructed as the interference member 971.

If such a stacked body of the bumps 832 is employed as the interference member 971, a distance between the sensing unit 831 and the flexible printed-circuit board 970 can be made long so that a tolerance with respect to a strain produced by a stress may be improved. As a result, a strain amount per one piece of the bump 832 can be reduced.

FIG. 22 is a diagram for schematically showing a side structure of a flip chip joint portion with employment of an interference member 972 as a second modification of this embodiment.

In the second modification indicated in FIG. 22, the interference member 972 corresponds to a dummy board 972 made of the same material as that of the connection portion 30 with respect to the bumps 832 in the sensing unit 831, namely that of the pressure sensitive element 20. Although not concretely limited, since the pressure sensitive element 20 is normally made of a silicon semiconductor, this dummy board 972 may also be made as a silicon semiconductor substrate.

Then, the dummy board 972 is provided on a plane which is located opposite to such a plane that the pressure sensitive element 20 of the sensing unit 831 is connected in one edge portion 51 of the flexible printed-circuit board 50, and is joined via the bumps 832.

In accordance with this second modification, since the flexible printed-circuit board 50 is sandwiched by the pressure sensitive element 20 corresponding to the connection portion with respect to the bumps 832 in the sensing unit 831, and the dummy board 972 made of the same material, a deformation of the flexible printed-circuit board 50 can be suppressed. As a consequence, a strain amount per one piece of the bump 832 can be reduced.

As previously explained, also in the first and second modifications shown in FIG. 21 and FIG. 22, the above-explained operations and effects of this embodiment may be achieved. Also, as apparent from the foregoing description, in this embodiment, a pressure detecting apparatus having the various sorts of featured points shown in the above-described embodiment may be alternatively provided.

Eleventh Embodiment

Figure 23:
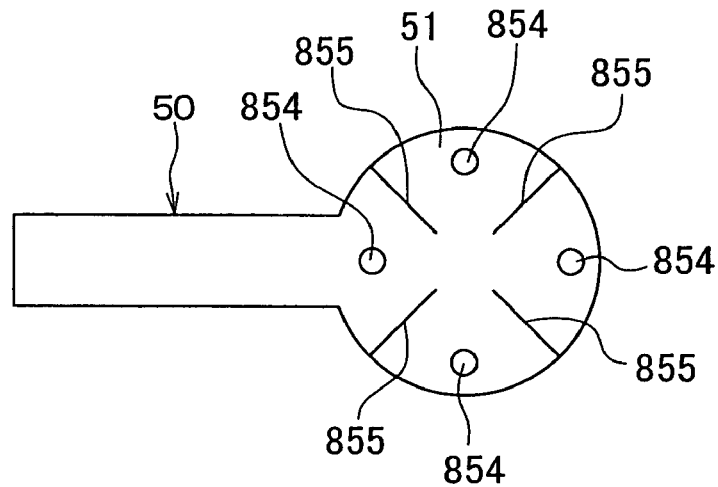
FIG. 23 is a plan view showing connection of a printed circuit board before the board is bent, according to an eleventh embodiment of the present invention.

FIG. 23 is a diagram for schematically representing a plain structure of one edge portion 51 of a flexible printed-circuit board 50 according to an eleventh embodiment of the present invention, namely for showing the flexible printed-circuit board 50 before this flexible printed-circuit board 50 is bent. In this embodiment, different points from those of the above-explained embodiments will be mainly described, and the same portions will be simply explained.

Also in a pressure detecting apparatus of this embodiment, the below-mentioned arrangements are similar to those of the above-described embodiments. That is, in the pressure detecting apparatus comprising: a housing 10, the above-described sensing unit 831 provided on the housing 10, and the above-described connector portion 60 provided on the housing 10, the sensing unit 831 is provided on the one edge portion side of the housing 10, and detected pressure is applied to the one edge portion of the housing 10; the flexible printed-circuit board has been stored inside the housing 10; and the pressure sensitive element 20 of the sensing unit 831 is electrically and mechanically connected via a plurality of bumps 832 with respect to the one edge portion 51 of the flexible printed-circuit board 50 by way of a flip chip joint.

The pressure detecting apparatus of this embodiment employs the below-mentioned notch structure of the flexible printed-circuit board 50 as a stress relaxing structure in the flip chip joint portion between the sensing portion 31 and the flexible printed-circuit board 50.

In other words, the pressure detecting apparatus of this embodiment is featured by that in the pressure detecting apparatus 100 shown in FIG. 14, the structure of the flip chip joint portion between the sensing unit 831 and the flexible printed-circuit board 50 is modified, and other structural portions thereof are similar to those shown in FIG. 14.

In this embodiment, as shown in FIG. 23, such a pressure detecting apparatus may be provided with the following featured structure. That is, on the one edge portion 51 of the flexible printed-circuit board 50, notches 855 are formed among pads 854 corresponding to respective portions to which the bumps 832 are connected, so that the respective pads 854 can be independently displaced. These notches 855 may be formed by way of a press process, or a cutting tool.

As a result, the respective pads 854 to which the bumps 832 are connected can be independently displaced on the one edge portion 51 of the flexible printed-circuit board 50, so that strains of the respective bumps 832 which are caused by stresses can be readily escaped, and a strain amount per one piece of the bump 832 can be reduced.

As a consequence, in accordance with this fourth embodiment, in such a pressure detecting apparatus 100 that the sensing unit 831 provided on the one edge portion of the housing 10 is connected to the connector portion 60 provided on the housing 10 by the flexible printed-circuit board 50, when the sensing unit 831 is joined to the flexible printed-circuit board 50 by the flip chip joint, even if the stresses are applied to the bumps 832 by the detected pressure and the cooling/heating cycle, line disconnections of the bump joint portions can be suppressed.

In this embodiment, as to the notches 855 provided on the one edge portion 51 of the flexible printed-circuit board 50, the invention is not limited only to the example shown in FIG. 23, but other examples may be employed if the respective pads 854 may be independently displaced while the notches 855 are used as boundaries.

Figure 24A:
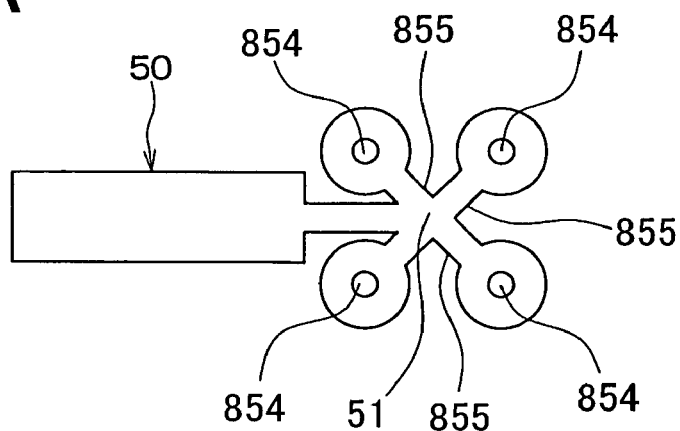
FIGS. 24A and 24B are plan views showing connections of a printed circuit board before the board is bent, according to a first and a second modifications of the eleventh embodiment.
Figure 24B:
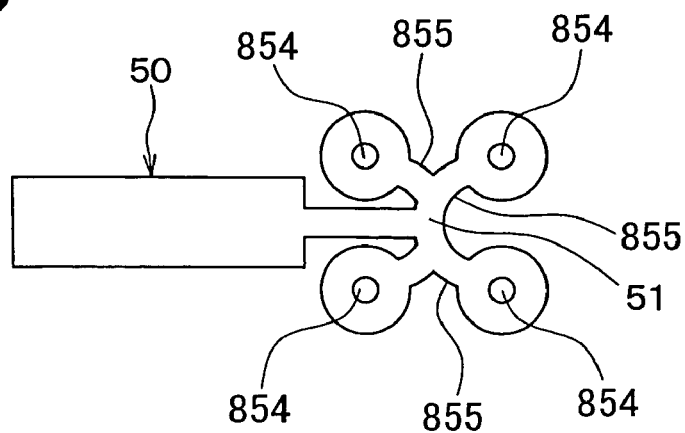

FIG. 24A and FIG. 24B are plan views for schematically showing other examples as to the notches 855 which may be employed in this embodiment. Although the notches 855 are the line shapes in the example shown in FIG. 23, the notches 855 indicated in FIG. 24A and FIG. 24B may have widths.

Also, in the examples shown in FIG. 23, FIG. 24A, and FIG. 24B, the one edge portions 51 of the flexible printed-circuit boards 50 have been formed in the two-dimensional shape. Alternatively, as another modification shown in FIG. 25A and FIG. 25B, one edge portions 51 of flexible printed-circuit boards 50 may be formed in a three-dimensional shape.

Figure 25A:
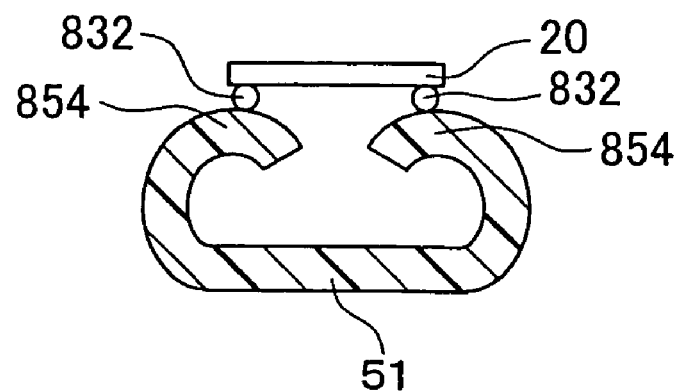
FIG. 25A is a plan view showing connection of a printed circuit board before the board is bent.
Figure 25B:
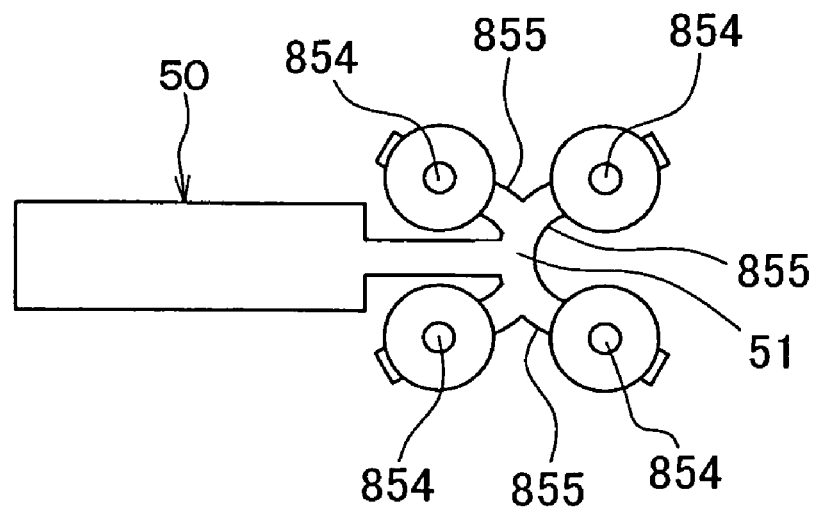
FIG. 25B is a cross sectional view showing the connection of the board after the board is bent, according to a third modification of the eleventh embodiment.

In this modification, FIG. 25A is a diagram for schematically representing a plain structure of the one edge portion 51 of the flexible printed-circuit board 50 under such a condition before this flexible printed-circuit board 50 is bent. FIG. 25B is a diagram for schematically showing a side structure as to such a condition that the pressure sensitive element 20 is joined to the one edge portion 51 of the flexible printed-circuit board 50 shown in FIG. 25A in a flip chip joint manner.

In the example shown in FIG. 25a and FIG. 25B, the respective pads 854 to which the bumps 832 are connected have been bent on the one edge portion 51 of the flexible printed-circuit board 50 in such a manner that the respective pads 854 are brought up along the direction of the bumps 832, namely the direction of the sensing unit 831.

According to this modification, the respective components to which the bumps 832 are connected in the flexible printed-circuit board 50, namely the respective pads 854 can be readily displaced along the stacking direction of the sensing unit 831, the bump 832, and the flexible printed-circuit board 50. As a consequence, a strain amount per one piece of the bump 832 can be further reduced.

As previously explained, also in the modifications shown in FIG. 24A, FIG. 24B, FIG. 25A, and FIG. 25B, the above-explained operations and effects of this fourth embodiment may be achieved. Also, as apparent from the foregoing description, in this embodiment, pressure detecting apparatus having the various sorts of featured points shown in the above-described embodiments may be alternatively provided.

In the example shown in FIG. 14, the IC chip 42, the circuit board 40, and various sorts of electric connecting members have been arranged on the portion between the pressure sensitive element 20 and the connector portion 60 within the housing 10. However, the invention is not limited only to the structure of this portion, but may be properly modified.

Also, as to the shape of the housing 10 employed in the pressure detecting apparatus of the invention, the invention is not limited only to the housings 10 having such pipe portions 12 as indicated in the above-described embodiments.

In summary, the invention owns the following major structure. That is, in the pressure detecting apparatus arranged by that both the sensing unit and the connector portion are provided in the housing, the sensing unit is provided on the one edge portion side of the housing and the detected pressure is applied to the one edge portion of the housing; the flexible printed-circuit board for electrically connecting the sensing unit to the connector portion is stored inside the housing; the sensing unit is electrically and mechanically connected via the plural bumps to the one edge portion of the flexible printed-circuit board in the flip chip joint manner; and further, the stress relaxing structure capable of relaxing the stresses applied to the bumps is provided; and other structural portions may be properly changed in a design sense.

Such changes and modifications are to be understood as being within the scope of the present invention as defined by the appended claims.

What is claimed is:

1. Pressure detecting apparatus comprising:
   a housing;
   a pipe extending from one end of the housing and having an elongated shape; and
   a pressure sensitive element for detecting pressure and outputting a signal corresponding to the pressure, wherein
   the pipe includes a top end capable of receiving the pressure,
   the pressure sensitive element is disposed on the top end of the pipe,
   the housing includes a connector for retrieving the signal from the pressure sensitive element,
   the pipe further includes a wiring member disposed in the pipe so that the wiring member connects between the pressure sensitive element and connector electrically,
   the pipe further includes a bottom end, which is opposite to the top end and faces the one end of the housing, and
   the wiring member is extended from the bottom end.

2. The apparatus according to claim 1, wherein
   the pressure sensitive element is exposed outside of the apparatus for detecting the pressure so that the pressure is applied to the pressure sensitive element directly.

3. The apparatus according to claim 1, further comprising:
   a diaphragm disposed on the top end of the pipe for covering the pressure sensitive element, wherein
   the pressure sensitive element is capable of receiving the pressure through the diaphragm.

4. The apparatus according to claim 3, further comprising:
   a pressure transferring member disposed between the diaphragm and the pressure sensitive element, wherein
   the pressure transferring member includes a first surface contacting the diaphragm and a second surface contacting the pressure sensitive element,
   the first and the second surfaces are spherical surfaces, and
   the pressure sensitive element is capable of receiving the pressure through the diaphragm and the pressure transferring member.

5. The apparatus according to claim 4, wherein
   the pressure transferring member is a sphere.

6. The apparatus according to claim 1, further comprising:
   a diaphragm having a circular shape and disposed on the top end of the pipe for covering the pressure sensitive element, wherein
   the pressure sensitive element is capable of receiving the pressure through the diaphragm,
   the pressure sensitive element includes a strain gauge deformable by a load introduced from the diaphragm,
   the strain gauge has a contact area contacting the diaphragm, and
   the contact area of the strain gauge is equal to or smaller than one-fourth of an area of the diaphragm.

7. Pressure detecting apparatus comprising:
   a housing;
   a pipe extending from one end of the housing and having an elongated shape; and
   a pressure sensitive element for detecting pressure and outputting a signal corresponding to the pressure, wherein the pipe includes a top end capable of receiving the pressure, the pressure sensitive element is disposed on the top end of the pipe, the housing includes a connector for retrieving the signal from the pressure sensitive element, a heat radiation member disposed on the pressure sensitive element, the pipe further includes a wiring member disposed in the pipe so that the wiring member connects between the pressure sensitive element and connector electrically, the pressure sensitive element includes a concavity, and the heat radiation member and the concavity of the pressure sensitive element has a clearance therebetween.

8. The apparatus according to claim 7, wherein
the pressure sensitive element is deformable by the pressure so that the pressure sensitive element outputs the signal corresponding to the pressure on the basis of deformation of the pressure sensitive element.

9. Pressure detecting apparatus comprising:
a housing;
a pipe extending from one end of the housing and having an elongated shape; and
a pressure sensitive element for detecting pressure and outputting a signal corresponding to the pressure, wherein
the pipe includes a top end capable of receiving the pressure,
the pressure sensitive element is disposed on the top end of the pipe,
the housing includes a connector for retrieving the signal from the pressure sensitive element,
the pipe further includes a wiring member disposed in the pipe so that the wiring member connects between the pressure sensitive element and connector electrically,
the wiring member is a flexible printed circuit board,
the flexible printed circuit board includes a first end connecting to the pressure sensitive element, a second end, and a bending portion,
the flexible printed circuit board is bent with a bending angle at the bending portion,
the second end of the flexible printed circuit board extends toward the connector, and
the bending angle is equal to or smaller than 90 degrees so that stress at the bending portion is smaller than a case where the bending angle is larger than 90 degrees.

10. The apparatus according to claim 9, wherein
the flexible printed circuit board further includes a second bending portion with a second bending angle,
the second bending portion is disposed on a second end side of the flexible printed circuit board, and
the second bending angle is equal to or smaller than 90 degrees.

11. The apparatus according to claim 9, wherein
the first end of the flexible printed circuit board is disposed in the pipe on one side of an inner wall of the pipe,
the second end of the flexible printed circuit board is disposed in the pipe on the other side of the inner wall of the pipe, and
the one end of the inner wail of the pipe faces the other side of the inner wall of the pipe.

12. The apparatus according to claim 9, wherein
the flexible printed circuit board includes a through hole at the first end so that the pressure sensitive element is exposed from the flexible printed circuit board.

13. The apparatus according to claim 9, wherein
the pressure sensitive element is deformable by the pressure so that the pressure sensitive element outputs the signal corresponding to the pressure on the basis of deformation of the pressure sensitive element.

14. Pressure detecting apparatus comprising:
a housing;
a flexible printed circuit board disposed in the housing;
a sensing portion for detecting pressure and outputting a signal corresponding to the pressure; and
a connector disposed in the housing and retrieving the signal from the sensing portion, wherein
the sensing portion is disposed on one side of the housing so that the one side of the housing is capable of receiving the pressure,
the flexible printed circuit board connects between the sensing portion and the connector electrically,
the sensing portion is connected to the flexible printed circuit board electrically and mechanically through a plurality of bumps disposed on the flexible printed circuit board,
the flexible printed circuit board has a stress relaxation construction for reducing stress applied to the bumps,
the stress relaxation construction is an interference member disposed between the flexible printed circuit board and the sensing portion so that the interference member reduces stress generated from a difference of heat expansion coefficient between the flexible printed circuit board and the sensing portion.

15. The apparatus according to claim 14, wherein
the interference member is a substrate having a heat expansion coefficient, which is almost equal to the sensing portion, and
the interference member is disposed between the flexible printed circuit board and the bumps.

16. The apparatus according to claim 14, wherein
the interference member is a substrate having a heat expansion coefficient, which is disposed between a heat expansion coefficient of the sensing portion and a heat expansion coefficient of the flexible printed circuit board, and
the interference member is disposed between the flexible printed circuit board and the bumps.

17. The apparatus according to claim 14, wherein
the interference member is composed of a plurality of bumps, which is stacked and disposed between the flexible printed circuit board and the sensing portion.

18. The apparatus according to claim 14, wherein
the housing includes a pipe extending from one end of the housing and having an elongated shape,
the sensing portion is disposed on a top end of the pipe,
the flexible printed circuit board is disposed in the pipe,
the flexible printed circuit board includes a first end connecting to the sensing portion, a second end, and a bending portion,
the flexible printed circuit board is bent at the bending portion, and
the second end of the flexible printed circuit board extends toward the connector so that the second end of the flexible printed circuit board connects to the connector electrically.

19. The apparatus according to claim 14, wherein
the sensing portion includes a diaphragm and a pressure sensitive element,
the diaphragm is deformable on the basis of the pressure applied to the diaphragm, the pressure sensitive element is capable of detecting deformation of the diaphragm and of outputting the signal corresponding to the pressure, the pressure sensitive element of the sensing portion contacts the bumps so that the sensing portion is connected to the flexible printed circuit board electrically and mechanically.

20. The apparatus according to claim 19, further comprising:

a pressure transferring member disposed between the diaphragm and the pressure sensitive element, wherein the pressure sensitive element is capable of receiving the pressure through the diaphragm and the pressure transferring member.

21. The apparatus according to claim 20, wherein the pressure transferring member is a sphere.

22. The apparatus according to claim 19, wherein the pressure sensitive element is deformable by the pressure so that the pressure sensitive element outputs the signal corresponding to the pressure on the basis of deformation of the pressure sensitive element.

23. Pressure detecting apparatus comprising:

a housing;

a flexible printed circuit board disposed in the housing;

a sensing portion for detecting pressure and outputting a signal corresponding to the pressure; and a connector disposed in the ho sing and retrieving the signal from the sensing portion, wherein the sensing portion is disposed on one side of the housing so that the one side of the housing is capable of receiving the pressure, the flexible printed circuit board connects between the sensing portion and the connector electrically, the sensing portion is connected to the flexible printed circuit board electrically and mechanically through a plurality of bumps disposed on the flexible printed circuit board, and the flexible printed circuit board has a stress relaxation construction for reducing stress applied to the bumps, the stress relaxation construction is a dummy substrate, which is made of a same material as the sensing portion, the sensing portion is disposed on one side of the flexible printed circuit board, the dummy substrate is disposed on the other side of the flexible printed circuit board through a plurality of dummy bumps so that the dummy substrate reduces stress generated from a difference of heat expansion coefficient between the flexible printed circuit board and the sensing portion, and the other side of the flexible printed circuit board is opposite to the one side of the flexible printed circuit board.

24. Pressure detecting apparatus comprising:

a housing;

a flexible printed circuit board disposed in the housing;

a sensing portion for detecting pressure and outputting a signal corresponding to the pressure; and a connector disposed in the housing and retrieving the signal from the sensing portion, wherein the sensing portion is disposed on one side of the housing so that the one side of the housing is capable of receiving the pressure, the flexible printed circuit board connects between the sensing portion and the connector electrically, the sensing portion is connected to the flexible printed circuit board electrically and mechanically through a plurality of bumps disposed on the flexible printed circuit board, the flexible printed circuit, board has a stress relaxation construction for reducing stress applied to the bumps, the stress relaxation construction is a plurality of notches, and the notches divides the flexible printed circuit board into a plurality of portions, each of which includes the bump and is deformable independently.

25. The apparatus according to claim 24, wherein each portion of the flexible printed circuit board is bent toward the sensing portion so that the bump on the portion press-contacts and connects to the sensing portion.

* * * * *